June 30, 1936. J. E. PADGETT 2,045,613
AUTOMATIC POWER TRANSMITTING MECHANISM
Filed Feb. 9, 1934 8 Sheets-Sheet 1

Inventor
Joseph E. Padgett
Strauch & Hoffman
Attorneys

June 30, 1936.   J. E. PADGETT   2,045,613
AUTOMATIC POWER TRANSMITTING MECHANISM
Filed Feb. 9, 1934   8 Sheets-Sheet 2
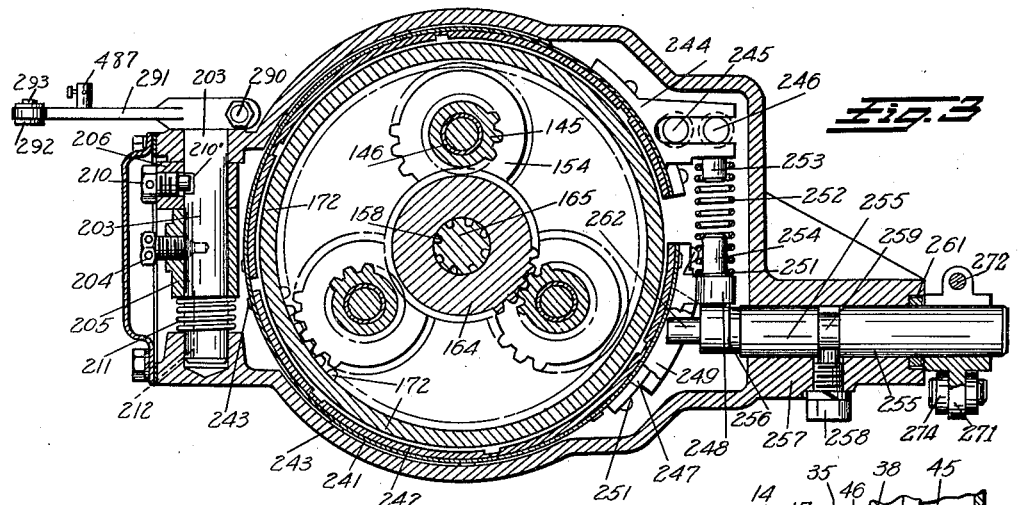
Fig. 3
Fig. 2
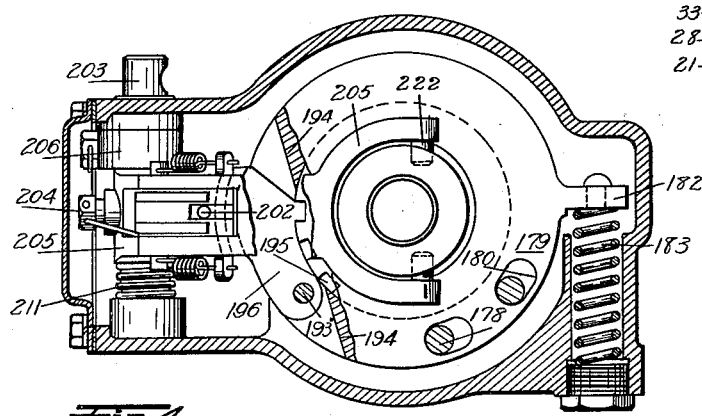
Fig. 4
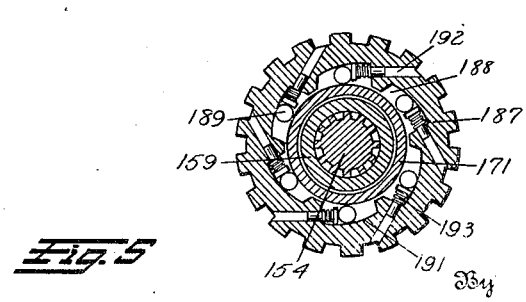
Fig. 5
Inventor
Joseph E. Padgett
Strauch & Hoffman
Attorneys June 30, 1936.  J. E. PADGETT  2,045,613
AUTOMATIC POWER TRANSMITTING MECHANISM
Filed Feb. 9, 1934   8 Sheets—Sheet 3
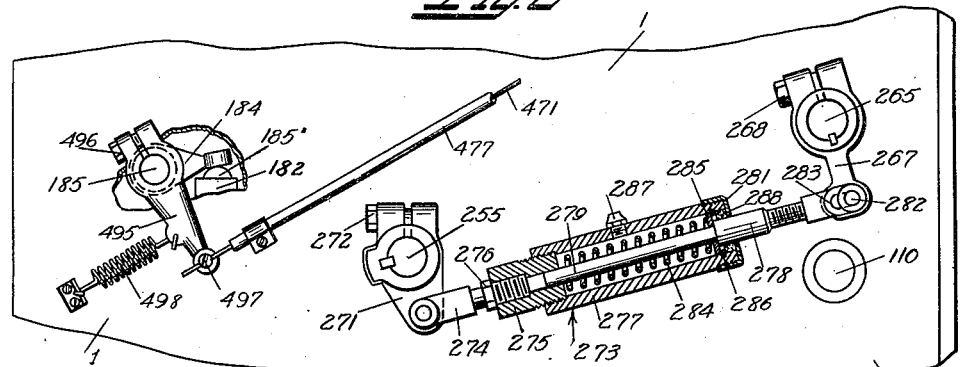
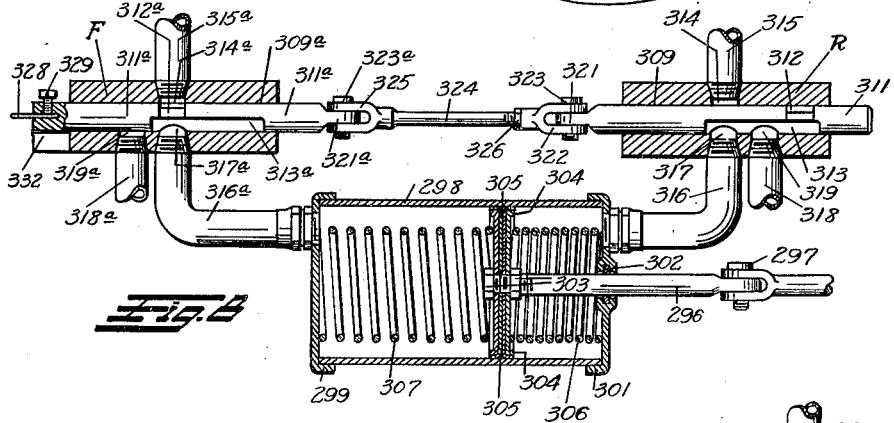
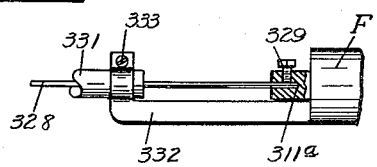
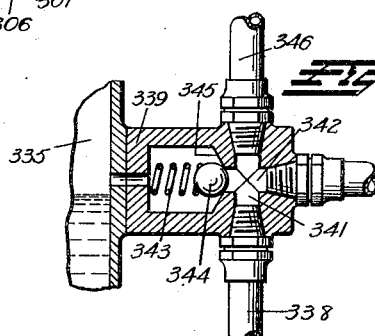
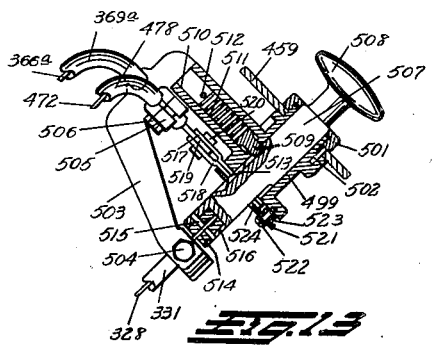
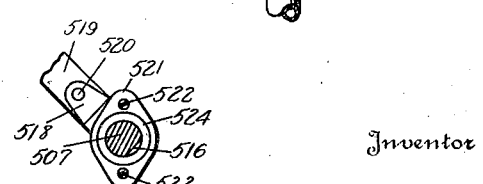
Inventor
Joseph E. Padgett
By Strauch & Hoffman
Attorneys

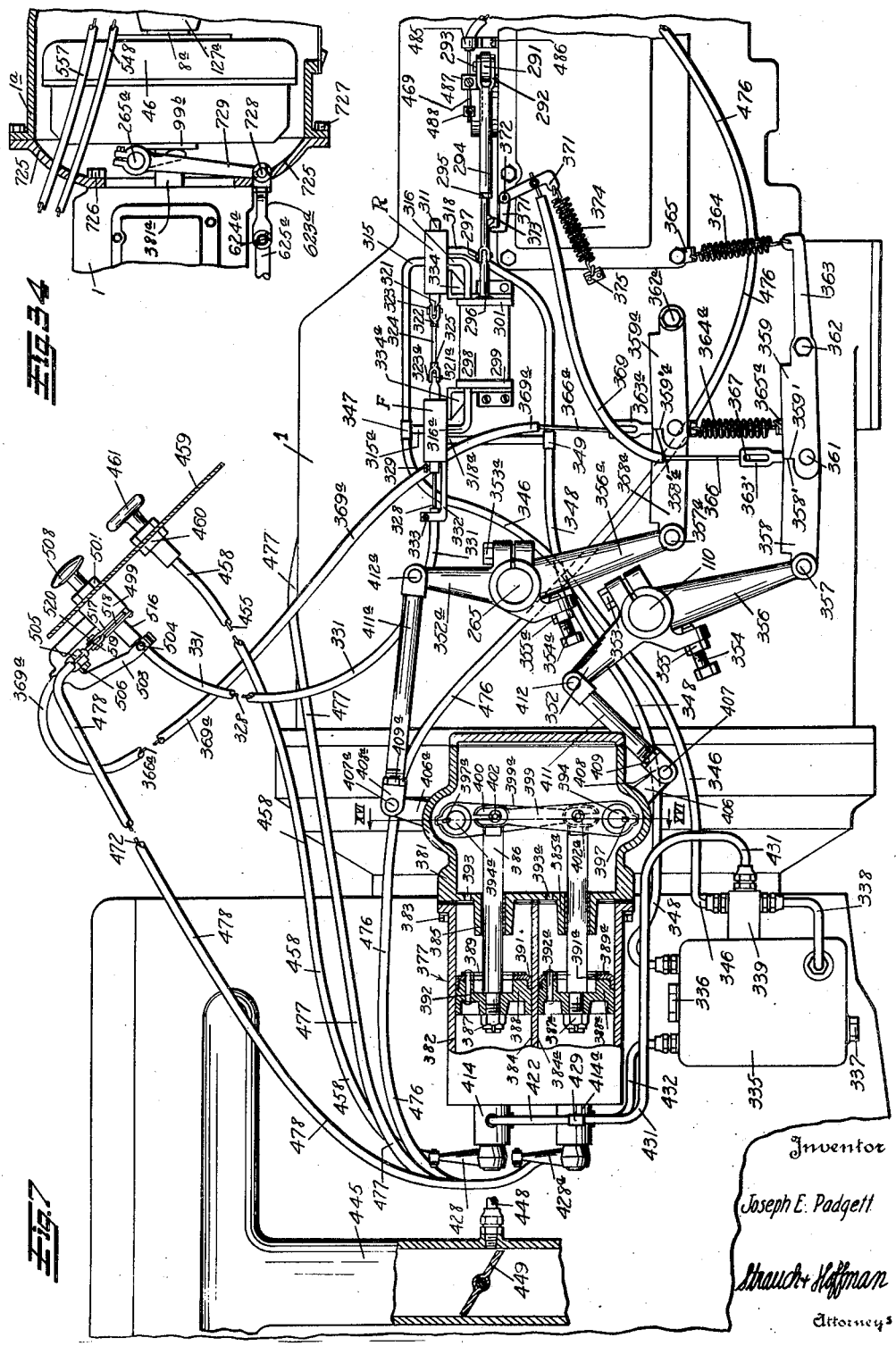

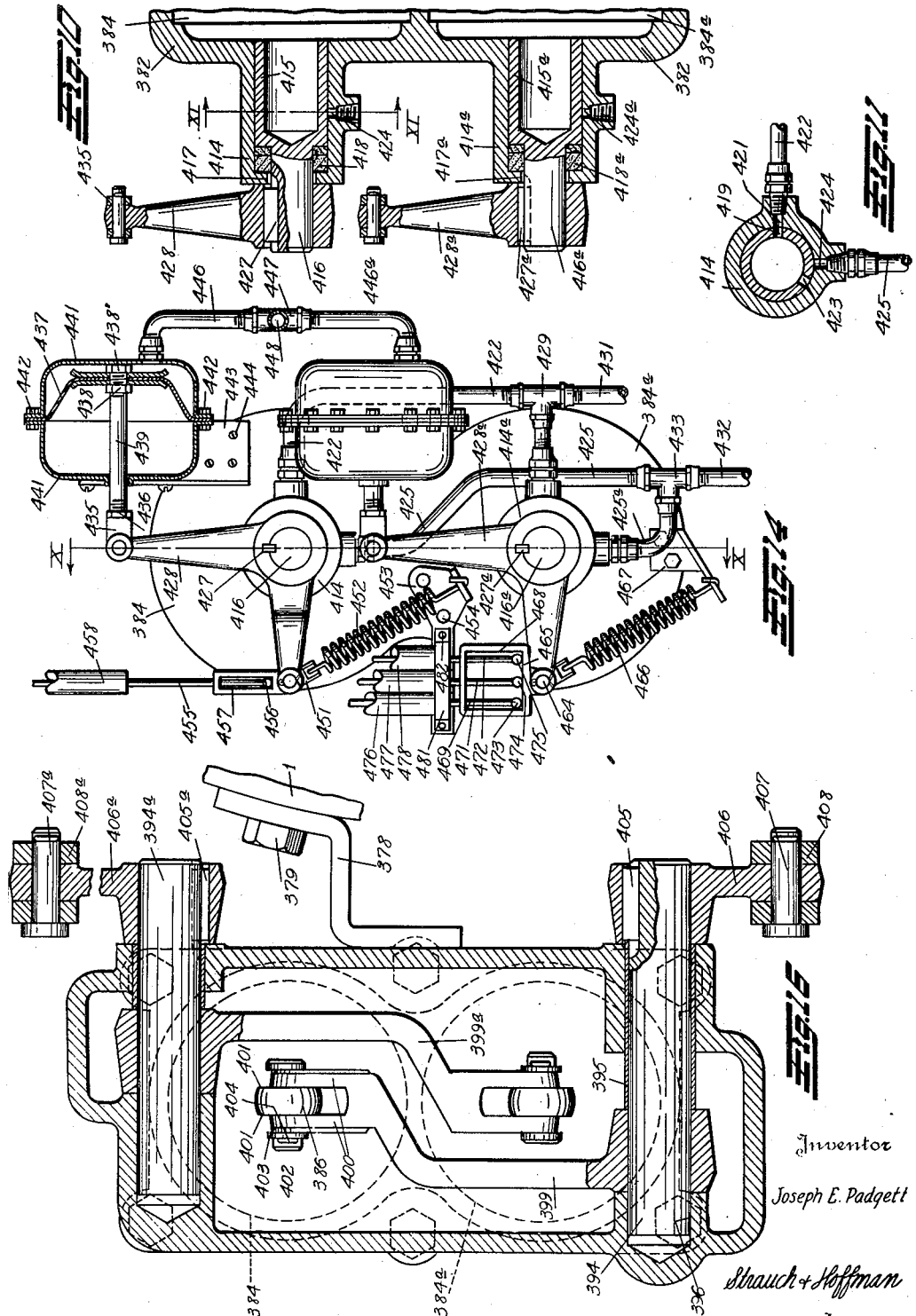

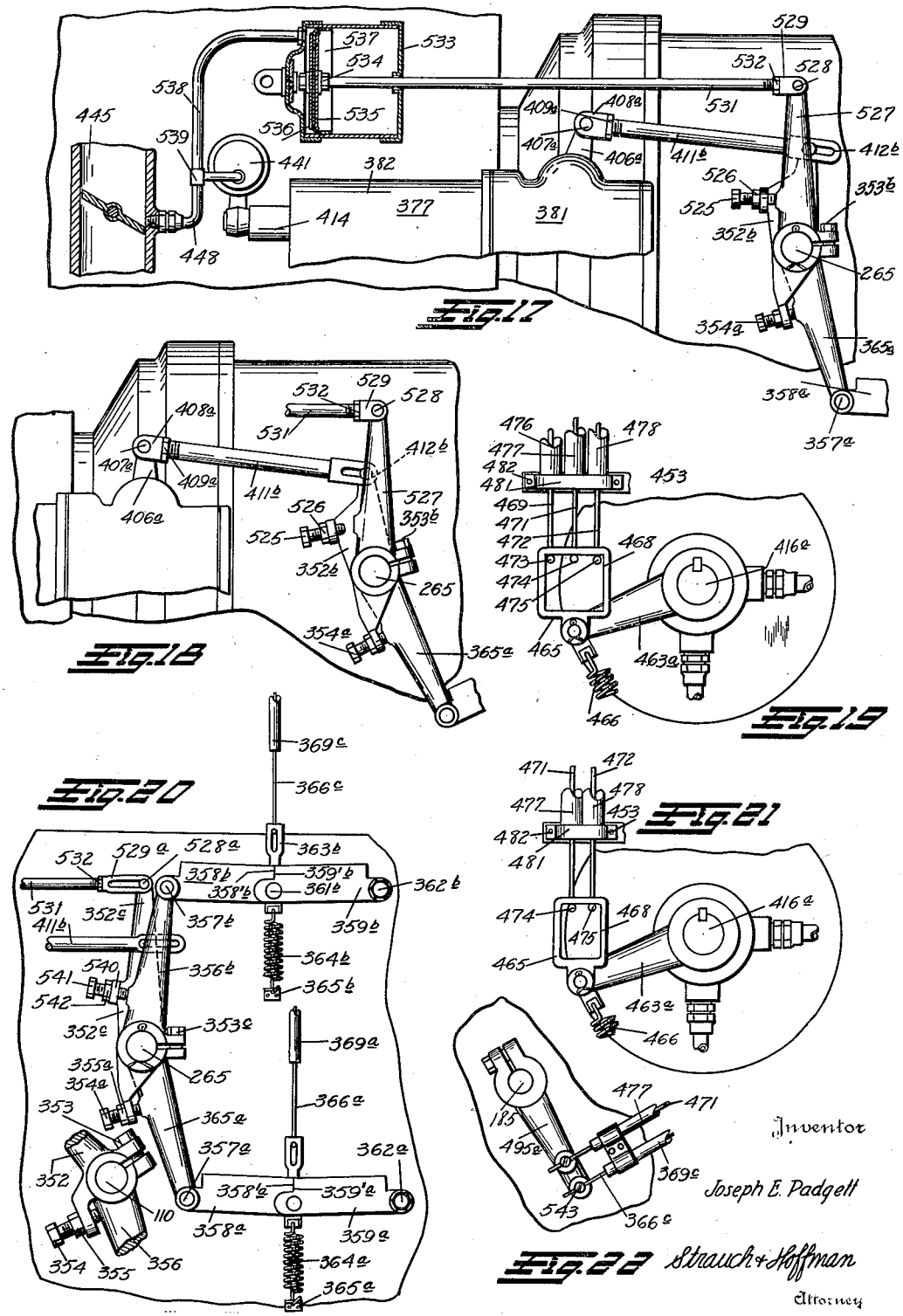

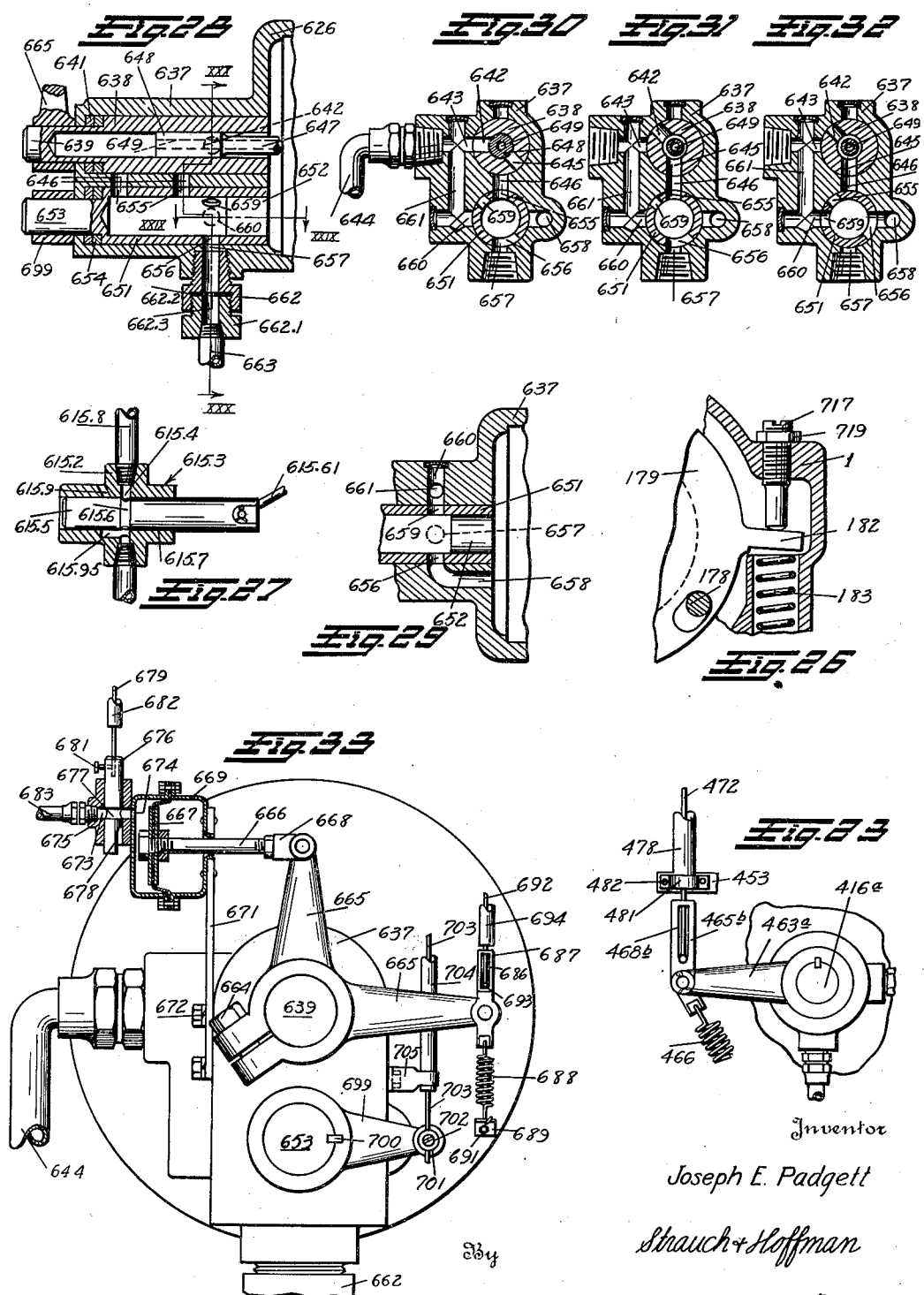

June 30, 1936. J. E. PADGETT 2,045,613
AUTOMATIC POWER TRANSMITTING MECHANISM
Filed Feb. 9, 1934 8 Sheets-Sheet 8
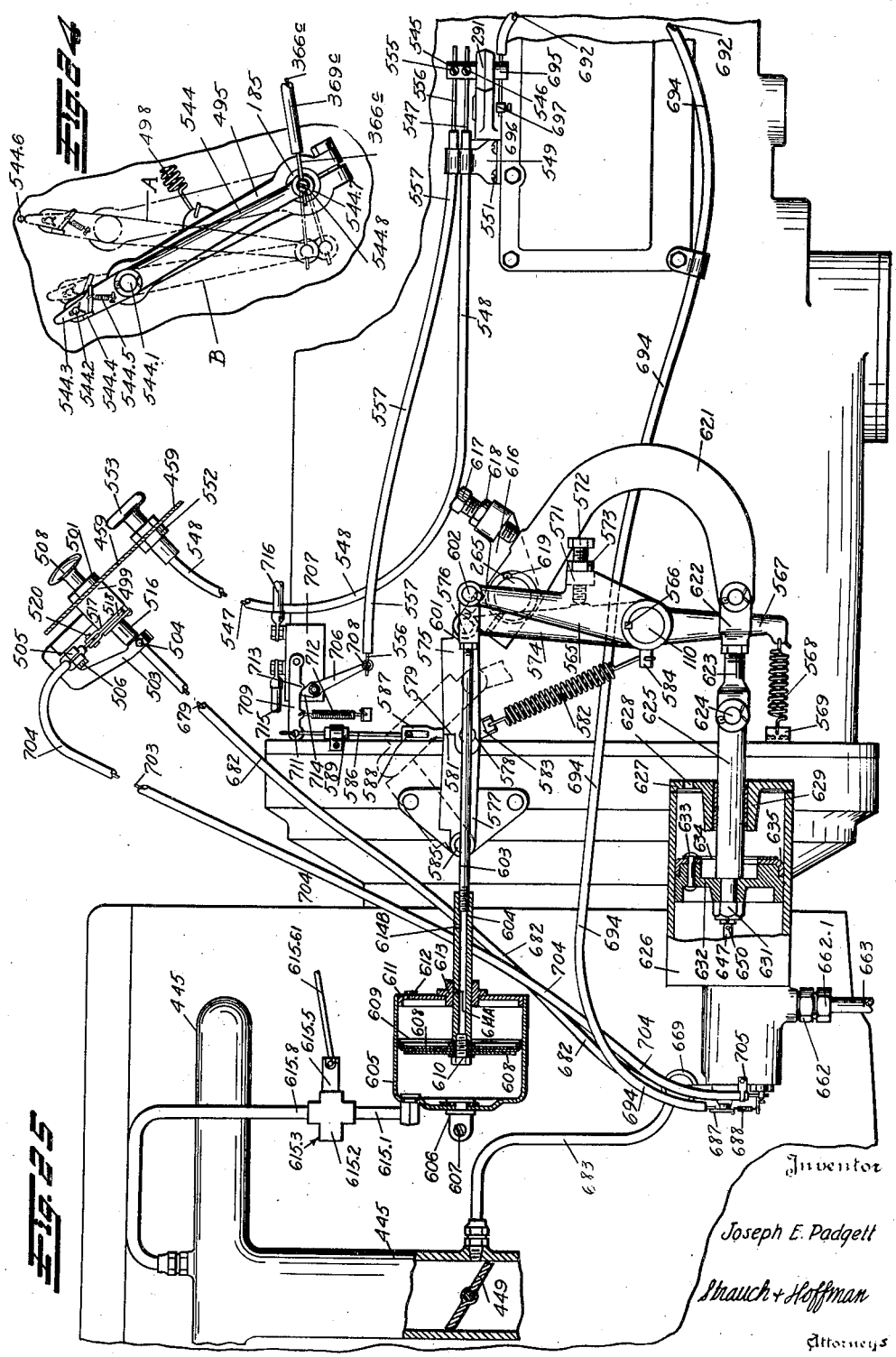
Inventor
Joseph E. Padgett
Strauch + Hoffman
Attorneys

UNITED STATES PATENT OFFICE 2,045,613

AUTOMATIC POWER TRANSMITTING MECHANISM

Joseph E. Padgett, Toledo, Ohio

Application February 9, 1934, Serial No. 710,558

36 Claims. (Cl. 74—260)

The present invention relates to mechanisms for transmitting power from a driving member to a driven member.

More particularly, my invention relates to automatic transmissions of the general character wherein during their normal automatic operation they deliver power from the driving to the driven member through a torque multiplication when the prime mover is initially starting or picking up the load, and which automatically establish a direct drive, or deliver power from the driving to the driven member with a lower value of torque multiplication, when the load has been accelerated sufficiently for the prime mover to adequately handle it with such torque multiplication.

It is a primary object of my invention to devise an automatic transmission which will normally transmit power from a driving member to a driven member through a torque multiplying drive when the magnitude of the torque transmitted therebetween is comparatively large, and which will establish a direct drive between the driving and driven members when the magnitude of the torque transmitted from the driving to the driven member attains a predetermined value.

It is another major object of the present invention to devise an automatic transmission that will normally transmit power from a driving member to a driven member through a torque multiplying drive when the members are rotating at comparatively low speeds, and which will automatically change the torque multiplication of the drive when the torque transmitted thereby attains a predetermined value.

Another important object of the present invention resides in the provision of power transmitting mechanisms of the character wherein a driving member and a driven member are connected, for power transmission, by a torque multiplying mechanism, with means for automatically controlling the torque multiplying mechanism when the magnitude of the torque transmitted thereby attains a predetermined value.

Another important object of the present invention resides in the provision of power transmitting mechanisms of the character wherein a driving member and a driven member are connected, for power transmission, by a torque multiplying mechanism, with means for automatically establishing a direct drive between the driving and driven members when the magnitude of the torque transmitted by the torque multiplying mechanism falls to a predetermined value.

A further object of my invention is to devise an automatic transmission which will transmit power between a driving member and a driven member through a torque multiplying drive when the magnitude of the torque thereof is comparatively low, which will transmit power from the driving to the driven member through a drive having decreasing values of torque multiplication when the magnitude of the torque transmitted from the driving to the driven member attains a predetermined value, and for automatically establishing a direct drive between the driving and driven members when the torque multiplication of the drive attains a predetermined value.

Another object of the present invention resides in the provision of power transmitting mechanisms of the character wherein a speed responsive clutch is employed to control a torque multiplying mechanism which interconnects a driving member and a driven member, with means for introducing a torque responsive phase into the engaging operation of the speed responsive clutch.

Another object of the present invention resides in the provision of power transmitting mechanisms of the character wherein a speed responsive clutch is employed to control a torque multiplying mechanism which interconnects a driving member and a driven member, with means, adapted to be controlled in accordance with the magnitude of the torque transmitted between the driving and driven members, for modifying the engaging operation of the speed responsive clutch.

My invention also aims to provide power delivering organizations of the character wherein a prime mover is connected to a mechanism which is operable to establish a forward or reverse drive between the prime mover and a load, with means for automatically actuating the mechanism so as to disconnect the prime mover from the load when the prime mover is stopped.

Another object of my invention is to provide automatic transmission of the character having mechanism which is operable to connect it to a prime mover and a load, and which has a clutch for normally automatically coupling certain parts of the mechanism, with means for rendering the clutch inoperative unless the mechanism is operated to connect the prime mover and the load.

A further object of my invention resides in the provision of power transmitting devices of the character wherein a driving and a driven shaft are connected by a mechanism having a plurality of speed responsive clutches associated therewith, with means for causing the clutches to engage when the driving member is decelerated below a predetermined speed.

It is another object of my invention to devise, for use in power delivery organizations of the character wherein a speed responsive clutch is adapted to establish a driving connection between a driving member and a driven member, with means, responsive to the magnitude of the torque transmitted between the driving and driven members, for modifying the speed responsive action of the clutch.

It is another object of my invention to devise, for use in power delivery organizations of the character wherein a speed responsive clutch is adapted to establish a driving connection between a driving member and a driven member, with means, responsive to the magnitude of the torque transmitted between the driving and driven members, for modifying the speed responsive action of the clutch, and which may be operative to render the clutch solely speed responsive.

It is a further object of my invention to devise, for use in power transmitting organizations of the character wherein a mechanism, having a driving member and a driven member, is adapted to connect a prime mover with a load, a device, which is responsive to the speed of the prime mover and the driven member, and which is also responsive to variations in the magnitude of the torque exerted upon one of the members, for controlling the mechanism.

Another object of the present invention is to provide a driving member and a driven member with a mechanism for automatically transmitting power therebetween, which is responsive to the speed of the driving member, and which is adapted to have its operating characteristics automatically modified in accordance with the magnitude of the torque impressed upon the driving member.

It is another object to devise, for use in power delivery organizations of the character wherein a torque varying mechanism is adapted to transmit power from a prime mover to a load, means, which is responsive to the attainment of certain conditions in the prime mover for controlling the torque varying mechanism.

A still further object of my invention resides in the provision of power delivery mechanisms of the character wherein a prime mover and a load are adapted to be selectively connected through a power transmitting device, with means for making it impossible to start the prime mover when the devise is disposed in power transmitting condition.

It is another object of the present invention to provide a clutch of the character which is normally disengaged at low speeds, which automatically engages at higher speeds, and which may be disengaged at any speed, with novel means for selectively or automatically rendering the clutch speed responsive or for producing disengagement thereof.

My invention also aims to devise novel fluid-energy actuated means for maintaining the parts of an automatic clutch in automatic position, which is so designed that should fluid escape therefrom, the parts will nevertheless be maintained in operative position.

It is a further object of my invention to so design an automatic transmission of the character which automatically effects a transition from a torque multiplying drive to a direct drive when the parts attain a predetermined speed, that the transition from direct to torque multplying drive may be selectively prevented, whereby the transmission may be maintained in direct drive, irrespective of the speed attained by the parts.

Further objects of my invention will appear as the detailed description thereof proceeds in connection with the accompanying drawings, and from the appended claims.

In the drawings,

Figure 2 is a fragmental sectional view of the primary clutch shown in Figure 1, and illustrates the pressure and hold-back spring assembly thereof.

Figure 3 is a sectional view taken on line III—III of Figure 1, illustrating the parts as they appear when viewed in the direction of the arrows.

Figure 4 is a sectional view taken on the line IV—IV of Figure 1, looking in the direction of the arrows.

Figure 5 is a sectional view illustrating the one-way clutch and is taken on the line V—V of Figure 1, looking in the direction of the arrows.

Figure 6 is an elevational view of a portion of the transmission, with parts in section, and illustrates the parts as they appear when the transmission is viewed from the side opposite that to which it is viewed in Figure 1.

Figure 7 is an elevational view of the transmission illustrated in Figure 1 as it appears when it is associated with an internal combustion engine and with a controlling mechanism forming part of the present invention, and in order to facilitate an understanding thereof, certain parts have been broken away to illustrate the construction of certain elements.

Figure 8 is a detailed sectional view of the fluid operated gear shifting mechanism illustrated in Figure 7.

Figure 9 is a fragmental detailed view of a part of the valve mechanism illustrated in Figure 8.

Figure 10 is a fragmental sectional view of the valves associated with the power cylinders shown in Figure 7.

Figure 11 is a detailed sectional view taken on line XI—XI of Figure 10, looking in the direction of the arrows.

Figure 12 is a fragmental sectional view of the fluid distributing and pressure controlling unit associated with the fluid supply device illustrated in Figure 7.

Figure 13 is a sectional view, on an enlarged scale, of the manually operable controlling mechanism shown in Figure 7.

Figure 14 is an elevational view of the controlling mechanism associated with the cylinders and valves illustrated in Figures 7 and 10, as viewed from the left hand side of Figure 7, and parts have been broken away in order to more clearly illustrate the structure involved.

Figure 15 is a detailed sectional view of the controlling device illustrated in Figure 13.

Figure 16 is a sectional view taken on line XVI—XVI of Figure 7, looking in the direction of the arrows.

Figure 17 is a view similar to Figure 7, but shows a modified form of controlling mechanism also forming part of the present invention associated with the transmission, and as many of the parts are identical in structure and function to those illustrated in previous forms of the invention, they have been, for the most part, broken away while others have been omitted.

Figure 18 is a fragmental view similar to Figure 17, but illustrates the parts as they appear when the power piston of the secondary clutch is disposed in its right hand, or clutch disengaging position, and with the latch unlocked.

Figure 19 is an end view of the secondary clutch operating cylinder utilized in the device shown in Figure 17, and illustrates the controlling mechanism associated with the valve thereof.

Figure 20 is a fragmental elevational view similar to Figures 7 and 17, but illustrates a further modified form of controlling mechanism forming part of my invention as being associated with the transmission.

Figure 21 is an end view of the secondary clutch operating cylinder utilized in the device shown in Figure 20.

Figure 22 is a fragmental elevational view of the torque-controlled lever assembly employed in the device shown in Figure 20.

Figure 23 is an end view of the secondary clutch power cylinder utilized in the device shown in Figure 20, and illustrates a modified form of controlling mechanism for the valves thereof.

Figure 24 is a fragmental elevational view of the torque-controlled lever assembly utilized with the controlling mechanism shown in Figure 23.

Figure 25 is a view similar to Figure 7 but illustrates a further modified form of controlling mechanism for the transmission, also forming part of the present invention.

Figure 26 is a fragmental sectional view of the overrunning clutch carrier, and is similar to Figure 4, but it illustrates a modified form of mechanism associated therewith.

Figure 27 is a sectional view on an enlarged scale of the accelerator-controlled valve illustrated in Figure 25.

Figure 28 is a longitudinal sectional view through the valve portion of the power cylinder shown in Figure 25 and illustrates the upper valve in pressure position and the lower valve in bleeding position.

Figure 29 is a fragmental sectional view taken on the line XXIX—XXIX of Figure 28, and illustrates the valve in pressure position.

Figure 30 is a sectional view taken substantially on the lines XXX—XXX of Figure 28 and illustrates the upper valve in pressure position, and the lower valve in bleeding position.

Figure 31 is a view similar to Figure 30, but illustrates the upper valve in bleeding position.

Figure 32 is a view similar to Figure 31, but illustrates the lower valve in pressure position.

Figure 33 is a left hand end view of the power cylinder assembly shown in Figure 25, and illustrates the controlling mechanism therefor, with the upper valve shown in pressure position and with the lower valve in bleed position.

Figure 34 is a fragmental elevational view, with parts broken away, of another power transmitting mechanism forming part of my invention.

With continued reference to the drawings, wherein like reference characters designate like parts throughout the several views thereof, my novel power transmitting mechanism is enclosed in a housing denoted generally at 1.

Figure 1:
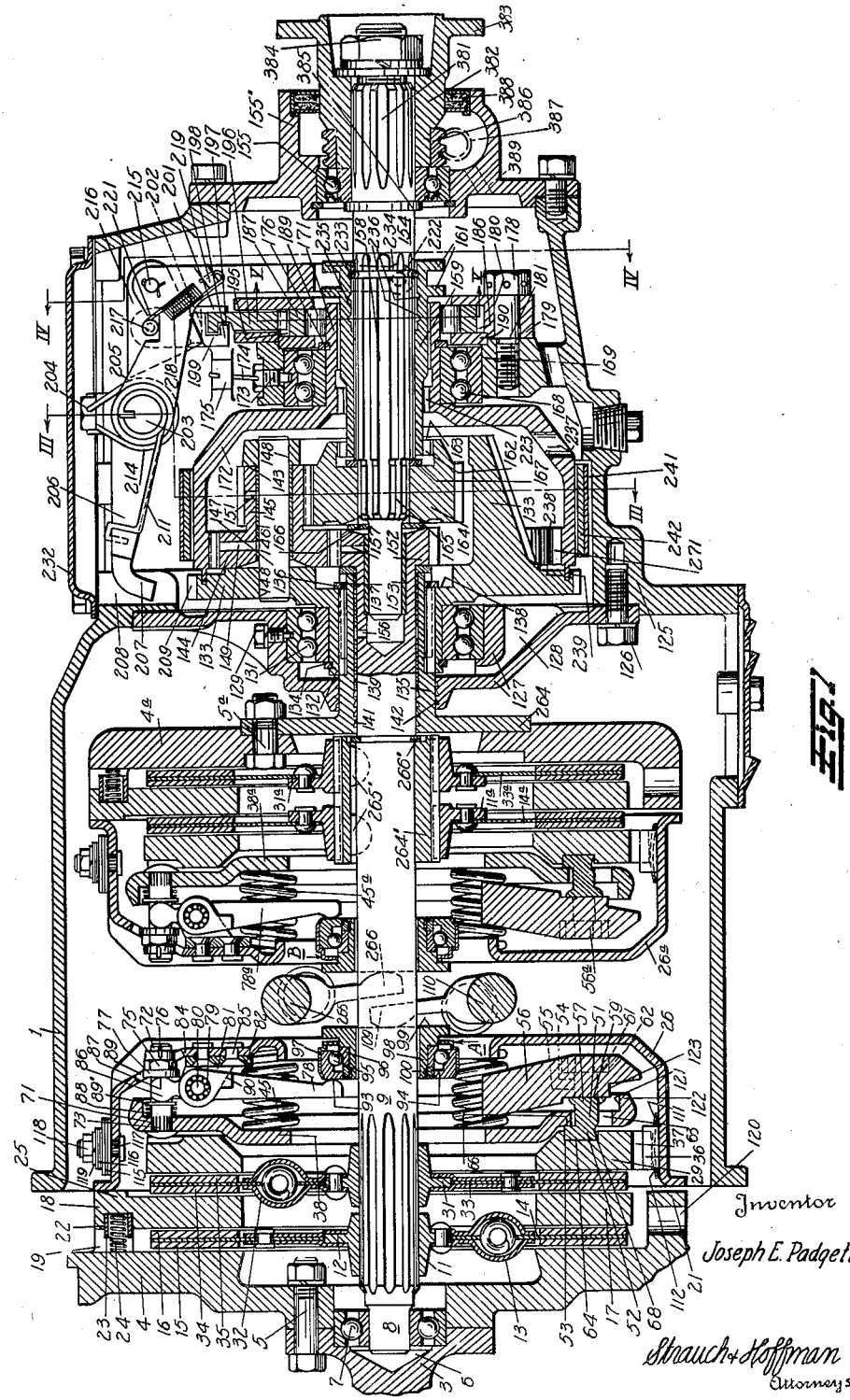
Figure 1 is a longitudinal sectional view of a power transmitting mechanism forming part of my invention, and the mechanism in the gear casing is illustrated as having been rotated 90° about the axis of the mechanism in an anti-clockwise direction when the device is viewed from the left hand side of the figure, in order to clarify the disclosure.

The mechanism, when broadly considered, consists of a low speed, or primary, clutch which is adapted to initiate the drive through a torque multiplying mechanism, and a high speed, or secondary, clutch which is adapted to establish a direct drive between the prime mover and the load when the latter has been accelerated to a predetermined speed. The description of the various parts will accordingly be divided into separate parts, so as to facilitate understanding the various phases of the invention. The primary clutch will be considered first.

Primary clutch

A driving shaft 3 is adapted to have rotational efforts applied to it by a suitable prime mover in any desired manner, and in the present instance, it is shown as constituting the crank shaft of an internal combustion engine. The flanged end of shaft 3 is secured to a flywheel 4 by bolts 5, or in any other suitable manner. Bolts 5 extend through aligned apertures in the flywheel and the flange of shaft 3, and have nuts turned thereon.

Shaft 3 is further provided with a bore 6 in which is carried a bearing assembly 7 for supporting the reduced end 8 of a shaft 9. The rear end of shaft 9 is adapted to be journalled in a bearing assembly that will be described hereinafter.

A hub 11 is splined upon shaft 9 and is provided with a flange 12. Operatively secured to flange 12, by means of rivets or the like, is a vibration dampener designated generally by reference character 13 which provides a resilient driving connection between hub 11 and a driven disc 14. This vibration dampener is employed to dampen out any torsional vibrations that may be set up in the crank shaft of the engine, and in view of the fact that it forms no part of the present invention, it will not be further described.

Facings 15 and 16 are secured to opposite sides of disc 14 near its periphery, and they may consist of any material that has the required characteristics to give the correct frictional gripping force, and at the same time has wearing qualities adapting it for this purpose. I prefer, however, to use the types of material which in practice have given very satisfactory results in automatic slipping drive and clutch mechanisms of the "Powerflo" type. One form of material, embodying colloidally associated copper particles and powdered graphite, is disclosed in co-pending application Serial Number 685,603, filed August 17, 1933, and which is particularly suitable for use in the present mechanism. Frictional facings 15 and 16 may be secured to disc 14 in any suitable manner, as, for instance, by rivets or the like, and they, along with disc 14, will be hereinafter referred to as a driven member. Facings 15 and 16 may be annular discs, but they are preferably formed as segments and secured to disc 14 in circularly spaced relation, in order to provide a flow of cooling air currents over the faces of their cooperating plates, in a manner that will presently be set forth.

Facing 15, secured to disc 14, cooperates with the flat driving face of flywheel 4 and is adapted to be frictionally driven thereby. Facing 16, cooperates with a plate 17, which will be hereinafter termed the intermediate plate, and it is adapted to engage and clamp the driven member between it and the flat face of the flywheel. Plate 17 is of substantial thickness so that it may possess a sufficient degree of rigidity to prevent undesirable distortion and warpage thereof under the pressures and temperatures that it is subjected to during operation of the mechanism.

Intermediate plate 17 is driven by the flywheel through the intermediary of driving lugs 18, which are preferably three in number and are integrally formed with plate 17. Lugs 18 are disposed in sliding engagement with the walls of recesses 19 which are formed in rim portion 21 of flywheel 4. Each lug 18 is provided with a recess 22 into which is frictionally fitted a sleeve 23. Comparatively light compression springs 24 are disposed in sleeves 23 and act against the flywheel so as to force plate 17 away therefrom. Although I prefer to associate springs 24 with lugs 18, it is to be understood that they may be located so as to act against any other suitable portion of plate 17 without departing from the spirit of the present invention.

Movement of plate 17 away from the flywheel is limited by engagement of boss portions 25, formed on lugs 18 thereof, with a cover member 26.

Cover member 26 is secured to the flywheel rim portion 21 by means of cap screws 27, and it is provided with embossed portions 28 in the regions of cap screws 27, for the purpose of spacing the cover from the flywheel rim for a purpose that will presently appear.

Cooperating with plate 17, and with an automatic plate 29, is a second driven member, comprising a hub 31; a vibration dampener 32 and a driven disc 33, carrying facings 34 and 35. Secured to the inner walls of cover 26, by means of a spot welding operation or the like, are preferably three symmetrically arranged driving lugs or key members 36. Key members 36 are received in, and cooperate with the walls of recesses 37 formed in automatic plate 29 to establish a driving connection between flywheel 4 and the automatic plate.

Disposed parallel to plate 29 is a plate 38, and it will be hereinafter referred to as a reaction plate, because it takes the reaction of a speed responsive mechanism in a manner to be presently described. Reaction plate 38 is driven by automatic plate 29 through the medium of a plurality of cap screws 39. Referring particularly to Figure 2, each cap screw 39 is provided with a reduced end 41 that is threaded into automatic plate 29, and the thread employed is preferably of the Dardelet or other self-locking type so as to prevent the cap screws from working loose in operation. Cap screws 39 extend through, and lie in slidable driving engagement with the walls of recesses 42 formed in reaction plate 38, and are encircled by washers 43 and compression springs 44. Springs 44 act against the heads of screws 39 and react against plate 38, to thereby urge the automatic and reaction plates toward each other at all times, and they will be hereinafter referred to as holdback springs. The holdback spring assemblies are preferably symmetrically disposed in pairs about the periphery of the plates, and in the present instance six are employed, but it is to be understood that more or less than six properly designed holdback spring assemblies may be used if designed without in any way departing from the spirit of my invention. The holdback assemblies accordingly establish a driving connection between the automatic and reaction plates, and, at the same time, resiliently urge them toward each other.

Reaction plate 38 is normally urged toward the flywheel by a plurality of compression springs 45, which are retained in position against plate 38 by means of bosses 46 formed on the latter. Springs 45 react against the surface of cover 26, and are centered thereon by means of pressed out portions 47 formed in cover 26. Springs 45 are preferably six in number and are disposed in substantially common radii with the holdback assemblies. Reaction plate 38, however, is normally held in the position shown in Figure 1, when the driving shaft is operating at or below the idling speed of the engine or other prime mover, by means of a throwout mechanism that will presently be described.

Before proceeding to the description of the actuating mechanism for the automatic plate, it should be understood that, although I have illustrated the surfaces that engage facings 15 and 16 as plane in configuration, they may be grooved in the manner shown in my co-pending application, Serial Number 669,766, if desired.

The automatic and reaction plates may be actuated away from each other, by any suitable speed responsive mechanism, to produce clutch engagement, but in the present embodiment of my invention, it preferably takes the form of a centrifugally operable mechanism. Preferably three weight levers 51, having integrally formed heads 52, are symmetrically arranged between the pairs of pressure springs 45, and have their heads 52 received in rectangular recesses 53 formed in automatic plate 29.

Each lever 51 is provided with a pair of threaded portions 54, which are received in a pair of apertures 55 located in a weight element 56. A reinforcing portion 57 is preferably formed on each lever 51, and is provided with a flat surface 59 that is adapted to abut the surface of weight 56. Weights 56 are held in place on levers 51 by means of nuts 61, turned on portions 54, and seating in countersinks 62 formed in weights 56.

Levers 51 are of substantial width and extend through recesses 63 formed in reaction plate 38. Heads 52 are provided with flat faces 64 that normally abut the bottoms of recesses 53 when the driving shaft is operating at, or below, idling speed, and by the term "idling speed", I mean the particular desired automatic uncoupling or disengaging speed of shaft 9, and if an internal combustion engine is employed as the prime mover, the idling speed will lie in the neighborhood of four hundred to five hundred revolutions per minute.

Heads 52 are also provided with reaction faces 66 which abut the face of reaction plate 38 at all times, and are designed for fulcruming engagement therewith during operation of the weights. The surface of plate 38 that cooperates with faces 66 of weight heads 52 may, if desired, be ground and polished so that relative sliding movement thereof may occur with a minimum of friction.

Heads 52 have their outer sides relieved to provide knife-like edges 68 which are adapted to rock or pivot in the dihedral angles defined by the bottom and outer faces of recesses 53 formed in automatic plate 29. The relieving operation enables a good knife edge 68 to be formed on each weight head, and allows pivotal movement thereof without interference from the outer side walls of recesses 53. However, it is to be understood that unrelieved weights may be employed in recesses that are suitably designed so as to have relieved outer side walls, if desired. It is also to be understood that, instead of providing individual recesses 53 for cooperation with the weight heads, a single annular groove, as shown in my co-pending application, Serial Number 660,179, filed March 9, 1933, may be formed in automatic plate 29 if desired.

Recesses 53 are formed in automatic plate 29 in any desired manner, as, for instance, by a milling cutter or the like, and weight heads 52 are prevented from moving longitudinally within the recesses so formed by the engagement of the walls of recesses 63 formed in plate 38 with the sides of lever 51. Heads 52 fit rather snugly between the inner and outer side walls of recesses 53 so that they are restrained from shifting bodily inwardly or outwardly, thereby insuring dynamic balance of the mechanism at all times. Knife edges 68 are adapted to cooperate with the flat bottom faces of recesses 53 and thereby act in line contact upon plate 29 for a substantial distance across the face thereof, whereby uniform distribution of pressure over a substantial area thereof is effected.

The mass of weights 56, and the number of weights and lever assemblies employed in a particular installation is determined by a consideration of the required pressure that they must transmit under the desired speed conditions to urge the clutch plates into final non-slipping engagement. In the clutch mechanism shown, three equally spaced weight assemblies are preferably employed.

When shaft 3 is stationary, or is operating at or below a speed corresponding substantially to the idling speed of the prime mover employed to drive it, the parts assume the positions in which they are shown in Figure 1. Heads 52 of levers 51 are clamped between plates 29 and 38, under the influence of springs 45 acting against plate 38, and cap screws 39, and plate 38 is held in the position shown, against the action of springs 45 by means of a throwout mechanism that will be described hereinafter.

Extending through apertures 71 formed in plate 38, and preferably symmetrically disposed between the weight assemblies, are a plurality of bolts 72. Bolts 72 are provided with knurled portions 73, and as bolts 72 are driven into plate 38, they serve to hold bolts 72 against rotation. Castle nuts 75 are threaded on bolts 72 and are adapted to be held in adjusted positions thereon by means of cotter pins 76. Washers 77 are disposed on bolts 72 and cooperate with clutch fingers 78 to produce movement of plate 38 away from the flywheel. Fingers 78 are pivoted on roller or needle bearings 79 journalled on pins 80 secured in spaced ears 81 formed on bracket members 82. Pins 80 are preferably held in position in ears 81 by means of cotter pins or the like, and brackets 82 are secured against pressed in portions 84 of cover 26 by means of rivets 85 or the like. Fingers 78 are provided with bifurcated portions 86, and the latter have curved faces 87, that cooperate with washers 77 in a manner to be presently described. Bolts 72 are also encircled by light compression springs 88 and washers 89' and the latter are urged into contact with levers 78 to hold the latter against rattling when they are not under the influence of springs 45.

Bolts 72 and nuts 75 are adapted to partially extend through apertures 89 formed in cover 26, and the apertures are preferably of a size sufficient to allow a wrench or the like to be applied to nuts 75 for clutch adjustment purposes.

Levers 78 are provided with weight or mass portions 90, which function to balance the levers and prevent them from responding to centrifugal force and tend to impart declutching movements to the clutch parts.

Movement of the inner ends of fingers 78 to the left in Figure 1, through the intermediary of bolts 72, causes movement of plate 38 away from the flywheel against the action of springs 45. Movement of the reaction plate produces similar movement of plate 29 because the holdback assemblies hold the two plates in unitary relationship at all times. Fingers 78 are adapted to be actuated in this manner by means of a throwout assembly that will now be described.

Cooperating with curved faces 93 formed on fingers 78 is the flat face of a ball race 94, which cooperates with anti-friction balls 95 disposed between race 94 and a cooperating ball race 96. Ball races 94 and 96 are held in assembled relation with respect to each other by means of a combined retainer and reservoir defining member 97. The bearing assembly is preferably packed with lubricant during assembly. Ball race 96 is rigidly mounted upon a sleeve 98 which is mounted for rotative as well as axial movement on shaft 9.

The bearing assembly just described will be hereinafter referred to as bearing or throwout assembly A, and a sealing member 100 is secured to sleeve 98 and frictionally cooperates with ball race 94 so as to retain the lubricant in the bearing. Sleeve 98 is provided with a smooth throwout fork engaging face 99, which cooperates with a throwout fork 109 rigidly carried by a throwout shaft 110. Shaft 110 is preferably journalled in, and extends outwardly of clutch housing 1, and is adapted to be actuated by mechanism to be hereinafter described.

Although I have disclosed a specific throwout assembly in connection with my invention, it is to be understood that any suitable throwout mechanism having a face that is substantially normal to the clutch axis for cooperating with the inner ends of fingers 78 may be employed if desired, and a thoroughly practical mechanism obtained.

With reference to the automatic and reaction plates, it is observed that they are "keyed" together, or connected together for synchronous rotation by means of the holdback assemblies, and reaction plate 38 is in fact carried by automatic plate 29. Weights 56 are also carried by the automatic plate, and as this weight and plate organization is of comparatively great mass, movement thereof radially, or in any direction other than parallel to the axis of the mechanism, results in static as well as dynamic unbalance thereof, and as a matter of fact, it has been found in practice that for the clutch mechanism illustrated, a radial or sidewise movement of four one-thousandths of an inch of these elements represents approximately two inch-ounces tending to unbalance the mechanism.

In order for the plate and weight assembly to function properly, it must be capable of undergoing free axial movement. By designing driving lugs 36 and recesses 37 so as to provide sufficient play to permit this action, sufficient lost motion is usually introduced into the plate organization to permit it to undergo a slight radial movement, and this results in the unbalanced condition just described.

In order to eliminate this difficulty, the plate and weight organization is so designed, that it is in substantial or complete static and dynamic balance when the automatic plate is located on one side of the mechanism, i. e., with the walls of recesses 37 in close contact with two of the driving lugs 36, and means consisting of a bowed leaf spring 111, having an aperture 112, which fits over and is held in place by one of the driving lugs 36, is provided for maintaining the assembly in this condition during all phases of operation of the mechanism, with the result that it is balanced at all times. In view of the simple design of the present clutch mechanism, the parts thereof may be manufactured by low-cost, quantity production methods, and yet provide plate and weight organizations whose mass is fairly symmetrically distributed. Spring 111 acts against and applies pressure to flat portions of plate 29, located either side of recess 37.

In view of the fact that spring 111 exerts a frictional resistance against only one side of plate 29, engaging and disengaging movements of the latter axially of the mechanism are yieldingly resisted or retarded to some extent, which may result in the automatic plate tilting slightly as it undergoes movement into and out of engagement with facing 35. This is an advantage rather than a disadvantage, however, because the slight tilting action which takes place is not sufficient to unbalance the mechanism, especially at the comparatively low speed at which engagement occurs, and the resulting initial partial and progressive engagement of automatic plate 29 with facing 35, as weights 56 rock outwardly, imparts extremely smooth operating characteristics to the mechanism and produces a "cushion disc" action. When the clutch is fully engaged, the plates are not tilted, but are disposed parallel to each other and normal to the axis of the mechanism, so that the mechanism does not vibrate, even at high speeds. Spring 111 accordingly maintains the parts in balance condition at all times, and yet, in view of its resilient nature, it does not interfere with free axial and slight tilting movements of automatic plate 29.

In order to provide dynamic and static balance of the mechanism as a whole, I provide balance assemblies which are preferably secured to the outer cylindrical portion of cover 26, and they are preferably symmetrically located between the weight assemblies or radially outwardly beyond levers 78. Each balance assembly preferably consists of a pair of main or principal weight members 115, which take the form of washers; and a plurality of auxiliary weight members 116 which consist of small washers in the present embodiment of the invention; which are held in place by means of a bolt 117, passing through an aperture in cover 26, a nut 118 and a lock washer 119.

The mass of the balance assemblies depends upon the nature of the particular clutch mechanism and the dimensions and mass of the parts thereof. In the particular clutch illustrated, three symmetrically arranged balance assemblies of the size shown are employed and their mass is such as to offset the concentrated mass represented by the weight assemblies and render the mechanism both statically and dynamically balanced. In the event that after the balance assemblies are applied to the mechanism, the latter is still out of either static or dynamic balance or both, because of unsymmetrical mass distribution caused by manufacture of the parts by low-cost, quantity production methods, one or more washers 119 may be removed from or added to one or more of the balance assemblies to bring about proper balance of the mechanism.

The provision of the present balance mechanism materially reduces the cost of producing clutch mechanisms of the manual or automatic type because their parts may be cheaply made without regard to their mass or dimensions, and if, upon assembling the mechanism, it is found that it is out of balance, either statically or dynamically, it can be readily brought into balance in the manner just described.

Shaft 110 is preferably adjustably held by any suitable mechanism in such a position that the throwout bearing assembly will hold the parts in the positions in which they are shown in Figure 1 when driving shaft 3 is stationary or is operating at or below a predetermined idling speed of the prime mover utilized therewith when it is desired to obtain speed responsive clutch operation. Under these conditions, a clearance exists between the plates and there is accordingly no driving connection between shafts 3 and 9. Any suitable latch mechanism may be associated with shaft 110 or the clutch pedal for holding shaft 110 in this position, for instance a latch of the type disclosed in my copending application, Serial No. 660,179, filed March 9, 1933, and which may be referred to for a full disclosure thereof, but I preferably employ a power operated device which will be hereinafter described. The throwout bearing assembly is shown in Figure 1 in what is termed its "automatic" position, and is so termed because it is preferably disposed in this position when the clutch mechanism functions, or is being employed as an automatic or speed responsive clutch.

Shaft 110 may be actuated to move the throwout bearing assembly to the left of the position shown in Figure 1, for declutching the mechanism in a manner to be hereinafter pointed out.

The throwout shaft also may be operated to allow the throwout bearing to move to the right of the position illustrated in Figure 1, into what is termed its manually engaged position, and allow springs 45 to bring the plates into driving engagement.

With throwout mechanism A disposed in automatic position, the speed responsive operation of the primary clutch is as follows:

*Automatic operation of primary clutch*

Acceleration of shaft 3 slightly above the idling speed of the prime mover does not cause actuation of the weights because springs 44 hold them in check. As driving shaft 3, and flywheel 4 are accelerated to a speed substantially in excess of idling speed, which is determined by the strength of springs 44, the mass of weights 56, the proportions of the parts, and other factors, weights 56 gradually swing or rock outwardly about their knife-edges 68 as axes in response to centrifugal force. As this occurs, reaction faces 66 of heads 52 fulcrum and slide on the face of plate 38, and knife edges 68, by virtue of their engagement and fulcruming action upon the flat bottom surfaces of recesses 53 located in automatic plate 29, force the automatic plate away from reaction plate 38 against the action of holdback springs 44, and into engagement with facing 35 of disc 33, on a three-point support, thus causing disc 33 to move axially and bring the facing 34 thereof into contact with intermediate plate 17, which is then moved axially against the action of retractor springs 24, and clamps driven member 14 between it and the flywheel.

Movement of automatic plate 29 away from reaction member 38 is opposed by holdback springs 44, and therefore weights 56 are held under control. Holdback springs 44, therefore, in addition to predetermining the speed of the mechanism at which automatic engaging operation is initiated, exert a steadying influence upon the clutch parts.

After the driven members are thus frictionally clamped or gripped between automatic plate 29, the intermediate plate 17 and flywheel 4, movement of plate 29 is substantially arrested, and further rocking movement of weights 56, in response to a further increase in centrifugal force, causes faces 66 of heads 52 to force reaction plate 38 away from the flywheel against the action of springs 45. Movement of plate 38 in this manner causes pressure to slowly build up in springs 45, and a corresponding pressure is built up between the edges 68 of heads 52, and the bottoms of the recesses in automatic plate 29. This action causes the plate pressure to build up comparatively slowly, with the result that the clutch smoothly picks up shaft 9.

The partial vacuum established by rotation of the parts causes an air stream to be drawn through the relatively large annular passage between cover 26 and the throwout bearing and along the clutch axis. A part of the axial air stream passes over both faces of plate 38 and between plates 38 and 29, and in this connection it should be observed that plates 29 and 38 are substantially thermally isolated, and the air currents passing between them effectively prevent the heat that is generated in plate 29, as the result of its slipping operation, from being transmitted to plate 38, and possibly drawing or harmfully modifying the temper of springs 44 and 45 associated with the latter. Another portion of the air stream passes outwardly between plate 29 and facing 35 when they are disengaged, and the heated, dust-laden air is exhausted from the mechanism through the space between the flywheel and cover 26. If desired, additional openings may be formed in the cylindrical portion of cover 26 for assisting in exhausting the heated dust-laden air from the mechanism, and fan blades or the like associated therewith for drawing the air through the openings. Portions of the axially moving air stream enter openings formed in discs 14 and 33 (not shown), and are discharged radially between the driven members and the intermediate plate and flywheel, and are exhausted from the cover through openings 120 formed in flywheel rim 21, and between cover 26 and the flywheel.

The ventilating and dust-removing air may be introduced into, and exhausted from housing 1 in any desired manner, but I preferably contemplate the use of the organizations disclosed in application Serial No. 606,238, filed April 19, 1932, which have proved to be extremely efficient in practice.

When shaft 3 and flywheel 4 attain a predetermined speed the plate pressure builds up sufficiently to establish a non-slipping drive between shafts 3 and 9. This speed is determined by the magnitude of the torque transmitted by the clutch, as under heavy loads, the speed will be higher than that required to establish a non-slipping drive when the load is light. When a still higher predetermined speed is attained, weights 56 rock out into contact with arcuately shaped stop faces 121 formed on pressed flange portions 122 of plate 38, and are thereby arrested. In order to stop weights 56 in a definite plane that is normal to the mechanism, and thus insure dynamic balance of the device, preferably arcuately shaped stop edges or faces 123 are accurately formed on weights 56. The stops are also designed to stop weights 56 with their centers of mass equidistant from the axis of the mechanism. When the weights have moved into their outermost positions with their stop faces 123 in contact with stop faces 121, the plates are disposed in non-slipping engagement and further acceleration of shaft 3 is ineffective to cause a further pressure to be built up between the plates. The plates are thereby held in non-slipping engagement under a predetermined pressure, and a positive friction coupling exists between shafts 3 and 9.

Stop faces 123 are so located on weights 56, that no matter how great the magnitude of the centrifugal force set up in weights 56 may be, it is incapable of causing the mechanism to exhibit declutching tendencies at high speeds.

With reference to levers 78, they are designed so that, when the clutch is engaged, the masses thereof are so located with respect to their pivots, that the centrifugal forces set up therein, as the result of rotation of the mechanism, do not exert substantial rotative influences in the levers. When the parts are disposed in automatic idling position (Figure 1), the greater portion of the masses of levers 78 is located to the right of their pivots, but this is not a disadvantage, however, because the parts only assume these positions when the mechanism is rotating at low speeds, and the centrifugal forces existing under these conditions are likewise of low magnitude.

*Torque multiplying and related mechanisms*

Secured to boss portion 125, formed on housing 1, in any suitable known manner, as by means of cap screws 126 or the like, is a partition-forming bearing support 127, having a lubricant return passage 128 formed therein. Secured within portion 127 against axial displacement by means of a set screw 129, is the outer race of a bearing assembly 131. The inner race of bearing assembly 131 supports the sleeve-like extension 132 of a planet gear carrier or cage member 133. Sleeve 132 is secured against axial displacement in bearing 131 by a split ring 134 that abuts the inner race thereof, and is sprung into a groove located in sleeve 132. The inner wall of sleeve 132 is splined and cooperates with similar splines located on the outer wall of a secondary clutch sleeve 135. The splines of sleeve 132 abut the left hand ends of the grooves formed in member 135 by the splining operation, and the parts are held in assembled relation by means of a split ring 136, which is sprung in notches 137 located in the splines of member 135, and abuts the bottom of recess 138 formed in member 133.

The rear end of shaft 9 is journalled in bushings 139 or the like located within sleeve 135. Shaft 9 and sleeve 135 are therefore rotatably mounted with respect to each other, and sleeve 135, and sleeve 132 carried thereby are rotatably mounted in bearing assembly 131.

Bearing support 128 constitutes a partition dividing housing 1 into a clutch chamber and a gear or torque multiplying mechanism chamber, and in order to prevent lubricant contained in the gear chamber from leaking into the clutch chamber between shaft 9, sleeve 135 and the bearing support, I have provided oil returning grooves 141 and 142 in sleeve 135 and bearing support 128 that cooperate with shaft 9 and the outer face of sleeve 135 respectively, to return any lubricant that may be disposed between these members to the gear chamber.

Planet gear carrier 133 is provided with recesses 143, which are disposed at preferably 120° intervals and receive the planet assemblies. Each planet gear assembly consists of a large planet gear 144 and a small planet gear 145, which are preferably integrally formed and are rotatably supported on a bushing 146, and a shaft 147. Shaft 147 is supported in aligned apertures 148 located in member 133. Oil ducts 149 and 151 are formed in gears 144 and 145 respectively for the purpose of affording access of gear lubricant to the space between bushings 146 and shafts 147. Gears 144 mesh with a sun gear 152, which is preferably integrally formed on the rear end of shaft 9.

Disposed in axial alignment with shaft 9, and mounted for rotation at its front end in a bushing 153, located in a recess in the rear end of shaft 9, is a driven shaft 154. Shaft 154 may be directly connected to the load handled by the transmission, or it may be connected to a gear reducing mechanism or the like, and it is journalled at its rear end in a bearing assembly 155 secured in an aperture in a cap member 155' which is bolted to housing 1. A coupling member is connected to the rear end of shaft 154, and is adapted to have a universal joint or like drive member secured thereto. A speedometer drive assembly is also located in cap 155' but, as it forms no part of my invention, it will not be described.

Shaft 9 and gear 152 are provided with oil ducts 156 and 157 respectively for the purpose of insuring lubrication of shaft 154 and bushing 153.

The intermediate portion of shaft 154 is provided with splines 158, with which a correspondingly splined sleeve 159 is slidably associated. A pair of spaced flanges 161 are formed on the rear portion of sleeve 159, and are adapted to cooperate with a shifting device to be hereinafter described. Formed on the front portion of sleeve 159 are a plurality of teeth 162, which are shown in Figure 1 as meshing or engaging with a plurality of internal teeth 163 formed in a gear 164. Gear 164 is journalled for rotation on the reduced splined portion 165 of shaft 154, and meshes with planet gears 145. A pair of washer elements 166 and 167 are mounted on shaft 154 and serve to restrain gear 164 against longitudinal movement.

Mounted for rotation in a bearing assembly 168, secured in a cylindrical bearing supporting portion 169 of housing 1 is the sleeve portion 171 of an internal gear 172, that meshes with planetary gears 144. The outer race of bearing assembly 168 is positioned in member 169 by a set screw 173, which in turn is locked by a wire 174 which is secured to a lug 175 formed on housing 1. Sleeve 171 is held against axial displacement within the inner race by a split ring 176 that is sprung into a groove in sleeve 171.

Mounted for limited oscillation upon support 169, by means of cap screws 178 is a ring-like member 179. Screws 178 extend through arcuately shaped slots 180 in member 179 and are provided with shoulders 181 which abut the face of support 169. Screws 178 may accordingly be turned home without frictionally gripping member 179 between their heads and support 169.

Member 179 is provided with a finger or lug 182 which, in this embodiment of the invention, is engaged by a compression spring 183. When the transmission is not transmitting power through the torque multiplying mechanism, the parts assume the positions shown in Figure 4, with member 179 rocked into its furthermost counterclockwise position by spring 183, in contact with screws 178.

Member 179 is adapted to be rocked in a clockwise direction when power is transmitted by the gears in a manner to be hereinafter pointed out and this action is utilized to actuate the secondary clutch controlling mechanism by means of a lever 184, which is rigidly secured to a shaft 185 journalled in housing 1, and which cooperates with a headed member 185', which is secured to lug 182. Shaft 185 extends outwardly of housing 1 and is associated with mechanism that will be described hereinafter.

Member 179 is provided with an annular recess 186 which is adapted to rotatably support a backstop mechanism for an overrunning clutch. Rotatably mounted in member 179 is a clutch member 187, having recesses or cam pockets 188 formed in its interior. Overrunning clutch rollers 189 are disposed in recesses 188 and are adapted to cooperate with the outer face of sleeve 171. Rollers 188 and member 187 are restrained against left hand axial movement by means of a ring 190 which is disposed between cooperating seats formed in members 169 and 179.

Referring to Figure 5, the outer faces 191 of recesses 188 are so inclined that counterclockwise rotation of sleeve 171 with respect to member 187 tends to wedge rollers 189 between it and faces 191, and thereby lock sleeve 171 against rotation. Plungers 192, slidably mounted in recesses in member 187, are actuated by springs 193 to urge rollers 189 into wedging or locking relationship with sleeve 171 and faces 191. Mounted on a pin 193' secured to member 179, and adapted to oscillate in a guideway 194 formed in member 179 and having a latch portion which is adapted to be selectively engaged in notches 195 formed in member 187, is a latch 196.

Member 196 is provided with an arcuately shaped groove 197 which receives the arcuately shaped tongue portion 198 of an actuator member 199, and the parts are held in assembled interlocked relation by means of a plate 201 which is secured to member 199 by means of a rivet 202 and overlaps member 196. The axis of the mechanism constitutes the center of curvature for the arcuate portions of members 196 and 199, so that when member 179 undergoes rocking movements, is may be so without disrupting the connection between these members, and without causing latch member 196 to move into or out of engagement with notches 195.

Rigidly secured to a shaft 203, which is journalled in bearings in housing 1, by means of a set screw 204, is a lever 205. Also mounted on shaft 203, but designed to freely rock thereon, is a lever 206. Lever 206 is provided with a latch portion 207, which is closely disposed between a pair of guide faces 208 formed in housing 1, and it is adapted to be selectively entered between teeth 209 formed on carrier member 133. A set screw 210 is threaded into lever 206 and seats in a groove 210' formed in shaft 203.

A resilient driving connection is established between lever 206 and shaft 203 by means of a torsion spring 211, which encircles shaft 203. One end of spring 211 is hooked into a groove 212 formed in shaft 203 and its other end is hooked over lever 206. When shaft 203 is rocked in a counterclockwise direction (Figure 1) lever 206, through spring 211, is brought with its latching end into cooperation with teeth 209 for the purpose of locking carrier 133 against rotation. Should carrier 133 be so disposed that latch portion strikes the top of a tooth, shaft 203 may nevertheless be rocked into its final position because spring 211 yields under such conditions.

When shaft 211 is rocked in a clockwise direction, for the purpose of bringing lever 206 out of locking engagement with teeth 209, the friction of spring 211 may be relied upon to effect a reverse drive between lever 206 and shaft 203, but I preferably provide a positive drive by so designing groove 210' that spring 211 holds lever 206 with screw 210 disposed in one end of it when the parts are disposed as seen in Figure 1, with the result that spring 211 is placed under a definite degree of pre-loading.

Screw 210 is accordingly adapted to transmit clockwise rotative efforts from shaft 203 to lever 206. A locking wire 214 is passed through an aperture in screw 204 and is looped around the hub of lever 205, for the purpose of locking the screw against displacement.

Pivotally connected to, and disposed between, the arms of lever 205, by means of a pin 215 or the like, are the arms of a U-shaped dog 216, which is in turn pivotally connected to member 199 by means of a pin 217. A tension spring 218 is looped over each end of pin 217 and is anchored to lugs 219 formed on lever 205. Springs 218 tend to urge dog 216 and member 199 downwardly (Figure 1), so as to bring latch member 196 into engagement with the teeth formed in member 179, and their action is limited by virtue of engagement of pin 217 with the bottom of recesses 221 formed in the arms of lever 205.

When shaft 203 is rocked in a counterclockwise direction, latch member 196, through pin 217 and member 199, is withdrawn from the particular recess 195 with which it is engaged, and member 171 is freed for rotation in either direction. Although counterclockwise rotative tendencies of sleeve 171 under the latter condition causes rollers 189 to be wedged between faces 191 and sleeve 171, to thereby lock members 171 and 187 together, member 187 merely rotates in member 179 as a journal.

In the event that when shaft 203 is rocked clockwise so as to bring latch 196 into engagement with one of the recesses 195 in member 187, and the latter is not registered with latch 196, downward movement of lever 205 causes dog 216 to rock about pin 215 against the action of springs 218. The parts are maintained in position with pin 217 spaced from the bottom of recesses 221 until member 187 is rocked sufficiently to bring one of its notches 195 into registry with latch 196, at which time the latter will snap into place under the influence of springs 218, and again lock member 187 against counterclockwise rotation.

Access to the gear chamber is gained through an opening in the side of housing 1, and which is closed by a removable cover 232.

Lever 205 is also preferably utilized to shift sliding clutch member 159, and to this end its lower end is forked, and secured in each fork portion thereof is a pin 222, which is adapted to seat between flanges 161 of member 159.

Rocking movement of shaft 203, through lever 205, is adapted to slide member 159 so as to bring its teeth out of engagement with teeth 163 into a neutral position, or into a further right hand position with its teeth in engagement with teeth 223 formed on member 171 to condition the mechanism for reverse drive in a manner that will be presently set forth.

In order to facilitate the introduction of lubricant into gear member 172 from the lubricant reservoir, I preferably provide ports 237 in member 172, and in order to restrain the lubricant so admitted from being centrifugally thrown from the gear mechanism between members 172 and 133, flange 238 is formed on member 172 and closely fits into a groove 239 formed in member 133. This construction provides a substantially fluid tight joint between members 133 and 172, but it is to be understood that any other suitable type of sealing assembly may be used in this relation if desired without departing from the spirit of the present invention.

Shaft 203 extends outwardly of housing 1 and may be actuated in any desired manner, but I preferably employ a power operated mechanism for operating it. If desired, frictional detent means, or other suitable mechanism, may be associated with shaft 203 for yieldingly holding the parts in their selected positions, but I preferably employ a spring detent (Figure 1) which takes the form of a resilient wire 233 which seats in a groove 234 formed in the splines of shaft 154. The integral splines formed in sleeve 159 are discontinued in the rear portion as shown in Figure 1 to provide a smooth cylindrical portion 235. Formed in cylindrical portion 235 are three grooves 236, which cooperate with wire 233 to yieldingly hold sleeve 159 in its various selected positions against inadvertent displacement.

The parts are so designed, that when shaft 203 is being oscillated to bring sleeve 159 into its intermediate position, with the teeth 162 thereof out of engagement with teeth 163 formed on gear 164, lever 205 is simultaneously actuated to cause latch member 196 to be withdrawn from latching engagement with member 187. When the parts are arranged in this condition, the mechanism is incapable of transmitting power from shaft 3 to shaft 9, and when member 159 is disposed in its extreme right hand position, member 207 is designed to lock carrier 133 against rotation, and the mechanism is conditioned for reverse drive, and these operations will be more fully described hereinafter.

Gear member 172 is adapted to be selectively held against rotation, and in the present embodiment of my invention I preferably utilize a friction brake mechanism for effecting this result.

With particular reference to Figure 3 of the drawings, a brake band 241, having friction facings or linings 242 secured thereto by rivets 243 or the like, is disposed about the large diameter of member 172 and in this figure it is shown in disengaged condition. To one end of band 241 is riveted a forked member 244, which embraces a pair of pins 245 and 246 which are anchored in housing 1 in any well known manner. Member 244, through its anchoring means, not only restrains band 241 against rotation about the axis of the mechanism, but it also maintains the upper side of band 241 in disengaged condition unless it is actually engaged under the influence of the engaging mechanism that is to be now described.

A bracket member 247, having a lug 248 and a slot 249, is secured to band 241 by means of rivets 251. A compression spring 252 is disposed between member 244 and lug 248 and is retained in place by means of plugs 253 and 254 which are secured to the respective members. Spring 252 tends to maintain band 241 in expanded condition with facings 242 thereof out of engagement with gear 172.

A brake shaft 255, having a cam 256 preferably integrally formed thereon, is mounted for rocking movement in a bearing support 257 which is integrally formed with housing 1. Shaft 255 is restrained against endwise displacement by means of a set screw 258 which is threaded into support 257 and engages in a groove 259 formed in shaft 255. A sealing assembly, designated generally at 261, is associated with support 257 and serves to keep lubricant from working out of the housing.

Shaft 255 is provided with a reduced extremity 262, which engages in slot 249 and functions to restrain bracket 247, and band 241 connected thereto, from undergoing side-wise movement.

Shaft 255 may be actuated in any desired manner, and when it is rocked, the nose of cam 256 forces lug 248 upwardly, thereby causing band 241 to contract and bring its facings 251 into frictional engagement with gear member 172. When shaft 255 is restored to the position shown in Figure 3, cam 256 allows spring 252 to expand band 241 and free gear 172 from braking influences. The mechanism that is preferably employed for rocking shaft 255 will be hereinafter set forth.

*Secondary clutch mechanism*

Secured to a flange 264, provided on sleeve 135 by means of bolt assemblies 5a or the like, is a member 4a that supports the secondary clutch mechanism, and as the latter is similar in general to the primary clutch mechanism, like parts will not again be described.

In the secondary clutch, cover 26a is secured to member 4a, and fingers or levers 78a cooperate with a throwout assembly B, which is of a construction identical to that of assembly A, in a manner that will presently be set forth. Movement of reaction plate 38a toward and away from member 4a is controlled by means of a throwout shaft 265, having fingers 266 formed thereon which cooperate with throwout assembly B. Hubs 11a and 31a, carrying discs 14a and 33a, are preferably splined to a sleeve 264' which is secured to shaft 9 by means of keys 265', and a split ring 266' which is sprung into a groove in shaft 9.

Secondary clutch throwout shaft 265 may be rocked to one side of an automatic or intermediate position (shown in Figures 1 and 6), wherein clutch operation is speed responsive, to a position where the clutch will be engaged at all speeds, known as engaged position, and it may be rocked to the other side of automatic position to cause the clutch to be disengaged at all speeds, in a manner similar to that described in connection with the primary clutch throwout shaft.

In the present embodiment of my invention, I preferably interconnect brake shaft 255 with shaft 265 in such manner that, when shaft 265 is rocked from automatic position into disengaged position, the brake will be applied to the internal gear, and the parts are so designed that movement of shaft 265 into engaged position does not affect engagement or application of the brake. The mechanism that I preferably employ for producing this result will now be described.

With particular reference to Figure 6 of the drawings, a lever 267, having a split hub is gripped or clamped to shaft 265 by means of a cap screw 268, and a similar lever 271 is secured to shaft 255 by means of a screw 272. Levers 267 and 271 are preferably interconnected by a yielding or resilient link 273 for the purpose of rendering the brake mechanism self-adjusting to some degree, but it is to be understood that, if desired, a rigid link or other mechanism may be employed to interconnect these levers. This link structure will now be described.

Connected to lever 271, by means of a clevis 274 is a sleeve member 275, which is locked in adjusted position with respect thereto by means of a locknut 276. Sleeve 275 is threaded into a cylinder 277, and the thread employed is preferably opposite to that employed for securing sleeve 275 to clevis 274, so that locknut 276 may be loosened and sleeve 275 turned in the proper direction to effect adjustment of cylinder 277 toward and away from clevis 274. A rod 278, having a clevis end and a reduced portion 279, is slidably guided in a cap member 281 which is threaded on cylinder 277. A pin 282 extends through the clevis end of member 278 and is disposed in a slot 283 located in lever 267, and slot 283 is so designed that lever 267 may move from automatic to engaged position without effecting movement of member 278. A compression spring 284 is located within cylinder 277, and is disposed between sleeve 275 and a washer 285 which abuts a shoulder formed on member 279. A split ring 286 is sprung into a groove located in cylinder 277 and serves to preload spring 284 and prevent it from forcing member 278 out of the cylinder.

A lubricant fitting 287 is screwed into cylinder 277 and serves to admit any suitable form of lubricant to the cylinder for lubricating the parts, and in order to prevent lubricant from leaking out of the cylinder, I preferably provide a sealing or packing assembly 288, which is disposed between cap 281 and ring 286.

When shaft 265 is rocked toward disengaging position, the parts of link 273 move as a unit during the initial part of the operation in view of the fact that spring 284 is preloaded. This results in lever 271 rocking shaft 255 and causing cam 256 to apply the brake to gear member 172. When the brake band has been fully contracted, through the operation just described, further rocking movement of shaft 265 and lever 267 causes member 278 to be telescoped within cylinder 277, with the result that spring 284 is compressed and the pressure applied to the brake is slowly built up.

When shaft 265 is rocked in the other direction, i. e., toward engaging position, pin 282 remains motionless in view of the fact that pin 282 may travel in slot 283 formed in lever 267.

*Forward and reverse drive shifting mechanism*

Shaft 203 extends outwardly of housing 1 and may be actuated in any desired manner, but I preferably actuate it with a power operated mechanism that will now be described. Secured to shaft 203, by means of a cap screw 290, is a lever 291, which is adapted to effect rocking movement thereof. Pivotally connected to lever 291, by means of a clevis 292 and a pin 293, is a link member 294. Link 294 is adapted to be locked in adjusted position with respect to clevis 292 by means of a locknut 295 or the like, and its forward end is formed as a clevis and is connected to a piston rod 296 by means of a pin 297. Rod 296 extends into a cylinder 298, having heads 299 and 301.

A sealing or packing assembly 302 carried by head 301 slidably cooperates with rod 296 and serves to prevent fluid leakage from the cylinder. Clamped on the end of rod 296, by means of nuts 303, are a pair of plates 304 and a pair of flexible sealing elements 305, which cooperate in fluid tight relation with the walls of cylinder 298 and constitute a piston.

A compression spring 306, disposed in cylinder 298, acts against the right hand side of the piston and reacts against head 301 and tends to force the piston to the left. A preferably identically similar spring 307, located in the left hand end of cylinder 298, acts against the left hand side of the piston and reacts against head 299. Springs 306 and 307 are preferably so designed that, when substantially equal fluid pressures exist on either side of the piston, it will be held in a position disposed intermediate the ends of the cylinder, so as to hold shaft 203 in its intermediate or "neutral" position.

In Figures 7 and 8, the piston is shown in its right hand position, and shaft 203 is disposed in its forward drive position.

Any desired form of fluid energy may be utilized to actuate the piston and cylinder assembly just described, for instance, oil or air or other fluid under pressure, or the vacuum produced by the intake manifold of an internal combustion engine may be employed, but, in the present instance, the actuating fluid takes the form of a liquid such as oil or glycerine or other suitable fluid under pressure. The actuating fluid is admitted to, and exhausted from, the cylinder by means of a valve mechanism that will now be described. A valve, designated as R, is adapted to admit fluid to the cylinder so as to shift the parts to reverse drive position. Mounted in a bore 309, located in the body of valve R is a valve member 311, having a circumferential groove 312 and a longitudinal passage 313 located therein. A passage 314 intersects bore 309 and communicating therewith is a fluid supply pipe 315. A passage 317 communicates with bore 309 and also, with a pipe 316, which is connected to cylinder head 301. A pipe 318, which is adapted to return the fluid from the cylinder to the oil supply reservoir, communicates with a passage 319 associated with bore 309.

With valve member 311 disposed in the position shown in Figure 8, it cuts off communication between pipe 315 and the valve mechanism, and through passage 313 it establishes fluid communication between pipes 316 and 318, thereby allowing fluid to readily pass to and from the right hand end of cylinder 298.

When valve member 311 is moved into its extreme left hand position, passage 313 is brought out of registry with passage 319, thereby cutting off communication between cylinder 298 and the oil drain, and reduced portion 312 thereof is brought into registry with passage 314, which allows fluid to flow through pipe 315, reduced portion 312, passage 317 and pipe 316 into the right hand end of cylinder 298, to thereby shift the piston into its left hand position and so as to rock shaft 203 into reverse drive position.

When valve member 311 is disposed intermediate the positions just described, it places the right hand end of cylinder 298 in fluid communication with the oil return line and cuts off communication between pipe 315 and the cylinder. This will be hereinafter termed the neutral position of the valve.

A valve mechanism F, which is associated with the left hand end of the cylinder, is used to control the admission of fluid to the left hand end thereof, and is identically similar in construction to valve R, except that it is oppositely disposed, and its structural details and functions will not be described. The subscript "a" will be affixed to the reference characters to denote parts that correspond to those of the previously described valve mechanism.

Valve members 311a and 311 are preferably interconnected for synchronous movement, and to this end, valve member 311 is provided with a reduced portion 321, to which a clevis 322 is connected by means of a pin 323. A link member 324, having a clevis end 325, is threaded into clevis 322 and is adapted to be locked in adjusted relation thereto by means of a locknut 326. Link 324 is connected to reduced portion 321a of valve 311a by means of a pin 323a.

With valves 311 and 311a disposed in their intermediate or neutral positions, both ends of cylinder 298 are cut off from the fluid supply and springs 306 and 307, which are balanced, maintain the piston in intermediate position with the result that shaft 203 is maintained in its neutral position.

When the valves are shifted into their right hand positions, valve F admits fluid through pipes 315a and 316a into the left hand end of cylinder 298, and in view of the fact that valve R maintains communication between the right hand end of cylinder 298 and the oil drain, through pipes 316 and 318, fluid enters the left hand end of the cylinder and forces the piston to the right. Movement of the piston in this manner rocks shaft 203 into forward drive position, and also forces the oil or other fluid located in the right hand end of the cylinder back into the oil reservoir by way of pipes 316 and 318. When valve R is actuated to admit fluid to the right hand end of cylinder 298 by way of pipe 316, valve F maintains communication between the left hand end of the cylinder and the oil return line by way of pipes 316a and 318a, and movement of the piston forces the oil into the left hand end of the cylinder into the return line, and shaft 203 is rocked into reverse drive position.

The valves may be shifted in any desired manner, but, in the present instance, I operate them by means of a Bowden wire control assembly. A wire 328 is retained in a bore in valve 311a by means of a set screw 329, and is housed in a member 331. Member 331 is clamped in the bifurcated end of an arm 332 formed on valve member F, by means of a set screw 333. Bowden wire assembly is led up to a convenient operating location in the vehicle or other drive mechanism and may be operated in any desired manner, but I preferably operate it by means of a control device that will be described hereinafter. Valves R and F may be supported in any suitable manner, as, for instance, by means of brackets 334 and 334a carried by cylinder 298.

As previously stated, the fluid energy employed for actuating the cylinder assembly may take any form desired. In the present instance, a unitary pump and reservoir unit, designated generally at 335 and having a filler plug 336 and a drain plug 337, is adapted to contain any well known pump mechanism and is preferably driven by the prime mover associated with my transmission mechanism.

The interior of unit 335 is under atmospheric pressure, and the pump intake is adapted to draw oil or glycerine or other fluid from near the bottom of the device and the pump (not shown) is adapted to supply fluid under pressure to a pipe 338, which is connected thereto in any suitable manner.

Pipe 338 is connected to a valve member 339 and communicates with a vertical passage 341 formed therein. A horizontal passage 342 intersects passage 341 and is disposed in fluid communication with the interior of unit 335. A compression spring 343 is located in an enlarged portion of bore 342 and serves to urge a ball relief valve 344 against a seat 345 formed in member 339. The purpose of providing the relief valve assembly just described is to definitely limit the pressure that may be built up in the supply line, and when it opens in response to excessive pressure, fluid flows through pipe 338, passage 341, passage 342 and into the interior of unit 335 where it is adapted to be again drawn through the pump.

A pipe 346 is connected to member 339 and communicates with passage 341 and is connected to oil supply lines 315 and 315a by means of a connector element 347. A return pipe 348 is connected to unit 335 and is placed in communication with return lines 318 and 318a by means of a connector element 349. The piston and cylinder assembly just described may be accordingly utilized to shift the transmission into forward, neutral and reverse drive when the engine is operating, and when the engine stops, the pressure falls in the fluid pump lines, and spring 306 and 307 automatically bring shaft 203 into its neutral position.

*Primary and secondary clutch controlling mechanism*

Throwout shaft 110 extends outwardly of housing 1 and may be actuated in any desired manner as, for instance, by means of a clutch pedal or hand lever, but, in the present embodiment of my invention, I preferably employ a power operated device for operating it. A lever 352, having a split hub, is secured to shaft 110 by means of a cap screw 353. Threaded into the lower end of lever 352 is a screw 354, which is adapted to be locked in adjusted position therein by means of a locknut 355. Screw 354 is adapted to cooperate with a lever 356 which is freely mounted for oscillation on shaft 110. Pivotally connected to the lower end of lever 356, by means of a pin 357, is a link member 358, which is pivotally connected to a similar link member 359 by means of a pin 361. Link member 359 is pivotally supported on the mechanism in any desired manner, for instance by means of a stud 362. In Figure 7 of the drawings, the links are shown in locking position with pin 361 disposed slightly below a center line drawn between pin 357 and stud 362, and with the abutting faces 358' and 359' of links 358 and 359 disposed in abutting relationship.

An arm 363, preferably integrally formed on link 359, is connected to a tension spring 364, which is anchored to a bracket 365 and serves to urge links 358 and 359 toward locking position at all times.

The links are adapted to be lifted upwardly out of locking relationship against the action of spring 364 by means of an actuator wire 366, extending through an aperture in a member 363', which is pivotally mounted on pin 361, and has an enlarged portion 367 formed thereon which works in a slot in member 363'. Wire 366 is disposed in a housing 369 and the two elements constitute a control assembly, which may be actuated in any desired manner, as, for example, by means of a control knob on a vehicle dash, or its operation may be synchronized or correlated with the operation of any other desired part of the device, but, in the present embodiment of the invention, it is designed to be brought into release position whenever the transmission is shifted into neutral. Any desired mechanism may be used for achieving this result, but I preferably employ a lever 371, which is pivotally mounted upon a support 372 in any suitable manner and is provided with a cam face that cooperates with a cam 373 formed on link 294. Wire 366 is connected to lever 371 by means of a swivelled pin, and lever 371 is urged toward inoperative position by means of a tension spring 374, which is anchored to a bracket 375.

With the parts disposed in the position shown in Figure 7, primary clutch throwout shaft 110 is maintained in automatic position against the action of springs 45 by means of links 358 and 359, and shift lever 291 is disposed in forward drive position. When the parts are thus disposed, and link 294 is shifted into neutral position, either by actuating valves F and R, or by virtue of the pressure drop resulting from stopping the engine, cam 373 engages lever 371 and rocks it in a counterclockwise direction, with the result that wire 366 draws links 358 and 359 upwardly against the action of spring 364. Shortly after initiation of this operation, i. e., when pin 361 has been brought a slight distance above dead center, the latch may be said to be unlocked, and the throwout shaft may be rocked into disengaging position in the manner that will hereinafter appear. When link 294 is shifted from neutral into reverse or forward drive position, spring 374 will restore lever 371 to the position shown in Figure 7, and if shaft 110 has not been actuated into disengaging position, spring 364 will restore links 358 and 359 to the position shown in this figure.

A similar latch and lever organization is associated with secondary clutch throwout shaft 265, and as the construction of the parts, and their manner of cooperation are identically similar, the subscript "a" has been applied to those parts which correspond in structure and function to those associated with the primary clutch throwout shaft. In this latch assembly, spring 364a is directly connected to member 363a and urges the links downwardly, and in this organization, wire 366a and housing 369a are led up to a control mechanism located on the vehicle dash and which will be described hereinafter. By actuating wire 366a, links 358a and 359a are drawn upwardly against the action of spring 364a, and lever 352a may be actuated to move shaft 265 into disengaging position. Levers 352 and 352a may be actuated by individual power units, but in the present instance they are preferably actuated by a unitary piston and cylinder assembly which will now be described.

A cylinder and piston unit, designated generally at 377, is secured to housing 1 by means of a bracket 378 and cap screws 379, although it is to be understood that any other suitable supporting means may be employed. Assembly 377 consists of a lever housing section 381, and a piston section 382, which are connected together by means of cap screws 383. A cylinder 384 is formed in member 382, and supported for longitudinal movement therein, by means of a guide member 385 formed on member 381, is a piston rod 386. Secured to rod 386, by means of a nut 387, is a piston 388, to which a plate 389 and a piston member 391 are secured by means of rivets 392 or the like. A venting aperture 393 is located in member 381 and is adapted to place the right hand end of cylinder 384 in communication with the atmosphere for a purpose that will presently be set forth.

A shaft 394 is journalled in a bushing 395, and in a recess 396 provided in member 381, and secured thereto, by means of a key 397 is a lever 399. The upper end of lever 399 is provided with fork portions 400 which are adapted to embrace the flat sides 401 of member 386, and also a pin 402 secured therein. A washer 403 is mounted on pin 402 and is adapted to be held in place thereon by means of a cotter pin 404. The crank assembly is adapted to produce rocking movement of shaft 394 when piston 388 is reciprocated, and the resulting rocking movement of shaft 394 is adapted to be transmitted to the primary clutch throwout shaft by means of a lever 406 which is secured to shaft 394 by means of a key 405. Pivotally connected to lever 406, by means of a pin 407, a clevis 408, and a lock nut 409, is a link member 411. The rear portion of link 411 is bifurcated and is connected to lever 352 by means of a pin 412.

With the parts disposed in the positions shown in Figure 7, piston 388 is disposed in its intermediate or automatic position, and it acts through rod 386, lever 399, shaft 394, lever 406, and link 411, to hold the throwout assembly of the primary clutch in automatic position against the action of springs 45. When piston 388 is allowed to move to the left, the plates are adapted to be brought into driving engagement under the influence of springs 45. When link members 358 and 359 are lifted out of latching relationship, piston 388 may be moved to its extreme right hand position under the influence of fluid pressure to thereby bring throwout assembly A into disengaging position. These operations will be more fully amplified as the specification proceeds.

The power unit is also provided with a piston and cylinder assembly for actuating the secondary clutch, and as all parts are identical in construction, and function in a similar manner to the piston and cylinder assembly just described, their structure and function will not again be set forth. The subscript "a" has been applied to corresponding parts to properly identify them.

Fluid under pressure is adapted to be admitted to and exhausted from cylinders 384 and 384a by a valve mechanism that preferably takes the form illustrated in Figures 10 and 11, and it will now be described.

With particular reference to Figures 10 and 11, housing 382 is provided with a preferably integral cylindrical portion 414 in which is journalled a valve member 415 having a reduced shaft portion 416, which extends through an aperture 417 located in portion 414. A packing member 418 of any suitable character closely encircles shaft 416 and is adapted to prevent fluid from leaking from the mechanism by way of aperture 417.

Valve member 415 is provided with a port 419, which, in Figure 11 of the drawings, is shown as being aligned with an intake port 421 to which a fluid supply pipe 422 is connected by any suitable form of fitting. Valve member 415 is also provided with an exhaust port 423, which is adapted to align with an exhaust passage 424 when the valve is rocked in an anti-clockwise direction, (Figure 11). An oil return line 425 is connected to port 422 for the purpose of draining the fluid from the cylinder under the proper conditions. Secured to shaft 416, by means of a key 427, is a bell crank lever 428, which is employed to actuate the valve in a manner that will be presently set forth.

The valve mechanism employed to control the admission and exhaust of fluid from cylinder 384a is exactly similar to that used in connection with cylinder 384 and it will accordingly not be described and the subscript "a" has been applied to corresponding parts to identify them. Fluid supply pipe 422 is connected to a fitting 429 which communicates with a port in member 415a corresponding to port 421 in member 415, and is connected to a main supply pipe 431, and the latter is connected to valve member 339. Oil return pipe 425 is connected to return pipe 425a and to a main return pipe 432, by means of a fitting 433. Main return line 432 is connected to the top of unit 335 and is adapted to return the fluid drained from cylinders 384 and 384a to the low pressure side of the fluid pressure unit.

Pivotally connected to the upper end of lever 428 by means of a clevis 435 and a lock nut 436, and having a diaphragm assembly, designated generally at 437, clamped thereto by means of a pair of nuts 438 and 438' threaded thereon is a diaphragm rod 439. The diaphragm assembly is clamped between the halves of a diaphragm casing 441 by means of screws 442, and the diaphragm casing is supported on a bracket 443 which is secured to the cylinder assembly by means of screws 444. The interior of the diaphragm chamber is preferably placed in fluid communication with the intake manifold 445 of the internal combustion engine employed with the mechanism by means of a pipe 446, a connector 447, and a pipe 448. Pipe 448 is tapped into the intake manifold in such a relation to the position of throttle valve 449 that the vacuum will vary in a predetermined manner as the throttle is opened and closed.

The diaphragm assembly normally tends to hold shaft 416 and valve member 415 in the position shown in Figure 11, with ports 419 and 421 aligning when the engine is idling, with the result that fluid may flow through pipe 422, ports 419 and 421, into cylinder 384, and in the event that links 358 and 359 are disposed in the position shown in Figure 7, piston 388 will move lever 352 into the position shown in that figure and will thereby hold the primary clutch parts in automatic position.

In order to enable the valve mechanism to be independently actuated, I provide a manually operable controlling mechanism that will now be described. Pivotally connected to the other arm of bell crank lever 428 is a member 451 to which a spring 452 is connected. Spring 452 tends to urge valve member 415 toward bleeding position, with port 423 aligning with port 424, and it is anchored to a bracket 453 which is secured to the cylinder assembly by means of a cap screw 454. A control wire 455 extends through an aperture in member 451 and is provided with an enlarged portion 456 which is adapted to recirprocate in a slot 457 formed in member 451. Wire 455 is encased in a flexible sheath 458, and the two elements are led up to the vehicle dash 459 and sheath 458 is secured thereto by means of a nut 460.

A control knob 461 is connected to wire 455, and with knob 461 pushed in, as seen in Figure 7, the lower end of wire 455 assumes the position shown in Figure 14, with enlarged portion 456 disposed in the lower end of slotted member 451. The parts are designed in this manner so that when the vacuum is broken, lever 428 may rock anti-clockwise and bring valve 415 into bleeding position with port 423 in registry with port 424 under the influence of spring 452, without transmitting forces to wire 455. When the parts move into bleeding position, with port 423 registering with passage 424, fluid may escape from cylinder 384 by way of pipes 425 and 432 and return to unit 335.

Before proceeding to a description of the controlling mechanism associated with the secondary clutch cylinder, the operation of the primary clutch will be set forth.

Primary clutch operation

With lever 291 disposed in its forward or reverse drive position, with the engine operating substantially at idling speed, and with links 358 and 359 disposed in the position shown in Figure 7, the intake manifold vacuum holds diaphragm 437, rod 439, lever 428, and valve 415 in the positions shown in Figure 14, against the action of spring 452, with the result that the fluid pressure developed in unit 335, acting through pipes 431 and 432 holds the clutch parts in automatic position, as seen in Figures 1 and 7, against the action of spring 45. Accordingly, under these conditions, shafts 3 and 9 are disconnected.

When the engine or other prime mover is accelerated to speeds comparatively in excess of idling speed under the conditions just described, weights 56 rock outwardly about their fulcrum and bring the plates into initial engagement in the manner previously described. The vacuum in the intake manifold diminishes as the result of the engine accelerating and picking up shaft 9, and when it has attained a predetermined pressure, spring 452, acting through lever 428 and shaft 416, brings valve 415 into its bleed position, with port 423 registering with a passage 424, and this action causes intake port 419 to be cut off from the intake passage 421, with the result that piston 388 (Figure 7) may move to the left and force the fluid contained in cylinder 384 back into unit 335 by way of pipes 425 and 432. Exhaust passage 424 is preferably dimensioned so as to exert a restricting action on the flow of fluid from cylinder 384 so that the engaging operation of the primary clutch is solely speed responsive, i. e., weights 56, in response to acceleration of the prime mover, bring the plates together and build up pressure in springs 45 before the bleeding action allows piston 388 to release the primary clutch throwout assembly.

A driving connection is thereby automatically established between shafts 3 and 9, and if the accelerator is released with the clutch engaged in this manner, a high vacuum is immediately established in the intake manifold which pulls valve 415 in the position shown in Figures 11 and 14 with the result that piston 388 again pulls the primary clutch throwout shaft into automatic position. This operation, however, is ineffective to relieve the plates of driving pressure so long as the speed of shafts 3 and 9 are maintained above the engaging speed of the primary clutch, in view of the fact that movement of the reaction plate to the right in response to operation of weights 56 has pulled levers 78 out of the range of movement of the primary clutch throwout assembly.

With the primary clutch automatically engaged in the manner just described, and with the accelerator released, if the speed of shafts 3 and 9 drops to substantially idling speed, springs 45 overcome the centrifugal force of weights 56, and disengage the plates in the manner previously described. In the event that the engine is pulling a heavy load when the decelerating operation just described takes place, the intake manifold vacuum will be low, and spring 452 will maintain valve 415 in bleeding position, with the result that, as piston 388 under such conditions is ineffective to hold the parts in automatic position, springs 45 hold the primary clutch plates in driving engagement even though weights 56 swing inwardly when their disengaging speed is attained. It is accordingly impossible to slip and possibly abuse the primary clutch by pulling a heavy load at low speeds.

When lever 291 is shifted into its neutral position, cam 373, carried by link 294, rocks lever 371 so as to unlatch links 358 and 359, with the result that, if the engine is operating at idling speed, piston 388 moves into its extreme right hand position and brings the primary clutch parts into disengaging position. If it is desired to operate the engine substantially above idling speed without automatically coupling shafts 3 and 9, and the vacuum in the intake manifold falls to such an extent as to allow spring 452 to shift valve 415 into its bleed position, knob 461 may be pulled out so as to maintain lever 428 in the position shown in Figure 14 against the action of spring 452, and as this operation holds valve 415 in pressure position irrespective of the pressure in the intake manifold, the primary clutch will remain fully in disengaging position so long as the engine is operating or pressure is maintained in units 335. This operation may be performed when it is desired to operate the engine above idling speed for warming it up in cold weather, or for effecting adjustments of the carbureter thereof. Knob 461 may also be actuated when it is desired to maintain valve 415 in its pressure position when the links are locked to thereby render the primary clutch operation solely responsive to weights 56, and accordingly enable the clutch to function as slipping drive when the engine is pulling heavy loads at low speeds.

With the parts disposed in disengaging position in the manner just described, and with lever 291 disposed in forward or reverse drive position, spring 374 returns lever 371 to the position shown in Figure 7, and if it is desired to re-establish a driving connection between shafts 3 and 9, knob 461 is pushed in so as to again render the diaphragm responsive to the pressure variations in the intake manifold, and the engine is accelerated. Acceleration of the engine causes the intake manifold pressure to rise, with the result that spring 452 shifts valve 415 into its bleeding position and piston 388 is forced to the left under the influence of spring 45, and weights 56 rock outwardly and cause clutch engagement in the manner previously described. When the parts attain automatic position under the influence of the bleeding action, spring 364 restores links 358 and 359 to the position in which they are shown in Figure 7, with the result that the primary clutch throwout assembly thereafter, providing lever 291 is not restored to its neutral position, will operate between its automatic and engaging positions.

Although I have illustrated the Bowden wire assembly control for links 358 and 359 as being interconnected with the forward and reverse drive shifting mechanism, and I prefer to relate the elements in this manner for a purpose that will later appear, it is to be understood that the Bowden wire control may be mounted on the dash or it may be interconnected with Bowden wire control 458, so as to be actuated simultaneously with actuation of knob 461 if desired, without departing from the spirit of my invention.

The controlling mechanism for the secondary clutch valve is somewhat similar to that employed for controlling the primary clutch valve. A bell crank lever 428a is secured to shaft 416a and one arm thereof is associated with a vacuum diaphragm assembly which is identical in character to that described in connection with the primary clutch controlling mechanism, and it is connected to the intake manifold by pipes 446a and 448. Pivotally connected to the other arm of lever 428a, by means of a pin 464, is a yokelike member 465. A tension spring 466 is connected to member 465 and is anchored to a bracket 467 which is secured to the cylinder assembly in any suitable manner.

Member 465 is provided with a relatively large aperture 468 which is adapted to have a plurality of Bowden wire control members operate therein that will now be described. Actuating wires 469, 471 and 472, having enlarged portions 473, 474 and 475 provided on their lower ends, extend through apertures in the upper portion of member 465 and are enclosed in sheath members 476, 477 and 478, respectively. The sheath members are adapted to be supported on bracket 453 and clamped thereto by means of a clip 481 and screws 482. Spring 466, acting through member 465 and lever 428a, tends to rock shaft 416a and bring valve member 415a into its bleed position, with its port 423a registering with the exhaust passage 424a. The vacuum diaphragm assembly is adapted to rock shaft 416a and bring valve member 415a into its pressure position shown in Figure 14, against the action of spring 466, and various mechanisms are interconnected with the Bowden wire assembly just described for maintaining valve 415a in its pressure position against the action of springs 466 when the vacuum in the intake manifold is insufficient to achieve this result. The mechanisms to which the Bowden wire assemblies are connected will now be described.

Sheath 476 and wire 469 are led rearwardly of the mechanism and are supported on a bracket 485 which is secured to housing 1 by means of screws 486. Wire 469 extends loosely through a member 487 which is swivelly mounted upon lever 291 in any suitable manner, and is provided with a collar 488 which is secured thereto in any desired manner. The parts are so designed, that when lever 291 is disposed in forward drive position as seen in Figure 7, a clearance exists between collar 488 and member 487, with the result that lever 291 may be shifted to and from neutral and forward drive position without producing movement of wire 469, and the latter assumes the position illustrated in Figure 14 under such conditions. When lever 291 is shifted into reverse position, member 487 picks up collar 488 and pulls wire 469 so as to pick up member 465 and rock lever 428a into the pressure position illustrated in Figure 14, provided that vacuum diaphragm 437 has not already moved it into this position. If the vacuum diaphragm has already moved lever 463 into pressure position, (Figure 14) actuation of wire 469 in the manner just described merely serves to cause enlarged portion 473 to take up the lost motion in opening 468 of member 465. Shifting the transmission into reverse accordingly is operative to shift valve 415a to pressure position with the result that when the engine is operating the secondary clutch throwout mechanism will be pulled into automatic position.

Wire 471 and sheath 477 extend upwardly, and over the transmission and are associated with the torque responsive elements thereof in a manner that will now be described. A bifurcated lever 495 is mounted on the outer end of shaft 185 and is clamped thereon by means of a cap screw 496. A member 497 is swiveled on the end of lever 495 and wire 471 is secured in an aperture therein by means of a set screw. A tension spring 498 is hooked in an aperture in lever 495 and is anchored to a bracket secured to housing 1. Spring 498 is stronger than spring 466 and is adapted to hold lever 184 in contact with plug 185' carried by lug 182.

With the parts disposed in the position illustrated in Figures 6 and 14, the overrunning clutch carrier is disposed in its unloaded position and enlarged portion 474 of wire 471 is disposed in the lower parts of opening 468 of member 465. When a load is placed upon the overrunning clutch carrier, it rocks clockwise against the action of spring 183 (Figure 4) and plug 185' carried thereby moves downwardly, with the result that spring 498 causes levers 184 and 495 to follow up and rock in a clockwise direction (Figure 6). This action causes wire 471 to be pulled upwardly with its enlarged portion 474 engaging member 465, with the result that, should the vacuum in the intake manifold drop under these conditions, lever 463 will nevertheless be held in the position shown in Figure 14, as spring 498 is stronger than spring 466. When the load on the overrunning clutch carrier is relieved, it is rocked counterclockwise by spring 183, thereby rocking lever 495 in a counterclockwise direction against the action of spring 498 and allows lever 428a to move into its bleeding position under the influence of spring 466, provided that there are no other forces tending to hold it in pressure position.

Wire 472 and housing 478 are led up to the vehicle dash and are adapted to be controlled preferably by the same mechanism that actuates wire 366a. Wire 472 is adapted to be manually controlled so as to maintain lever 428a in the bleed position illustrated in Figure 14 irrespective of the intake manifold pressure variations. As previously explained, Bowden control wires 328, 366a and 472 may be actuated in any desired manner and by any suitable mechanism, but in the present embodiment of my invention, I preferably employ a common controlling mechanism for operating them, and this mechanism will now be described.

With particular reference to Figure 13, a body member 499 has a reduced portion which extends to the instrument panel 459 of the motor vehicle and is clamped thereto by means of a nut 501 which is threaded thereon. A dowel pin 502 is frictionally fitted in member 499 and extends through an aperture formed in the panel for the purpose of locating the position of the parts in assembling the device.

Member 499 is provided with a preferably integrally formed arm 503 which receives Bowden wire housing 331 between the bifurcations of its lower end. Housing 331 is firmly gripped between the bifurcations of arm 503 by means of a cap screw 504 or the like. The intermediate portion of arm 503 is provided with bifurcations 505 between which housings 369a and 478 are firmly clamped by means of a cap screw 506.

An operating plunger or control rod 507 is slidably mounted in a bore in body member 499 and is provided with an operating knob 508, which is preferably other than circular in form so that it may be gripped and oscillated as well as be manipulated for axial movement.

Control rod 507 is adapted to be yieldingly held in either of three axially spaced operating positions by means of a detent 509, which is located in a hollow portion 510 of body member 499. A compression spring 511, which reacts against a pin 512 located in portion 510, is adapted to urge detent 509 downwardly into engagement with notches 513 formed in rod 507. A preferably cylindrical member 514 is secured to wire 328 by means of a set screw or the like and is mounted for swiveling movement in a bore located in rod 507. Member 514 is restrained against movement out of its bore in rod 507 by means of a pair of pins 515, which are secured in plunger 507 and engage member 514 either side of wire 328.

With the structure just described, knob 508 may be withdrawn or pulled outwardly to actuate wire 328 and shift valves F and R into their forward, neutral and reverse drive positions. Knob 508 may also be oscillated to actuate wires 472 and 366a and to this end plunger 507 is provided with a flattened side 516. A pair of similarly shaped plates 517 and 518 fit over plunger 507 and have apertures therein having a configuration corresponding to that of plunger 507, and to thereby couple them together for synchronous oscillation with rod 507. Plates 517 and 518 are provided on their upper ends with spaced arm portions in which a swivel member 519 is journalled. Wires 366a and 472 are secured in apertures in member 519 by means of set screws 520 and are thereby adapted to be rocked in unison with plates 517 and 518 and rod 507.

Plates 517 and 518 are restrained against axial movement by means of a cover or retainer plate 521 which is secured to body member 499 by means of cap screws 522. Screws 522 are located beyond the periphery of plates 517 and 518 and are provided with sleeve or spacer members 523, which are clamped between plate 521 and the face of member 499, so as to prevent plates 517 and 518 from being frictionally clamped between the two members. Secured to the face of plate 518, by means of a spot welding or like operation is a ring member 524 which is freely mounted in the aperture within cover plates 521 and slidably receives plunger 507.

Knob 508 accordingly may be moved axially to bring it into forward, neutral and reverse drive positions, as indicated in Figure 7, or it may be oscillated so as to exert a pull upon wires 366a and 472 to bring link members 358a and 359a into unlatching relationship, and to also rock valve 415a into its pressure position, seen in Figure 14.

With the engine operating at idling speed, and with the parts disposed in the position shown in Figure 7, if knob 508 is rocked, the secondary clutch latch is unlocked, thereby allowing piston 388a to pull the secondary clutch throwout assembly into disengaging position. Rocking movement of knob 508 also pulls wire 472 upwardly into contact with the upper edge of the opening in member 465, with the result that valve 415a will be held in pressure position even through the intake manifold pressure should fall to a low value.

*General operation*

The operation of the mechanism will now be described. With the primary and secondary clutch latches locked, and with the engine operating at idling speed, shift lever 291 is disposed in forward drive position, when knob 508 is pushed as seen in Figure 7. Under these conditions, the primary and secondary clutch parts assume the positions shown in Figure 1. Accordingly, when the parts are disposed as just described, and driving shaft 3 is operating at a predetermined speed, for example, at a speed corresponding substantially to the idling speed of the prime mover utilized therewith, there is no driving connection between shafts 3 and 9, as the primary and secondary clutches are disengaged as illustrated in Figure 1. With the transmission parts disposed in the positions shown in Figure 7, the valves assume the position shown in Figure 14, and the mechanism is conditioned for forward drive, acceleration of the driving shaft causing the automatic power transmitting operations to take place as follows.

*Low speed or torque multiplying drive*

As the driving shaft is accelerated, centrifugal weights 56 fulcrum outwardly in response to centrifugal force and cause the primary clutch mechanism to be engaged in the manner previously described, thereby coupling shafts 3 and 9. Clockwise rotation of shaft 9, viewed from the left hand end of Figure 1, through the medium of pinion 152 formed thereon, tends to produce counterclockwise rotation of planet gears 144 about their axes, assuming that rotation of shaft 154, to which they are connected through gears 145 and 164, and sleeve 159, is resisted by a load, or the like. Counterclockwise rotative tendencies of planet gears 144, imposes a reaction upon internal gear 172, tending to produce counterclockwise rotation thereof. Counterclockwise rotation of internal gear 172, however, is prevented by the action of clutch rollers 189, which cooperate with sleeve 171 and member 179 under these conditions to lock sleeve 171 against rotation. With reference now to Figure 4, the reactive forces set up by planets 144 and the internal gear cause member 179 to rock clockwise against the action of spring 183, thereby rocking levers 184 and 495 and pulling wire 471 up into contact with member 465 (Figure 14). Wire 471 accordingly maintains valve 415a in pressure position against the action of spring 466 so long as power is transmitted through the gearing, irrespective of whether the intake manifold vacuum drops to a low value during this operation. Movement of member 179 under the influence of reactive forces is limited by engagement thereof with screws 178.

Planet gears 144 are therefore caused to planetate clockwise within stationary internal gear 172. Planetation of gears 144 produces similar planetation of gears 145 to which they are connected. Planetation of gears 145 causes gear 164 to be rotated in the same direction, but at a speed which is lower than that of gear 152 carried by shaft 9, by reason of the fact that it is of greater diameter. A torque multiplying coupling is therefore automatically established between driving shaft 3 and driven shaft 154, the torque amplification depending upon the gear ratios utilized.

*Normal automatic transition from torque multiplying drive to direct drive*

With shafts 3 and 154 coupled through the medium of pinions 152 and 164, and planet gears 144 and 145, as previously explained, when shaft 154 attains a speed corresponding to a speed of the prime mover sufficiently high to enable the latter to deliver adequate torque to handle the load without torque multiplication, centrifugal weights 56a pivot outwardly and cause engagement of the secondary clutch mechanism to be effected in the manner previously described. Engagement of the secondary clutch mechanism causes torque to be transmitted from shaft 9, through discs 14a and 33a, member 264, sleeve 135, and gears 152, 144, 145, 164 and member 159, to the driven shaft, and the latter is accordingly gradually accelerated under the combined influence of the torque multiplying drive and the direct torque transmitted through the secondary clutch mechanism.

In view of the fact however that transmission of power from shaft 9 to the planet carrier through the secondary clutch has the effect of diminishing the magnitude of the reactive forces applied to gear 172, the forces exerted upon member 179 are correspondingly diminished, and when they attain a predetermined value, spring 183 overcomes them and restores member 179 to the position illustrated in Figure 6. Restoration of member 179 to the position shown in Figure 6 allows spring 466 to pull valve 415a into bleeding position, as the vacuum is low under open throttle conditions, with the result that secondary clutch spring 45a builds the plate pressure up comparatively rapidly and brings piston 388a into the left hand end of cylinder 384a. The rate at which piston 388a moves, and the rate at which pressure is built up between the secondary clutch plates is determined by the size of exhaust passage 424a.

The transition from geared to direct drive is accordingly smoothly initiated by weights 56a, which cause a torque of low and slowly increasing magnitude to be transmitted from shaft 9 to the planet carrier, and when the magnitude of the torque transmitted by the secondary clutch attains a predetermined value, the power assembly releases springs 45a with the result that the magnitude of the torque transmitted builds up rapidly and comparatively rapidly brings the parts into synchronism. When the magnitude of the torque applied to the planet carrier attains to a predetermined value, gear 172 rotates forwardly, and this action unlocks rollers 189.

When the secondary clutch is fully engaged, a direct drive exists between shafts 9 and 154 because the driving sun gear and the planet carrier are coupled together, which prevents planets 144 and 145 from rotating about with the result that the internal gear is caused to rotate in a clockwise direction.

The mechanism accordingly initially picks up the load with a slipping drive, which, when an internal combustion engine is utilized as a prime mover, allows the engine to accelerate and operate efficiently on a relatively high point on its speed-torque curve to develop adequate power to handle the comparatively great starting load involved in picking the vehicle up from a standstill. After the vehicle is moving, and has attained a predetermined speed, the primary clutch directly connects shafts 3 and 9 in the manner previously described. At a higher vehicle speed (assuming that the engine is continuously accelerated), the secondary clutch initiates operation and serves to transmit increasing amounts of power directly from shaft 9 to planet carrier 133, with the result that a differentiating power transmitting operation takes place, and transmits power from shaft 9 to shaft 154 with a decreasing torque multiplication. Although the secondary clutch is basically speed responsive, under normal operating conditions, it only initially transmits torque of low and slowly increasing magnitude because the torque responsive mechanism operates to apply the full driving pressure of springs 45a to the secondary clutch plates when the torque transmitted falls to a predetermined magnitude, and such action usually occurs before the vehicle attains high speeds if the engine is only moderately accelerated, or the vehicle is proceeding on a level surface. In the event that the engine is pulling a heavy load when this transition is taking place, the load handled by the gearing is likewise heavy, and under these condition weights 56a may build the plate pressure up to a fairly high value before the secondary clutch is bled into engaged position. In either event, however, the mechanism efficiently responds to the operating conditions encountered in practice, supplying a torque multiplying drive when the load is heavy, and bringing the parts into direct drive when the load is light.

In the particular mechanism shown, and with the usual rear axle ratios utilized in most vehicles of the pleasure car class, the primary clutch directly couples shafts 3 and 9 when the vehicle attains a speed of approximately ten miles per hour, and the secondary clutch initiates operation at a vehicle speed of approximately sixteen miles per hour and establishes a direct drive between the engine and the load when the vehicle attains a speed of twenty miles per hour when the engine is accelerated in the manner just described. It is to be understood however that completion of primary and secondary clutch operation may take place at higher or lower speeds than those given, depending upon whether the transmission is under heavy or light loads.

An extremely important feature of the present invention resides in the fact that, although the mechanism, in response to one continued acceleration of the driving shaft, automatically establishes a torque multiplying connection between the engine and the load when the driving shaft attains a predetermined speed, and automatically brings the load into direct synchronism with the engine when the load has been accelerated through a predetermined "geared speed" range under the influence of the torque multiplying drive, once the direct drive has been established, it will be maintained even though the load be decelerated so that it is operating at speeds corresponding to those of the "geared speed" range. This is a highly desirable operating characteristic for the reason that as the "shift up" speed is substantially higher than the "shift down" speed, there is no critical shift speed, and the transmission therefore does not tend to alternately shift into and out of direct drive, no matter through what speed range the parts are operated or whether the torque handled by the transmission is of large or small magnitude.

The novel design of my transmission also makes it possible to automatically shift the parts into direct or non-torque multiplying relationship when the load is operating in the major portion of the normal "geared speed" range, by merely momentarily effecting a reversal of drive, which, in the present invention, is effected by momentarily releasing the accelerator. This makes it possible for the operator to shift into direct drive at will when the transmission is operating in a certain speed range, and this operation may be silently effected with a minimum of effort as it merely involves momentarily releasing the accelerator.

These highly desirable operating characteristics are made possible through the design of the torque multiplying mechanism employed in my transmission and the manner of association of the drive transition effecting device with it, which, in the present instance, takes the form of a speed responsive clutch. The clutch is related to the parts in such manner that the driving shaft rotates the speed responsive part thereof at a greater speed when it is engaged than when it is disengaged, and so that when it is disengaged, it is given an accelerating impulse when a reversal of drive occurs and the driven shaft tends to transmit rotative efforts to the driving shaft. These operations, and the structural features of the mechanism which render them possible, will now be more fully set forth.

When operating a vehicle provided with the present transmission in direct drive, and it is desired to decelerate to stop the vehicle, this accelerator is released and the vehicle brakes are applied. This operation results in shaft 154 tending to drive shaft 9, through gears 164, 145, 144 and 152, and sleeve 171, and the secondary clutch. Release of the accelerator causes a high vacuum to be produced in the intake manifold which opens valve 415a and causes piston 388a to pull the secondary clutch throwout mechanism into automatic position. This action does not result in diminishing the plate pressure, however, so long as the parts are maintained above the operating speed of weights 56a. Shaft 9, through the engaged primary clutch (release of the accelerator has resulted in vacuum diaphragm assembly 437 pulling valve 415 into pressure position, which results in piston 388 pulling the parts into automatic position, but as the speed of shaft 9 is maintained above the operating speed of weights 56, they keep the clutch engaged), tends to drive the engine. A direct drive accordingly exists between the load and the engine, and the braking effect of the latter is accordingly utilized to augment the action of the vehicle brake mechanism.

As the decelerating operation just described proceeds to the point where shaft 154 is rotating at the speed where the secondary clutch initiated engagement during the accelerating operation previously set forth, the secondary clutch nevertheless remains engaged and maintains a direct drive between shafts 9 and 154 for the reason that the speed responsive part of the clutch (member 4a) is now being driven directly from shaft 9 through discs 14a and 33a, and it accordingly rotates at a higher speed than when it was driven through the action of the gears for a corresponding speed of shaft 154.

If the decelerating operation is continued until the vehicle attains a speed of approximately ten miles per hour, the holdback springs of the secondary clutch overcome the forces set up by weights 56a, and cause them to rock inwardly and disengage the plates.

The fact that the transmission shifts into, or establishes a direct drive at a speed which is higher than that at which the transmission tends to shift out of direct drive, is regarded as a highly important feature of the present invention because it positively eliminates any tendency for the transmission to alternately shift into and out of direct drive, or "hunt" when the parts are rotating at speeds which are in the neighborhood of the operating speed of the direct drive establishing mechanism, which, in the present embodiment of the invention, comprises a speed responsive clutch.

When the secondary clutch has been disengaged in the manner just described, shaft 154 does not drive the engine through the gears because the planet gears exert forwardly driving tendencies upon the internal gear and cause it to overrun, which has the effect of disconnecting shafts 9 and 154. As soon as the internal gear overruns, the engine drops to idling speed, as the throttle is closed, and the holdback assemblies disengage the primary clutch. The vehicle may then be brought to a complete stop through continued application of the vehicle brake mechanism, or, if desired, the accelerator may be depressed to produce automatic engagement of the primary and secondary clutches in the manner previously described so as to again cause the engine to propel the vehicle.

When the transmission is operating in direct drive in the manner previously described, and it is desired to maintain the direct drive thus established, even when the parts are decelerated to speeds lower than the automatic "shift down" speed, pipes 446a or 448 may be provided with an atmospheric valve, so as to shut off communication with the intake manifold and allow atmospheric air to bleed into the diaphragm chamber to thereby allow valve 415a to move into bleed position, and accordingly allow springs 45a to bring the secondary clutch plates into driving engagement. This operation conditions the parts so that a two-way direct drive is maintained between the engine and the load until shafts 3 and 9 are decelerated sufficiently for the primary clutch to automatically disengage.

*Selective automatic shift into direct drive*

By reason of the novel design of my transmission, it is possible to effect the transition from geared drive to direct drive by merely momentarily releasing the accelerator when the vehicle or other load is being driven within a speed range which may be predetermined as desired by properly designing the parts and providing the proper gear ratios. This operation takes place as follows:

With the engine driving the vehicle through the transmission gears as previously explained, and with the vehicle proceeding at a speed of from approximately ten to twenty miles per hour, if the accelerator is released, the transmission automatically shifts into direct drive, the operating taking place in the following manner:

Assuming that the speed of member 4a is so low that engagement of the secondary clutch has not been initiated, accelerator release causes shaft 154, acting through member 159 and gear 164, to tend to increase the rate at which gears 144 and 145 planctate. This action causes rotative forces to be applied to gear 152, but, as it is connected to shaft 9 and the engine, which tends to drop to idling speed, planet gears 144 apply forwardly driving forces to, and cause internal gear 172 to rotate forwardly or overrun. This results in a substantial acceleration of the speed of carrier 133, and as it is connected to member 4a, which carries the speed responsive mechanism of the secondary clutch, weights 56a rock outwardly and establish a driving connection between shaft 9 and carrier 133, in the manner previously set forth.

A direct drive is thereby established between shafts 9 and 154, and as the accelerating forces are promptly applied to the speed responsive part of the secondary clutch mechanism upon release of the accelerator, it remains engaged during this operation. After the operation is complete, and before the accelerator is again depressed, the rotation of shaft 154 under the influence of the momentum of the vehicle, through the direct drive established by the secondary clutch, maintains shaft 3 up to the operating speed of weights 56, and thereby maintains the primary clutch engaged, provided that the vehicle does not lose sufficient momentum for shaft 154 to drop to or below the disengaging speed of the primary clutch.

Assuming that the transmission has been selectively shifted into direct drive in the manner just described, if the accelerator is depressed, the vehicle will be picked up in direct drive. The secondary clutch remains engaged under these conditions for the reason that its speed responsive mechanism is now being driven from shaft 9 in direct synchronism therewith, whereas before engagement of the secondary clutch took place it was being driven at speeds less than its actuating speed, through rotation of carrier 133 which is "geared down" with respect to shaft 9. A further reason why the secondary clutch remains engaged under these conditions resides in the fact that the plates thereof were brought together into direct non-slipping engagement with no load on them by the accelerator releasing action, and as static friction is greater than dynamic, or slipping friction, the plates will remain in non-slipping engagement down to speeds lower than that which would be required to bring them into non-slipping engagement if they were transmitting considerable power and slipping.

Amplified motor braking

With the present power transmitting mechanism installed in a motor vehicle or the like, direct drive or high gear motor braking during normal operating conditions is obtained in the manner previously described. Under some conditions, for example, in descending long mountain grades, it is desirable to materially augment the action of the vehicle brake mechanism by causing the momentum of the vehicle to be applied to the engine through the torque multiplying mechanism. Under normal coasting operating conditions, internal gear 172 is allowed to overrun without applying the braking torque of the engine to be applied to shaft 154 when the secondary clutch is disengaged, and I have therefore provided means that may be selectively employed to hold internal gear 172 stationary at will, in order to impose the braking effect of the engine upon the load.

If the vehicle is proceeding with the secondary clutch disengaged, and with the torque multiplying mechanism overrunning, rocking knob 508 actuates wires 366a and 472, which allow piston 388a to pull the secondary clutch throwout mechanism into disengaging position, and locks valve 415 against movement out of pressure position. Rocking shaft 265 in this manner causes the brake band to be contracted about the internal gear. This operation establishes a torque multiplying connection between shafts 154 and 9, and if the accelerator is depressed slightly so as to cause the engine to accelerate sufficiently to cause the primary clutch to engage, release of the accelerator will cause the braking effect of the engine, as amplified by the gear mechanism, to be applied to shaft 154. In the event that the primary and secondary clutches are engaged when knob 508 is actuated, shaft 265 disengages the secondary clutch and applies the brake to the internal gear, with the result that a geared drive is established between shafts 9 and 154. In amplification of the details of this operation, shafts 3, 9 and 154 are rotating synchronously with gear 172 when the primary and secondary clutches are engaged. Operation of knob 508 preferably initially causes the power assembly to disengage the secondary clutch through throwout assembly B and levers 78a. If the accelerator is released while this operation is taking place, the momentum of the vehicle, acting through shaft 154 and gears 164, 145 and 144, tends to accelerate gear 172, but the parts are preferably so designed that the brake is applied to the gear slightly before, or at the point of, completion of secondary clutch disengagement, with the result that gear 172 is decelerated. In view of the fact that the driving faces of the planet gear assemblies are applied to internal gear 172 and sun gear 152, and the former is being decelerated under the influence of the brake, sun gear 152 is driven at increasing speeds, providing the momentum of the vehicle is sufficient to drive shaft 154, and when gear 172 has been brought to rest under the influence of the brake, a positve geared drive exists between shafts 154 and 9, and as the latter is driven at an amplified speed with respect to the former, an amplified engine braking effort is imposed upon shaft 154 for controlling the coasting tendencies of the vehicle.

When the accelerator is depressed with the parts operating in the manner just described, the intake manifold vacuum drops, but valve 415a is nevertheless maintained in pressure position against the action of spring 466, by wire 472.

When it is desired to restore the parts so as to provide automatic operation, knob 508 is rocked so as to restore wires 472 and 366a to the positions shown in Figures 7 and 14. In the event that member 4a is rotating at sufficient speed to maintain weights 56a in their outer positions, and the accelerator is depressed when knob 508 is rocked in this manner, this operation allows valve 415a to bleed and bring the plates of the secondary clutch into engagement, with the result that gear 172 is brought into synchronism with shafts 9 and 154, and the transmission operates in direct drive. When the secondary clutch throwout assembly attains automatic position during the bleeding action, spring 364a restores links 358a and 359a to the position illustrated in Figure 7. Should member 4a be operating at speeds which are below the operating speed of weights 56a when knob 508 is restored to its normal position, the secondary clutch remains disengaged and if the engine is driving the vehicle, gear 172 takes the reactive forces of the planet system and remains stationary against the action of the overrunning clutch, with the result that the transmission operates in geared speed. If desired, the engine may be accelerated in the manner previously described to automatically bring the parts into direct drive.

As it is possible to shift into or out of geared drive at any time, irrespective of the speed of the vehicle or the engine because no synchronizing problems are present, the mechanism is extremely flexible and is foolproof, even in the hands of an inexperienced driver.

High speed geared drive

In ascending long mountain grades, that are too steep for the engine to handle the vehicle in direct drive, it is desirable to prevent the automatic transition from indirect to direct drive from taking place, so that the engine may be utilized to propel the vehicle through the torque multiplying mechanism, at speeds in excess of that corresponding to secondary clutch engagement speed so as to avoid improper and undesirable slippage of the latter.

In order to condition the mechanism for this operation, knob 508 is rocked so as to bring links 358a and 359a out of latching position, and to pull wire 472 into its upper position (Figure 14), in the same manner as that described in connection with the motor braking operation. This operation brings the secondary clutch throwout mechanism into disengaging position and engages the internal gear brake with the result that shaft 154 may be driven by, and accelerated through, pinion 152, planet gears 144, and 145, and stationary internal gear 172 to any desired speed without producing automatic engagement of the secondary clutch because wire 472 maintains valve 415a in pressure position, no matter to what extent the intake manifold vacuum may drop. In the event that the secondary clutch is engaged when knob 508 is operated, piston 388, acting through throwout assembly B, disengages it, and brake band 241 brings the internal gear to rest, thereby promptly establishing a geared drive between shafts 9 and 154.

Although band 241 holds internal gear 172 at rest under these conditions, it is superfluous insofar as forward drive is concerned, because, as has been previously explained, clockwise rotation of pinion 152 causes planet gears 144 to react against, and tend to produce counterclockwise rotation of, internal gear 172. Counterclockwise rotative tendencies of internal gear 172 cause rollers 189 to lock it against rotation. The secondary clutch and the brake may therefore be separately operated to provision the mechanism for the operation just described, but they are preferably interconnected for the purpose of simplifying the design of the control mechanism therefor. Band 241, under these conditions, restrains movement of gear 172 in a counterclockwise direction, and therefore should a reversal of drive occur, and shaft 154 tend to overrun with respect to shaft 9, when the parts are disposed in this position, amplified motor braking is obtained. Operation of the brake for the internal gear and the release mechanism for the secondary clutch simultaneously in this manner therefore provisions the mechanism for permanent or high speed gear operation, and, at the same time, provisions it for amplified motor braking, and the control mechanism is accordingly simple in design.

However, should it be undesirable, in the particular type of drive involved, to apply a braking influence to gear 172 when the secondary clutch is disconnected for obtaining a permanent torque multiplying drive, the secondary clutch and shaft 255 may be independently actuated, and it is to be understood that this method of their control is also embraced by the present invention.

Reverse drive

The gear mechanism employed for effecting forward torque multiplying drive is also utilized to obtain reverse drive. Carrier member 133 is adapted to be locked against rotation in the manner previously set forth when reverse drive is employed.

When it is desired to condition the mechanism for reverse drive, the engine is decelerated to idling speed and shaft 203 is oscillated by withdrawing knob 508 into its outermost position, which causes valve R to admit fluid to the right hand end of cylinder 298, thereby causing piston 304 to move to the left and shift shaft 203 into reverse position. This operation causes latch member 207 to enter the space between two adjacent teeth 209 formed on cage or carrier member 133, thereby locking the carrier and sleeve 135 against rotation. Oscillation of shaft 203 in this manner is preferably designed to cause latch member 196 to be withdrawn from the particular notch with which it is engaged in member 187, and to simultaneously shift sliding clutch member 159 into a position where the teeth 162 thereof are engaged with internal teeth 223 formed on the inner wall of sleeve 171. When shaft 203 is rocked in this manner, member 487 carried thereby picks up collar 488 and pulls wire 469 up into contact with member 465, to thereby maintain valve 415a in pressure position should the intake manifold vacuum fall when the engine is accelerated in reverse drive.

With shaft 203 oscillated in this manner, the parts are disposed in reverse drive condition, and acceleration of the driving shaft causes the primary clutch mechanism to automatically couple shafts 3 and 9 in the manner previously described, and clockwise rotation of pinion 152, carried thereby, produces counterclockwise rotation of planet gears 144 and 145 about their axes. The axes of the planet gears are restrained against planetary movement because of the locked condition of the carrier member 133 at this time. Counterclockwise rotation of planet gears 144 produces similar rotation of internal gear 172, and driven shaft 154 to which it is coupled by clutch member 159. In view of the fact that sleeve 135 is held stationary, the secondary clutch mechanism is maintained in disengaged or inoperative condition by the power assembly, regardless of to what extent shafts 9 and 154 are accelerated in reverse drive. During this operation, planet gears 145 drive gear 164 in a clockwise direction, but as the latter is disconnected from clutch member 159, it merely idles on the forward end of shaft 154. Member 187 also rotates within member 179 in a counterclockwise direction when reverse drive is taking place, but as these parts are not under load under these conditions, no anti-friction bearing devices are required.

Should latch member 207 strike one of the teeth 209 carried by member 133 when shaft 203 is rocked, it will remain so engaged until rotation of shaft 9 produces a slight movement of member 133. When member 133 undergoes a slight movement, spring 211 promptly snaps latch 207 between teeth 209, and as this action occurs before the parts can attain momentum, no shock is set up thereby.

In view of the fact that power is transmitted through gears 152, 144, 145 and 164 in forward drive, and through gears 152, 144, and 172 in reverse drive, it is possible to vary the ratios of forward and reverse drive, and also the ratios with respect to each other, as desired, by properly designing the gears employed, although it is to be understood that the compound planet gear assembly may be used solely for forward drive, and an auxiliary reverse gear mechanism associated with the transmission to provide reverse drive, if desired, without departing from the spirit of my invention.

When it is desired to restore the parts to forward drive condition, shaft 203 is rocked into the position shown in Figure 1, by pushing knob 508 into its original position, thereby freeing member 133, locking member 187, and coupling member 159 and gear 164.

*Selective disconnection of the driving and driven shafts*

Although, as previously set forth, the prime mover is normally disconnected from the load when it is operating substantially at idling speeds, the transmission normally automatically establishes a driving connection between the driving and driven shafts when the prime mover is accelerated. If it is desired to prevent this automatic power transmitting operation from taking place, so that the prime mover may be operated at speeds which are substantially above idling speed, so as to allow it to "warm up", or for the purpose of facilitating adjustment of the carburetor thereof, if it is an engine of the internal combustion type, knob 508 is shifted longitudinally into its intermediate or neutral position.

Actuation of knob 508 causes the power assembly to rock shaft 203 into its intermediate position so as to bring teeth 162 of member 159 out of engagement with teeth 163 of gear 164, and the parts are so designed, that when shaft 203 is oscillated, lever 205 is simultaneously actuated to cause latch plunger 196 to be withdrawn from latching engagement with member 187. When the parts are arranged in this condition, and the driving shaft is accelerated, the primary clutch couples shafts 3 and 9 as previously explained, and the resulting rotation of gear 152 produces counterclockwise rotation, and also, to a less degree, clockwise planetation of the planet assemblies and clockwise rotation of gear 164, but as the latch is disconnected from member 159, no power is transmitted to shaft 154. As member 187 is free for counterclockwise rotation, gear 172 may rotate counterclockwise under the influence of the reaction of the planet assemblies, but as gear 164 is not connected to the load, the reaction forces are of small magnitude, and the resulting rotation is accordingly of low magnitude. Although member 133 may be rotated through planetation of the planet assemblies, the speeds involved in reverse drive are usually so low as to be insufficient to cause weights 56a to rock and engage the secondary clutch, but even if such engagement did occur, it would be ineffective to cause the transmission to deliver power because of the disconnected condition of member 159.

On the other hand, should it be desired to allow the engine to operate at speeds in excess of idling speed and be free of the gear mechanism, for instance in winter when the gear lubricants would congeal and exert considerable resistance to the normal idling action of the gears when the transmission is in neutral, knob 461 may be actuated so as to move valve 415 into pressure position, and as cam 373 cooperates with lever 371 to unlatch links 358 and 359, piston 388 is operable to completely disengage the primary clutch. Disengaging the primary clutch renders it incapable of establishing a drive between shafts 3 and 9 in response to acceleration of shaft 3.

If desired, wire 455 may be interconnected with, and actuated by, a suitable switch for controlling the engine starter circuit so as to insure complete disengagement of the primary clutch when the engine is started and thereby prevent inadvertent propulsion of the vehicle or, if desired, the switch may be connected to shaft 203 so as to break the starting motor circuit unless the transmission is in neutral.

When the engine is stopped, with the transmission disposed in forward or reverse drive, the pressure drops in unit 335 and allows springs 45 and 45a to engage the primary and secondary clutches respectively, and springs 306 and 307 automatically restore lever 206 to neutral position. Movement of lever 206 into neutral position causes wire 366 to pull links 358 and 359 into unlocked condition, with the result that when the engine is again started, the fluid pressure builds up and moves the parts of the primary clutch into disengaging position. This feature, in connection with the fact that springs 306 and 307 hold lever 206 in neutral position preferably until the pressure in unit 335 has built up sufficiently to move the secondary clutch throwout mechanism into automatic position, makes it impossible to inadvertently propel the vehicle, should knob 508 be left in forward or reverse drive position when the engine stops. If the engine is accelerated to speeds substantially in excess of idling speeds under these conditions, the primary clutch will bleed into engaged position, but if it is desired to avoid this operation, an auxiliary wire may be connected to lever 371 and wire 469 so as to maintain the primary clutch in disengaged condition after the transmission has automatically shifted into neutral, and require pushing knob 461 into its bleed position before the transmission operation may be resumed.

By reason of the smooth operating characteristics of the primary automatic clutch mechanism, and its ability to smoothly transmit torque efficiently under slipping drive conditions, if called upon, it could in fact be employed to directly couple shafts 9 and 154, and it would stand up under these conditions in view of the special facings employed therein and its durable nature. Therefore, the ratio of the gearing interposed between shafts 9 and 154 may have a fairly low value of torque multiplication and yet permit the vehicle to be started on steep grades with perfect ease. This is particularly a desirable characteristic for the reason that, when the vehicle is being accelerated through the intermediary of the gears, the relative speeds of shafts 9 and 154 is not excessive, and when shaft 154 reaches sufficient speed, and the secondary clutch operates, it is not called upon to bring two shafts into synchronism that are rotating at widely variant speeds, and it therefore can smoothly and efficiently perform the functions required.

While the mechanisms shown provide only a single gear reduction, which is entirely satisfactory in a light vehicle of the pleasure car class, it is to be understood that in heavy duty vehicles, such as trucks, buses, rail cars and the like, two or more of the transmission units disclosed may be disposed in series behind a single primary clutch to give two or more gear reductions, and in such case the weights of the first secondary clutch mechanism would be so designed as to operate considerably before the centrifugal weights of the second secondary automatic clutch mechanism came into play, so that a direct drive would be established between the shaft coupled by the first secondary automatic clutch mechanism while torque is transmitted between the shaft coupled by the secondary clutch mechanism through the second gear reduction. If desired, one or more of the gear mechanisms utilized may be of the character shown in co-pending application, Serial Number 643,744, filed November 21, 1932, but the high speed assembly is preferably of the type shown in the present case so that the accelerator may be released to selectively shift the transmission into direct drive when sufficient speed has been attained. In such a power transmitting mechanism, final direct drive conditions are reached when the primary automatic clutch mechanism and all of the secondary automatic clutch mechanisms are fully engaged and a direct drive is established from the engine to the rear wheels of the vehicle.

With particular reference to the term "direct drive", I wish it to be understood that this term, as employed in the specification and claims of the present case, is intended to be interpreted as relating to the immediate parts of the transmission which are "directly connected" by the novel torque multiplying and ratio changing mechanism, which, in the present instance, are members 9 and 154. For instance, the present mechanism is designed for use in a motor vehicle, and as the gears utilized in the rear axles of such vehicles usually involve a gear reduction, it is obvious that when the transmission is operating in "direct drive" it does not directly connect the engine and the vehicle wheels. Moreover, an auxiliary gear reduction may be employed in front of, or behind, the present transmission, and the appended claims are intended to embrace my mechanism when it is used in this relation.

In a vehicle provided with power transmitting mechanisms of the character that I have disclosed, if it is desired to start the vehicle on a grade, the engine is accelerated and the primary automatic clutch mechanism operates to establish a slipping torque transmitting coupling between the prime mover and the intermediate shaft, as previously explained, and the vacuum cylinder assembly is preferably designed so as to render the clutch solely speed responsive, in view of the fact that the facings employed stand up under such use. If desired, however, an optional bleeding organization, wherein exhaust port 424 is of larger area, may be used so as to introduce a power responsive phase into the operation of the primary clutch if it is desired to reduce the slip period thereof, or if the facings utilized will not stand excessive slippage. Rotation of the intermediate shaft, through the medium of the interposed gearing, causes an amplified torque to be transmitted to the driven shaft. Through the slipping drive coupling existing between the prime mover and the load, the prime mover is allowed to accelerate and operate efficiently on a relatively high point on its speed-torque curve to develop adequate power to start the vehicle, even though the interposed gear mechanism may have only a low torque value of amplification. During this operation, the secondary automatic clutch mechanism is inactive since it relies for its actuation upon the speed of the load, and the only connection existing between the prime mover and its load is that established by the interposed gearing, which supplies sufficient torque amplification to enable the engine to effectively handle the load under these conditions.

By way of a concrete example, assuming that the novel transmission mechanism herein disclosed is incorporated in a motor vehicle, and the transmission gearing has a reduction of two to one, the primary clutch mechanism initiates operation at an engine speed of five hundred revolutions per minute, completing its operation at an engine speed of one thousand revolutions per minute, a non-slipping drive with torque amplification is thereby established between the engine and the rear wheels when the engine is operating substantially at one thousand revolutions per minute. With normal rear axle gear ratios, this results in a vehicle speed of ten miles per hour, although it is to be understood that completion of primary clutch operation may take place at a higher or lower vehicle speed, depending upon whether the vehicle is ascending or descending a grade or is proceeding on a level surface.

Under these conditions, the secondary clutch mechanism, due to the fact that it is actuated in accordance with the speed of the driven shaft and vehicle wheels coupled thereto, may be designed to operate to directly couple the engine and rear wheels at any desired vehicle speed, for instance fifteen miles per hour, and such operation is therefore entirely independent of speed fluctuations of the engine.

With particular reference to the term "speed", employed in the specification and claims, in connection with the operation of the primary and secondary clutches, it is to be understood that this term does not limit the clutches to the speed response type, but it is designed to embrace clutches of the type wherein only a portion of their operation is speed responsive.

I have illustrated a particular gear organization for effecting an automatic transition in the drive when the accelerator is released with the parts operating in a predetermined speed range, so that if conditions are such that it is desirable to apply substantial torque to the load over a wide load accelerating range, the accelerator may be continuously applied to maintain the transmission in gear and thereby secure torque multiplication over the entire range, without a break in the delivery of power, or, if desired, the accelerator may be momentarily released to shift the parts into direct drive. The mechanism I have illustrated effectively produces this result, and constitutes the preferred embodiment of my invention, but it is to be understood that other gear and clutch organizations may be used without in any way departing from the spirit of my invention, and the appended claims are intended to embrace any gear and clutch organization wherein a reversal of driving forces is operable to effect an acceleration of the speed responsive part or parts of the mechanism which is utilized to establish a direct drive between the driving and driven members, or effects a shift up to the next higher gear.

Although I have described shafts 3 and 9 as driving shafts, it is to be understood that, if desired, power may be applied to other parts of the mechanism, such as shaft 154, and be taken from shafts 3 or 9, and the appended claims are intended to embrace my mechanism when it is used in this manner.

Although I have illustrated the mechanism for controlling the secondary stage of secondary clutch operation as being associated with, and actuated by, the variations in the magnitude of the torque applied to the back-stop (the over-running clutch) of the planetary gear assembly, it is to be understood that I merely prefer to achieve this result in this manner and do not intend to be limited to this mechanism as many other arrangements might be used and a satisfactorily operating transmission obtained.

With reference now to Figures 17, 18 and 19, I have illustrated a modified form of my invention wherein a vacuum powered cylinder is associated with the secondary clutch of the mechanism illustrated in Figures 1 to 16, inclusive, for holding it in automatic position when the engine is operating substantially at idling speeds, with the result that it is unnecessary to associate a diaphragm or like member with valve 415a.

With continued reference to these figures, a lever 352b is secured to shaft 265 by means of a cap screw 353b, and screw 354a carried thereby is adapted to cooperate with lever 356a in a manner similar to that described in connection with the first form of my invention. Threaded into lever 352b is a screw 525 which is adapted to be locked in place therein by means of a locknut 526. Screw 525 cooperates with a lever 527, which is mounted for free rocking movement on shaft 265 and carries a pin 528 at its upper end. Pin 528 cooperates with a clevis 529 which is adapted to be locked in adjusted relation with a threadedly associated link member 531 by means of a locknut 532.

Rod 531 extends within a cylinder denoted generally at 533, and secured thereto by means of a nut 534 are a pair of plate members 535 and 536, and a piston element 537. The left hand end of cylinder 533 is placed in fluid communication with intake manifold 445 by means of a pipe 538, and a fitting 539 which is associated with pipe 448. In this form of the invention, pipe 448 leads directly to diaphragm casing 441.

In this form of the invention, shaft 416a is connected to member 465 by means of a lever 463a and as no vacuum diaphragm assembly is associated with shaft 416a, spring 466 will hold the parts in bleed condition as illustrated in Figure 19 at all times except when wires 469, 471 or 472 are actuated to maintain the parts in pressure position.

This mechanism functions in substantially the same manner as the previously described form of my invention, the differences residing in the means employed to maintain the secondary clutch in automatic position when the engine is operating at idling speed.

When the engine is started with the secondary clutch latch locked, the resulting vacuum created in the intake manifold, acting through pipe 448 and 538, pulls piston 537 into the position illustrated in Figure 17, with the result that rod 531, acting through lever 527, screw 525 and shaft 265, pulls the secondary clutch parts into the position illustrated in Figure 1. So long as no power is transmitted through the transmission gears, the secondary clutch oil cylinder is ineffective to hold the clutch parts in automatic position, for the reason that spring 466, acting through lever 463a and shaft 416a maintains valve 415a in bleeding position, with port 419 disposed out of registry with intake port 421.

When the parts are disposed in the condition just described, and the engine is accelerated with the transmission in forward drive, the primary clutch engages and torque reaction occurs in the manner previously described. When torque reaction occurs, overrunning clutch carrier 179, acting through lever 495 and wire 471, pulls lever 463a into pressure position, with the result that fluid is admitted to cylinder 384a and forces piston 388a to the right, and rod 386, acting through lever 399 and shaft 394, holds the parts in the position shown in Figure 18. It is accordingly seen that when the intake manifold vacuum diminishes in response to acceleration of the engine, the secondary clutch parts will nevertheless be held in automatic position by the oil cylinder assembly.

With the transmission operating in the manner just described and with valve 415a held in pressure position by the overrunning clutch carrier, when the secondary clutch engages and relieves the carrier load to a predetermined extent, spring 183 is allowed to pull lever 463a into bleeding position, so as to effect the torque responsive stage of secondary clutch engagement in a manner similar to that described in connection with the previously described modification of my invention. This operation takes place for the reason that as the intake manifold vacuum is so low that piston 537 is ineffective to hold the parts in automatic position under these conditions, bleeding the fluid out of cylinder 384a allows springs 45a to bring the clutch parts into engaging position.

When it is desired to operate the transmission at high speeds with a torque multiplying drive, knob 508 is rocked in the manner previously described so as to release the secondary clutch latch and to actuate wire 472, to thereby bring lever 463a into pressure position. This operation allows piston 388a, acting through lever 352b and shaft 265, to dispose the clutch parts in disengaging position and apply the brake to the internal gear. During this operation, screw 525 merely moves away from lever 527 and although the vacuum cylinder may operate in response to intake manifold pressure variations, it does not influence operation of the secondary clutch under these conditions.

With the transmission in direct drive, if the accelerator is released, the resulting intake manifold vacuum moves piston 537 into the left hand end of its cylinder, thereby pulling the parts into automatic position. During this operation, pin 412b merely rides in the slot in link 411b and accordingly does not produce movement of piston 388. As the other operations of this mechanism are exactly similar to those described in connection with the first form of my invention they accordingly will not be set forth.

In Figures 20, 21 and 22, I have illustrated a modified form of controlling mechanism for my transmission illustrated in Figures 17, 18 and 19, the major difference thereover residing in the provision of a second latch member for the secondary clutch, which is so related with the other parts of the mechanism that it prevents the secondary clutch from being bled into engaged position when the transmission is in neutral or reverse gear.

With continued reference to these figures, in this form of the invention a lever 352c is secured to shaft 265 by means of a cap screw 353c and link 531 is pivotally connected to the upper end thereof by means of a slotted clevis 529a and a pin 528a. Threaded into a boss portion 540 formed on lever 352c is a screw 541 which is adapted to be locked therein by means of a locknut 542. Screw 541 is adapted to cooperate with a lever 356b, and the latter is connected to a latch mechanism for selectively arresting member 352c in automatic position against the action of springs 45a. As the latch associated with lever 356b is exactly similar in structure to that associated with lever 356a, corresponding reference characters, with the subscript "b", will be applied to like parts thereof in order to simplify the description thereof.

The latch associated with lever 356a is adapted to restrain the fluid actuated cylinder from pulling shaft 265 into disengaging position in the manner previously described, and the latch associated with lever 356b is adapted to selectively maintain shaft 265 in automatic position against the action of springs 45a. The former latch is controlled in the manner previously described, and the latch associated with the lever 356b is preferably controlled by the overrunning clutch carrier as follows.

With particular reference to Figure 22, control wire 366c and sheath 369c are brought over the transmission housing, and wire 366c is connected to a swiveled member 543 located on lever 495a by means of a set screw. The parts are so designed, that when a load is placed upon the overrunning clutch carrier, lever 495a is rocked in a clockwise direction and pulls wires 471 and 366c so as to rock lever 463a into pressure position and lift latch members 358b and 359b upwardly into unlatching position against the action of spring 364b, with the result that the power assembly comes into action and holds the parts in automatic position. In view of the fact that in the event the intake manifold vacuum is low when this operation takes place, springs 45a tend to bring the secondary clutch parts into engaging position as soon as members 358b and 359b are tripped. I accordingly provide sufficient lost motion to allow wire 471 to pull lever 463a into pressure position before members 358b and 359b are actuated.

The operation of this form of my invention is as follows. With the transmission disposed in forward drive, and with the engine operating at idling speed, the parts assume the position shown in Figure 20, with shaft 265 maintained in automatic position against the action of springs 45a by the vacuum cylinder assembly, and also by links 358b and 359b. When the engine is accelerated with the parts in the positions just described, the primary clutch engages in the manner previously described and the intake manifold vacuum diminishes, with the result that if the vacuum cylinder assembly were relied upon to hold the secondary clutch in automatic position, springs 45 would overcome it and start to move the parts toward engaging position. Latch members 358b and 359b, however, acting through lever 356b, screw 541 and lever 352c, holds shaft 265 in automatic position under such low vacuum conditions.

When the secondary clutch engages, in response to acceleration of the transmission parts, the overrunning clutch carrier is placed under load and lever 495a rocked in a clockwise direction with the result that wire 471 is pulled so as to rock lever 463a into pressure position, which admits fluid to cylinder 384a and allows piston 388a to come into play and hold the clutch parts in automatic position. Clockwise rocking movement of lever 495a, preferably after valve 415a has been shifted into pressure position, also pulls wire 366c so as to unlock links 358b and 359b.

The structure just described releases the latch that maintains the secondary clutch parts in automatic position, but at the same time it is seen that the oil cylinder is actuated so as to take the load of springs 45a and hold the parts in automatic position. This operation accordingly automatically transfers the forces from lever 356b to lever 352c. When the secondary clutch engages and relieves the load on the overrunning clutch carrier, lever 495a rocks in a counterclockwise direction and allows lever 463a to move to bleeding position under the influence of spring 466, with the result that fluid is allowed to bleed out of cylinder 384a, and springs 45a effect the secondary or torque responsive stage of secondary clutch engagement in the manner previously described. When the accelerator is released when the transmission is operating in direct drive, the resulting intake manifold vacuum, acting through piston 537 and rod 531, pulls lever 352c into automatic position, where it is arrested by links 358a and 359a. Movement of lever 352c in this manner allows spring 364b to pull links 358b and 359b into locking relationship, but, as previously pointed out, this does not result in decreasing the plate pressure so long as the speed of the parts is maintained.

With the engine operating at idling speed, and with the parts disposed in the position shown in Figure 20, knob 508 is pulled into its outermost position and the engine is accelerated to cause the primary clutch to automatically couple shafts 3 and 9 in the manner previously set forth in order to establish reverse drive. In view of the fact that no load is placed upon the overrunning clutch carrier, when the transmission is operating in reverse drive, members 358b and 359b remain in locked condition and thereby hold the secondary clutch throwout mechanism in automatic position. This structure accordingly eliminates the need for mechanism for causing valve 415a to assume a pressure position when the transmission is shifted into reverse drive. This is likewise true when the transmission is disposed in neutral.

When it is desired to transmit power through the gears at high speed, knob 508 is rocked in the manner previously described, so as to lift links 358a and 359a out of latching relationship, and rock lever 463a into pressure position, with the result that piston 388a pulls the secondary clutch into disengaging position. When this operation is taking place, screw 541 moves away from lever 356b and pin 528a takes up the lost motion in clevis 529a.

In view of the fact that the vacuum cylinder pulls the parts into automatic position when the engine is operating at idling speed, the connection between the overrunning clutch carrier, and the lever 463a may be omitted if desired, and, in Figures 23 and 24 of the drawings, I have illustrated a modified structure of this character. With continued reference to these figures, a modified coupling member 465b is pivotally connected to lever 463a, and only one Bowden wire assembly is associated with it, namely, wire 472 and housing 478 which are associated with the dash controls, wire 471 and housing 477 being omitted from this form of the invention.

This mechanism operates in substantially the same manner as the mechanism just described, except that the secondary clutch latch mechanism is not released until the load is relieved from the overrunning clutch carrier, and the structure that I preferably employ for achieving this result is illustrated in Figure 24. With continued reference to this figure, lever 495 extends upwardly above shaft 185, and a lever 544 is pivotally connected thereto by means of a pin 544.1. Pivotally connected to lever 544, by means of a pin 554.2 or the like is a dog member 544.3 which is resiliently urged toward a stop 544.4 formed on lever 544, by means of a tension spring 544.5. Dog 544.3 is adapted to cooperate with a pin or tripping member 544.6, which is secured to housing 1 in any suitable manner. Control wire 366c, which is employed to actuate the secondary clutch latch parts, is connected to a swivel member 544.7 by means of a set screw 544.8. Member 544.7 is swivelly mounted on member 544 in any suitable manner.

When there is no load on the overrunning clutch carrier, and the secondary clutch latch is locked, the parts assume the positions illustrated in full line in Figure 24, with wire 366c disposed in retracted position and with the entire lever assembly spaced from pin 544.6. When a load is placed upon the overrunning clutch carrier, lever 495 moves clockwise with shaft 185, and the lower end of lever 544 remains stationary in view of the fact that wire 366c is connected thereto at the center of its axis of rotation.

After dog 544.3 has contacted pin 544.6, as a result of the rocking action of lever 495a, further rocking movement of lever 544 causes dog 544.3 to rock counterclockwise about pin 554.2, against the action of spring 544.5 until dog 544.3 clears stop pin 544.6 at which time the dog 544.3 snaps back into its initial position.

With the parts in the position just described, when the secondary clutch engages and relieves the overrunning clutch carrier of a predetermined portion of its load, lever 495 rocks in a counterclockwise direction and brings dog 544.3 into contact with pin 544.6, and as stop 544.4 causes dog 544.3 and lever 544 to act as a rigid lever, further counterclockwise rocking movement of lever 495 causes lever 544 to rock in a clockwise direction into the position A, illustrated by dot-dash lines in Figure 24, with the result that wire 366c is actuated so as to bring links 358b and 359b into unlatching relationship and the secondary stage of engagement is effected. When lever 495 has been restored to the position illustrated in full line in Figure 24 by reason of the overrunning clutch carrier being relieved of its load, lever 544 and dog 544.3 assume the dotted line position designated as B in that figure.

With the parts disposed in position B, (Figure 24), when shaft 265 is restored to automatic position through actuation of link 411b or 532, spring 364b restores links 358b and 359b, to their latched position, illustrated in Figure 20, and pulls wire 366c so as to restore lever 544 and dog 544.3 to the full line position illustrated in Figure 24.

This mechanism functions in a manner similar to that illustrated in Figures 20, 21 and 22 of the drawings, with the exception of the secondary clutch action, and this will now be described. When the engine is started, with the parts disposed in the positions illustrated in Figure 20, the vacuum cylinder assembly, acting through rod 531 and lever 352c, pulls the secondary clutch parts into automatic position. In view of the fact that spring 466 maintains lever 463a in bleed position, the oil cylinder remains inactive during this operation, and the pin carried by lever 352c merely takes up the lost motion in clevis 411b.

With the parts disposed in the position just described, and with lever 291 disposed in forward drive position, acceleration of the engine causes the primary clutch to automatically engage and couple shafts 3 and 9 in the manner previously described, and although the intake manifold vacuum diminishes as this operation proceeds, the parts are nevertheless held in automatic position by links 358b and 359b. Power is accordingly automatically transmitted from the driving to the driven shaft, the overrunning clutch carrier is placed under load, and lever 544 and dog 544.3 are brought into position A (Figure 24). When the secondary clutch engages, in response to acceleration of the transmission parts, the load on the overrunning clutch carrier diminishes, and when lever 495 rocks counterclockwise, lever 544 actuates wire 366c and releases the secondary clutch latch mechanism, thereby allowing the full driving pressure of springs 45a to be imposed upon the clutch plates. In view of the fact that by the time this operation takes place the intake manifold vacuum has diminished to a low value, movement of the secondary clutch parts toward engaged position is retarded only by the rate of flow of air out of the right hand side of cylinder 533, and I contemplate predetermining the size of the opening in the right hand cylinder head so as to control movement of the secondary clutch parts into engaged position in such a manner as to produce the desired rate of pressure build-up during the secondary stage of the clutch engagement. If desired, however, a restriction may be placed in line 538 or 448, for impeding the flow of air into the left hand side of cylinder 533 and the appended claims are intended to embrace an organization of this character. If desired, a dashpot or other retarding mechanism of the type shown in my co-pending application Serial Number 685,442, filed August 16, 1933, may be associated with shaft 265 for controlling movement of the parts into engaged position under the influence of springs 45a, without departing from the spirit of the present invention.

With the transmission operating in forward drive, and with the secondary clutch fully engaged in the manner just described, if the accelerator is released, the resulting intake manifold vacuum, acting through the vacuum cylinder assembly and rod 531, moves the parts into automatic position and spring 364b automatically restores links 358b and 359b to the position shown in Figure 20, and lever 544 and dog 544.3 are restored to position A, and if the vehicle or other load to which the transmission is connected is decelerated sufficienly low, the primary and secondary clutches will disengage in the manner previously described.

If it is desired to operate at high speeds with the transmission in gear, knob 508 is oscillated in the manner previously described so as to pull wire 472 and rock lever 463a into pressure position against the action of spring 466. Rocking knob 508 in this manner, through wire 366a, lifts links 358a and 359a and thereby allows piston 388a, acting through rod 411b, to pull shaft 265 into disengaging position. During the operation just described, pin 528a merely takes up the lost motion in clevis 529a, with the result that the vacuum cylinder assembly does not undergo movement. Piston 388a accordingly maintains the secondary clutch parts in disengaging position, and although wire 366c is operable to bring links 358b and 359b into unlatched relationship when loads are placed upon and relieved from the overrunning clutch carrier, spring 364b comes into play as soon as dog 544.3 has passsed pin 544.6, and restores the links to latching relationship in view of the fact that screw 541 is disposed out of the path of movement of lever 356b under these conditions.

When it is desired to operate in reverse drive, knob 508 is shifted into its outermost position with the result that the cylinder assembly 298 shifts lever 291 into reverse position. Acceleration of the engine causes engagement of the primary clutch in the manner previously described, and establishes a reverse drive between the prime mover and the load. In view of the fact that no load is placed upon the overrunning clutch carrier when the transmission is operating in reverse drive, lever 495 is accordingly inoperative to lift links 358c and 358b out of latching relationship, with the result that the secondary clutch parts are maintained in automatic position under these conditions.

If it is desired to maintain the transmission in direct drive, i. e., with the secondary clutch engaged at all times, an atmospheric bleed valve of the type described in connection with a modification of my invention that will be hereinafter described, may be associated with line 538 so as to establish a communication between the right hand end of the lever at the end of cylinder 533 and the atmosphere to thereby render the vacuum cylinder assembly non-responsive to pressure fluctuations in the intake manifold.

In connection with this form of my invention, it is to be understood that although I have illustrated a speed responsive secondary clutch mechanism for automatically establishing a direct drive between the engine and load, a simple clutch, solely under the control of the oil and vacuum cylinders, may be employed and controlled by the torque reaction mechanism without departing from the spirit of the present invention. Moreover, the intake manifold vacuum may be employed to actuate the oil pressure controlled cylinders, and a thoroughly satisfactorily operating mechanism obtained and the appended claims are intended to embrace my devices when they are operated in this manner.

In Figures 25 to 33 of the drawings, I have illustrated a further form of power transmitting mechanism, also forming a part of my invention, and which primarily differs from those previously described in the construction of the mechanism for controlling the primary and secondary clutches, and the reverse and forward drive shifting mechanism.

With continued reference to these figures, a member 545 is swiveled on lever 291, and secured in an aperture therein, by means of a set screw 546, is a control wire 547. A sheath 548 houses wire 547, and is supported in a bracket 549 which is secured to the transmission housing by means of screws 551. Housing 548 is secured to the vehicle dash 459 by means of a nut 552, and an operating knob 553 is associated therewith and is connected to wire 547. Knob 553 may be shifted from the forward drive position illustrated in Figure 25 into an intermediate position, and a withdrawn position, so as to shift lever 291 into neutral and reverse positions respectively.

Also secured in an aperture in member 545, by means of a set screw 555, is a second control wire 556 which is enclosed in a sheath 557, supported by bracket 549. Wire 556 is adapted to actuate mechanism for tripping the primary clutch latch and breaking the starting motor circuit when lever 291 is shifted into neutral position and this structure will be described hereinafter.

With particular reference to Figure 25, a lever 565 is secured to shaft 110 by means of a key 566 or the like, and has a downwardly extending arm 567 to which one end of a tension spring 568 is secured. Spring 568 is anchored to any suitable part the mechanism by means of a bracket 569, and serves to urge the shaft 110 into retracted position, with fingers 109 out of contact with throwout assembly A. Threaded into an enlarged, axially offset portion 571 formed on lever 565 is a screw 572 which is adapted to be locked in adjusted position therein by means of a nut 573, and which cooperates with a lever 574 which is journaled on shaft 110.

Lever 565 is adapted to be pulled toward disengaging position by means of a vacuum operated mechanism to be hereinafter described, and a latch mechanism is associated with lever 574 for selectively arresting the parts in automatic position. This latch may be constructed in any desired manner and may be of any suitable form, but it is preferably constructed similarly to the previously described latch mechanisms and it comprises a link member 575, connected to lever 574 by means of a pin 576 and is connected to a similar link member 577 by means of a pin 578. Links 575 and 577 are provided with abutting faces 579 and 581 and the links are urged toward abutting position by means of a tension spring 582, which is hooked into a member 583 pivoted to pin 578, and an eye 584 formed on lever 574. Link 577 is journaled on a pin 585 which is adapted to be supported in any suitable manner, as, for instance by the prime mover with which the mechanism is associated.

Links 575 and 577 form, in effect, a toggle, and in Figure 25, they are shown in locked or latched condition with their faces abutting, and screw 572 is shown as being engaged with lever 574, under the influence of the vacuum mechanism, and under these conditions, the primary clutch throwout shaft and bearing assembly assume the positions shown in Figure 1. The links are adapted to be moved out of locked condition against the action of spring 582 by means of a Bowden wire assembly consisting of a wire 586 extending through an aperture in an upwardly extending arm 587 of member 583 and has an enlarged end 588 and a flexible sheath 589. Wire 586 is actuated so as to pull links 575 and 577 upwardly past dead center against the action of spring 582 by mechanism that will be presently set forth. In the event that the vacuum mechanism is tending to rock levers 565 and 574 in a counterclockwise direction when wire 586 is actuated, lever 574 forces the links into the dotted line position shortly after they have been pulled past dead center.

When wire 586 is disposed as seen in Figure 25, and the vacuum or other mechanism releases lever 565 and allows the parts to move toward engaged position under the influence of springs 45, spring 582 restores the links to latched condition as soon as automatic position is attained. Further movement of the throwout parts toward engaged position is not restricted by the links as screw 572 merely moves away from lever 574 under such conditions.

If desired, a pedal may be connected to shaft 110 and employed to declutch the mechanism by first actuating wire 586 so as to shift the links out of locking relation and then depressing the pedal, but I preferably effect this operation by a power operated mechanism that will now be described.

Connected to the upper end of lever 565, by means of a clevis 601 and a pin 602 is a rod 603 which is threaded into a sleeve 604. Sleeve 604 constitutes a piston rod and extends into a cylinder 605 which is supported by means of a bracket 606 on any part of the mechanism by means of a cap screw 607.

A pair of plates 608, having a piston member 609 disposed between them, are clamped to the end of sleeve 604 by means of a cap screw 610 which is threaded therein. Cylinder 605 is provided with a head 611, having an apertured bleed member 612 whose aperture aligns with a similar aperture formed in head 611. Sleeve 604 is disposed in closely fitting sliding engagement with a member 613 secured to head 611, and which constitutes a combined guiding and valving assembly. Sleeve 604 is further provided with a pair of apertures 614A and 614B which cooperate with member 613 in a manner that will hereinafter appear.

The piston and cylinder assembly just described may be operated by any suitable fluid, but in the present instance it is operated by the vacuum established in the intake manifold incident to operation of the internal combustion engine, and to this end a vacuum line 615.1 is tapped into the left-hand side of cylinder 605 and is tapped into the body 615.2 of a controlling valve 615.3, which is supported in any suitable manner (not shown). Valve 615.3 is provided with a vertical passage 615.4, through which air is adapted to pass between the intake manifold and the cylinder. A valve member 615.5, having a reduced portion 615.6, is slidably mounted in a horizontal bore 615.7 located in valve body 615.2. Valve 615.5 is adapted to be actuated by means of a rod 615.61, which is connected thereto by means of a cotter pin or the like. Rod 615.61 is preferably connected to the accelerator assembly of the motor vehicle in which the mechanism is mounted, and with the parts disposed in the position shown in Figure 25, the accelerator is fully released. A pipe 615.8 is tapped into valve body 615.2 and is connected to the intake manifold 445 of the internal combustion engine in any well known manner. An intake port or aperture 615.9 intersects bore 615.7 and is adapted to cooperate with reduced portion 615.6 of valve member 615.5.

With the parts in the positions shown in Figure 27, the intake manifold is placed in communication with the cylinder 605, and if the engine is operating substantially at idling speed, the primary clutch throwout mechanism will assume the position in which it is shown in Figures 1 and 25, with reaction plate 38 held in automatic position. When valve member 615.5 is shifted to the left, in response to depression of the accelerator, reduced portion 615.6 thereof is brought into registry with aperture 615.9, with the result that air is allowed to comparatively rapidly pass through aperture 615.9, around reduced portion 615.6, through a passage 615.95 and pipe 615.1, and into the left hand end of the cylinder, with the result that the piston may move to the right in response to the action of the clutch springs.

I prefer to employ a valve member which is operated substantially in accordance with the power delivery controlling mechanism of the prime mover, as it provides definite control of the flow of air to and from the cylinder assembly, but it is to be understood, that, if desired, pipe 615.1 may be tapped directly into the intake manifold if it is located so that the pressure variations are properly coordinated with the magnitude of the power output of the prime mover to provide the desired operation of the cylinder assembly, or suitable automatic valve devices may be utilized for this purpose, and the appended claims are intended to embrace my novel mechanisms when they are controlled in this manner.

With the latch parts disposed in the positions shown in Figure 25, and with the engine at rest, atmospheric pressure exists in intake manifold 445 and the clutch springs, acting through the throwout assembly, levers 78, and shaft 110, hold the piston in the right hand end of the cylinder, and as the plates are engaged under these conditions, a driving connection is established between shafts 3 and 9.

When the engine is started, with valve 615.5 disposed in the position shown in Figure 27, and with the latch parts disposed in latching position, the resulting vacuum established in the intake manifold pulls the piston to the left into automatic position, as shown in Figure 25. The parts are held in this position against the action of the piston assembly by lever 574, which engages screw 572.

When the parts are disposed in automatic position, and the engine is operating substantially at idling speed, the clutch parts assume the disengaged or released condition illustrated in Figures 1 and 25, and if it is desired to establish a driving connection between shafts 3 and 9, the accelerator is depressed to automatically bring the clutch plates together in a manner that will now be described.

As the engine is accelerated, weights 56 rock outwardly and bring the plates together in the manner previously set forth, but prior to completion of this action, accelerator rod 615.61 shifts valve 615.5 so as to bring its reduced portion 615.6 into registry with port 615.9, with the result that atmospheric air is admitted to the left hand end of cylinder 605, thereby allowing springs 45 to pull the piston to the right. This action is resisted, however, as an air cushion exists in the right hand end of the cylinder by reason of the fact that port 614A is cut off by member 613, and the air contained in the right hand end of the cylinder is compelled to escape through the comparatively restricted bleed passage in member 612, with the result that movement of the parts toward engaged position is retarded. In this form of the invention, the retarding action is preferably sufficient to allow weights 56 to complete their engaging operation prior to the time the piston reaches the right hand end of the cylinder under the influence of spring 568.

Shaft 9 is accordingly automatically picked up with a solely speed responsive drive, and if it is desired to disengage the clutch for any purpose, wire 586 is actuated and the accelerator is released. Release of the accelerator restores valve 615.5 to the position shown in Figure 27, and closes the engine throttle to idling position, with the result that the piston is pulled into its extreme right hand position and moves the parts into fully disengaged position. The plates are accordingly disengaged, irrespective of any engaging tendencies that may be manifested by weights 56 as the result of engine momentum maintaining the clutch above its speed responsive engaging speed while this operation is being effected.

When the parts are held in disengaged position by the cylinder assembly, and it is desired to re-engage the clutch, the accelerator is depressed and the re-engaging action takes place in the following manner.

Depression of the accelerator causes the engine to accelerate, and also moves valve 615.5 into its left hand position, which places cylinder 605 in communication with the atmosphere. The piston assembly is accordingly allowed to move to the right, under the influence of springs 45 acting through levers 78, and throwout assembly A. When this operation is taking place, air bleeds into the left hand end of cylinder 605 by way of port 615.9, reduced portion 615.6, passage 615.95 and pipe 615.1. Air bleeds out of the right hand side of the cylinder through port 614A, sleeve 604 and port 614B. Some air also bleeds to the atmosphere through bleeder aperture 612. In view of the fact that the exhaust of air from the right hand end of the cylinder under these conditions is substantially unrestricted, movement of the parts toward automatic position is comparatively rapid if no other provision is made for retarding their movement.

When the piston has moved preferably to within three-eighths of an inch of automatic position during the operation just described, sleeve 604 is brought with its port 614A adjacent member 613, with the result that further movement of sleeve 604 cuts off port 614A, and causes air to be compressed in the right hand end of the cylinder, as air can now only escape therefrom through the relatively small aperture 612. The parts are preferably so designed that port 614A is cut off, and stable air pressure conditions are attained in the right hand end of the cylinder just prior to the time that the piston assembly, which is now undergoing relatively slow movement under the retarding action manifested by the action of air escaping from orifice 612, attains automatic position.

The parts are preferably so designed that when the piston and throwout assembly have attained automatic position during the operation just described, or shortly thereafter, weights 56 rock outwardly in the manner previously described, and bring the plates into frictional engagement with the result that the vehicle or other load handled by the transmission is smoothly picked up. As the engine is further accelerated, weights 56 swing further outwardly and produce a further pressure build up between the plates, and the piston continues to move slowly to the right, now under the influence of spring 568, as operation of the weights has caused reaction plate 38 to move to the right and thereby relieve levers 78 of the pressure of springs 45.

When the piston assembly attains automatic position under the influence of the bleeding operation just described, links 575 and 577 are restored to the position shown in Figure 25 under the influence of spring 582. The parts are accordingly locked, and should the accelerator be released when the clutch has been fully engaged in the manner just described, the resulting high vacuum produced in the intake manifold does not produce clutch disengagement, by reason of the fact that lever 574 and its associated latch prevents the throwout assembly from being moved past automatic position under the pull of the piston assembly.

In the event that the accelerator is depressed to a substantial extent, and the engine is pulling a heavy load, and the speed of shaft 3 is decelerated to a speed which is lower than the speed responsive operating speed of weights 56, the clutch nevertheless remains engaged under the influence of springs 45 for the reason that cylinder 605 is open to the atmosphere. Moreover, should pipe 615.1 be tapped directly into the intake manifold, the clutch would remain engaged by the reason of the fact that at low engine speeds, the vacuum is low when the throttle is open.

When the facings of the primary clutch undergo sufficient dimensional changes, as the result of particles thereof wearing away during operation, to establish too great a clearance between the plates when the latter are disposed in automatic idling position, which has the effect of delaying clutch engagement in response to acceleration of the driving shaft, and diminishing the driving pressure, locknut 573 may be loosened and bolt 572 screwed up sufficiently to re-establish proper idle release clearance, and nut 573 tightened to lock the parts in adjusted position. The effect of this operation is to dispose the reaction plate closer to the flywheel and thereby decrease the idle release clearance.

The engaging operation of the mechanism just described is fully responsive, i. e., the bleeding action of the piston lags behind the action of the automatic weights during normal acceleration of the engine, and it therefore does not influence the clutch engaging operation, whether the parts are bled to fully engaged position from disengaged or automatic position. In another embodiment of my invention, which I intend to be embraced by the present application, aperture 612 is of a slightly larger dimension, so that the engaging operation takes place in the following manner.

With the parts held in automatic position, either by the latch mechanism or by the momentary checking influence that aperture 612 exerts upon the piston when the latter approaches automatic position, springs 45 are placed under compression or are pre-loaded, and acceleration of the driving shaft causes weights 56 to bring the plates into engagement in the manner previously described. When weights 56 have built up a predetermined pressure between the plates, which is of smaller magnitude than the preloading of springs 45, the checking influence of bleed aperture 612 proceeds sufficiently to allow the piston and throwout mechanism to relieve levers 78 of substantial pressure and thereby impose the full pressure of springs 45 upon the plates. With this form of the invention, clutch engagement accordingly occurs in two stages, first, a speed responsive stage, wherein the plate pressure is built comparatively slowly and the load accordingly picked up smoothly, and secondly, a power or torque responsive stage, wherein the full driving pressure of the clutch springs is applied to the plates in response to attainment of certain conditions in the prime mover, and preferably brings the parts into synchronism comparatively rapidly, as shaft 9 has been picked up, and therefore may be brought into synchronism with shaft 3 comparatively rapidly without stalling the engine.

In connection with this form of the invention, it is to be understood that any suitable automatic or accelerator pedal operated valve mechanism may be associated with the vacuum line for effecting or assisting the above described pressure staging operation, if desired, without departing from the spirit of my invention. Moreover, a valve may be inserted in pipe 615.1 for the purpose of establishing communication between the cylinder and the atmosphere at will to thereby allow the plates to be brought into engagement under the influence of springs 45 when the engine is operating at speeds which are below the speed responsive operating speed of weights 56 if desired.

Secured to secondary clutch throwout shaft 265 by means of a cap screw is a lever 616, having a bifurcated hub. Threaded into lever 616 is a screw 617 which is adapted to be locked in adjusted position therein by means of a locknut 618. Mounted for free oscillation on shaft 265, and restrained against axial displacement by means of a cotter pin 619, is a lever 621 which is curved to clear the primary clutch throwout shaft as shown in Figure 25.

Pivotally connected to the lower end of lever 621, by means of a clevis 622 is a link 623, which is connected by means of a pin 624 to a piston rod 625. Rod 625 extends into a cylinder 626, having a removable head 627 provided with a vent aperture 628 and a piston rod guide 629. Secured to rod 625 by means of a nut 631 is a piston 632. Secured to piston 632 by means of rivets 633 is a plate 634 and a sealing element 635.

Journalled for oscillation in an integrally formed valve supporting portion 637 formed on cylinder 626 is a cylindrical valve member 638 having a reduced or shaft portion 639. A packing device 641, which may take any desired form, is preferably disposed around shaft 639 and is disposed between portion 637 and the shoulder of valve member 638.

A fluid intake port 642 is provided in member 638 and is adapted to be brought into registry with a passage 643 formed in member 637. A fluid supply line 644 is connected to member 637 and communicates with passage 643. Line 644 may be connected to any suitable source of fluid under pressure, but in the present instance it is connected to fluid distributing unit 335. Also provided in member 638 are a pair of exhaust ports 645 which are adapted to be brought into registry with a pair of exhaust passages 646 formed in member 637 (Figure 31) for the purpose of exhausting fluid from cylinder 626 in a manner that will be hereinafter described.

Preferably integrally formed with piston rod 625 is a member 647 having an enlarged valving portion 648, a longitudinal passage 649 and a pair of transverse passages 650, which intersect passage 649, provided therein. Member 647 co-operates with valve member 638 in a manner that will be hereinafter described.

Journalled for oscillation in a bore located in member 637 is a second valve member 651 having a plug 652 secured in the hollow end thereof and being provided with a reduced or shaft portion 653. A packing member 654 is associated with valve member 651 to prevent fluid leakage from the mechanism in a manner similar to that employed in the valve previously described. A pair of ports 655 are formed in member 651 and are adapted to be brought into registry with passage 646 formed in member 637, (Figure 31). Member 651 is also provided with a port 656, which is adapted to be selectively brought into registry with an exhaust passage 657 formed in member 637, (Figures 30 and 31), or with a longitudinal passage 658, (Figures 29 and 32), which communicates directly with cylinder 626 for purposes that will presently appear. Member 651 is also provided with a port 659 which is disposed substantially diametrically opposite port 656 and is adapted to be brought into registry with an inlet passage 660 formed in member 637 (Figure 32). Passage 660 communicates with a vertical passage 661, and as the latter communicates with inlet passage 643, it is apparent that fluid may be admitted to cylinder 626 by way of passages 643, 661, and 660, ports 659 and 656, and passage 658 (Figure 32).

A fitting 662 is threaded into member 637 and communicates with exhaust passage 657. Clamped between meeting portions of fitting 662 and a similar fitting 662.1 is an orifice plate 662.2 having an orifice 662.3 of predetermined size located therein. Plate 662.2 is provided for the purpose of placing a restriction of predetermined magnitude upon the flow of fluid from cylinder 626 to thereby produce the desired rate of secondary clutch engagement when the cylinder is being bled, and it is made in the form of a thin plate so that in the event that the viscosity of the actuating fluid changes with temperature variations, the value of restriction offered by the orifice plate will nevertheless remain substantially constant, so that the secondary engaging stage of the secondary clutch will be held substantially constant irrespective of temperature changes. A fluid return line 663 is connected to fitting 662.1 and leads to the low pressure side of unit 335 and is adapted to return the bled fluid thereto.

Before proceeding to a detailed description of the mechanism preferably employed for controlling the operation of valves 638 and 651, I will briefly describe their various functions.

With valves 638 and 651 disposed in the position illustrated in Figures 28 and 30, and with the engine operating at idling speed, piston 632 is disposed with extension 647 thereof in the position shown in Figure 28, and holds the secondary clutch parts in the automatic position illustrated in Figure 25. The fluid pressure set up in pipe 644 is incapable of urging piston 632 beyond the position shown in Figures 25 and 28 by reason of the fact that prior to attainment of such position, fluid passed through pipe 646, passage 643 and port 642 and along the annular passage between rod 647 and valve 638 and into the left hand end of cylinder 626, as indicated in Figure 30. When automatic position was attained, enlarged valve portion 648, of rod 647, was brought in front of port 642 and cut off further fluid flow into the cylinder. Accordingly, no latch mechanism is required to restrain the piston against pushing the clutch parts into disengaged position. In the event that fluid should leak past piston element 635, under these conditions, the piston under the influence of spring 45a will drop backwardly slightly toward the left, but as soon as this occurs, portion 648 of rod 647 will partially uncover port 642, with the result that further fluid will be admitted to the left hand end of cylinder 626 and the parts promptly restored to automatic position.

When valve 638 is rocked clockwise, sufficiently to bring port 642 out of registry with passage 643 and port 645 is simultaneously brought into registry with passage 646, as seen in Figure 31, assuming that valve 651 remains in the position just described, fluid bleeds out of the left hand end of cylinder 626 by way of ports 650, passage 649, left hand port 645 and passage 646, Figure 28, left hand port 655, port 656, passage 657, orifice 662.3 and return line 663. This position of valve 638 will be known hereinafter as its bleed position for the reason that when it is so disposed fluid may bleed out of the cylinder back into the fluid energy source.

With valve members 638 and 651 disposed in the positions shown in Figure 32, valve 638 cuts off communication between supply passage 643 and the cylinder, but fluid is supplied to the cylinder by way of passages 660 and 661, ports 659 and 656 and passage 658, as seen in Figure 29. In view of the fact that when the parts are disposed in this position the fluid supply is not controlled by the position of the piston, the piston and associated structure moves into disengaging position against the action of springs 45a. The mechanism that I preferably employ for controlling valves 638 and 651 will now be described.

With reference to Figures 33, secured to shaft 639 by means of a cap screw 664 is a double armed lever 665. A rod 666, having a diaphragm assembly 667 secured thereto, is pivotally connected to the upper end of lever 665 by means of a clevis 668 and the diaphragm assembly is clamped between two halves of diaphragm casing 669. Casing 669 may be mounted on the mechanism in any suitable manner, but is preferably supported on a bracket 671, which is secured to member 637 by means of cap screws 672. Secured to casing 669, and having a passage 673 registering with a similar passage 674 formed in the casing is a valve member 675. Slidably mounted within a vertical bore in valve member 675 is a valve 676 having a reduced portion 677 and a longitudinal bleed passage 678 formed therein. A control wire 679 is located in a bore in member 676 and is secured therein by means of a set screw 681. Wire 679 is enclosed in a housing 682, and the assembly is connected to the dual control mechanism shown in Figure 13, wire 679 being connected to rod 507. A pipe 683, is connected to member 675 by a suitable fitting, and the other end thereof is tapped into intake manifold 445, adjacent the throttle valve 449 thereof in the manner previously described.

When knob 508 is pulled out so as to shift valve 676 upwardly and bring portion 677 thereof out of registry with passage 673, bleed passage 678 thereof is simultaneously brought into registry with passage 673 and atmospheric air may bleed into the diaphragm casing with the result that the diaphragm may be moved to the right under the influence of the resilient means that will now be described.

Pivotally connected to lever 665, and having a slot 686 provided therein, is a member 687, to which a tension spring 688 is secured. Spring 688 is adapted to urge lever 665 in a clockwise direction against the action of vacuum diaphragm assembly, and it is anchored to a bracket 689 which is secured to the cylinder assembly by means of a screw 691 or the like. An actuator wire 692 extends through an aperture in the upper part of member 687 and has an enlarged portion 693 provided thereon, which is adapted to work in slot 686. Actuator wire 692 is adapted to pull lever 665 into the pressure position shown in Figure 33, against the action of spring 688, when the transmission is in reverse drive for the purpose of preventing the intake manifold pressure variations from allowing the secondary clutch to bleed into engagement under such conditions.

To this end wire 692 and sheath 694 associated therewith are led rearwardly in the mechanism and may be supported thereon in any suitable manner. Wire 692 extends through a member 695 which is pivotally connected to lever 291, and which in fact may be an integral part of member 545. A stop member, in the form of a collar 696, is secured to wire 692 by means of a set screw 697, and when the parts are disposed in forward drive position, as seen in Figure 25, a clearance exists between collar 696 and member 695.

When lever 291, under the influence of wire 547, is rocked into neutral position, swivel member 695 is brought adjacent to, or just into engagement with collar 696, and it is accordingly apparent that shifting the transmission parts from forward to neutral position does not actuate wire 692. When lever 291 is rocked into reverse position, however, member 695 picks up collar 696 and pulls wire 692, with the result that if the engine is operating at idling speed and the vacuum is high, enlarged portion 693 of wire 692 will be brought into the upper end of slot 686. Accordingly, when the intake manifold vacuum subsequently drops, in response to acceleration of the engine, lever 665 will nevertheless be held in the pressure position illustrated in Figure 33, by wire 692. By reason of the slot 686 formed in member 687, lever 665, when the transmission is in forward or neutral drive position, may rock freely to and from pressure position without interference from wire 692.

Valve 651 is also controlled by the dual dash assembly, and to this end a lever 699 is secured to shaft 653 by means of a key 700, and swivelly connected thereto is an apertured member 701. Secured to member 701, by means of a set screw 702, is a control wire 703. A sheath 704 encloses wire 703 and is supported by a bracket 705 or the like. The control assembly is led up to the combination control located on the dash, and wire 703 thereof is connected to pin 520 carried by plates 517 and 518. Knob 508 may accordingly be rocked so as to rock valve 651 from the bleed position shown in Figures 30 and 31, into the pressure position shown in Figures 29 and 32.

In this form of the invention, overrunning clutch carrier 179 (Figure 26) is locked in contact with screws 178 against rocking movement by a screw 717 which is threaded into a boss portion 718 of housing 1, and engages lug 182 of member 179. A locknut 719 is threaded on screw 717 and is adapted to lock it in adjusted position. Member 179 accordingly functions as a stationary support for member 187 in this form of my invention as it is incapable of undergoing rocking movement in response to application of reactive forces thereto by rollers 189.

In order to render the mechanism foolproof, I preferably interconnect the shifting mechanism with a switch controlling the starting motor circuit, so as to make it impossible to start the engine unless the transmission is in neutral, and to this end a lever 706 is journalled in a switch box 707 and carries a swivelled member 708 to which wire 556 is connected. A lever 709 is also journalled in switch box 707 and is adapted to open and close the switch located therein (not shown). Actuating wire 586 for the primary clutch latch mechanism is connected to a swivelled member 711 carried by lever 709, and the latter is normally urged downwardly by a tension spring 712, which is anchored to any suitable support.

Cooperating with a cam face 713 formed on lever 709 is a cam 714 which is preferably carried by lever 706. In Figure 25, lever 706 is disposed in forward drive position and lever 709 is so disposed as to open the switch contained in switch box 707, which may be of any conventional form. When lever 706 is rocked into neutral position under the influence of wire 556, cam 714 rocks lever 709 upwardly, which closes the starter circuit by closing the switch, and through wire 586, it lifts the links of the primary clutch latch into release position. When lever 706 is rocked into reverse drive position, spring 712 restores lever 709 to the position shown in Figure 25, thereby opening the switch and breaking the starter circuit to which conductors 115 and 116 form a part, and allowing the primary clutch latch to be again locked.

Operation

With the engine stopped and with knob 553 and shaft 291 disposed in forward or reverse drive position, lever 709 assumes the position shown in Figure 25, with the result that the starter circuit is broken and it is accordingly impossible to use the starter and start the engine. On the other hand, if it were possible to start the engine under these conditions, and the throttle were opened a substantial amount, the vehicle would be picked up in forward or reverse drive and would possibly crash into something before the operator would have the presence of mind to bring it under control.

With the engine stopped, and with knob 553 and shaft 291 disposed in neutral position, lever 709 is held in its upwardly rocked position through the medium of wire 547, lever 706 and cam 714, with the result that the starter circuit switch is closed and the links of the primary clutch latch are held in raised position. When the engine is started under these conditions and the accelerator is released, the vacuum created in the intake manifold, acting through the diaphragm assembly, lever 565 and shaft 110, pulls the primary clutch into disengaged position. The intake manifold vacuum also actuates diaphragm 667 and pulls the valve 638 into pressure position against the action of spring 688, with the result that the secondary clutch parts are brought into automatic position by piston 632.

Under the conditions just described, and with the engine operating at idling speed, the primary and secondary clutches are disengaged and shafts 3, 9 and 154 are disconnected. If the vehicle is at rest, and it is desired to run the engine at speeds substantially in excess of idling speed for the purpose of warming it up or adjust the carbureter thereof, the accelerator may be depressed to accelerate it. Although depression of the accelerator causes the primary clutch to engage and couple shafts 3 and 9, this does not result in propulsion of the vehicle as lever 291 is disposed in neutral position. In the event that it is desired to perform this operation when the weather is cold and the resistance set up by congealed lubricants makes it preferable to maintain shafts 3 and 9 disconnected during the "warming up" operation, the throttle may be opened by the usual dash control so as to avoid shifting valve 615.5 into bleed position. The engine accordingly may be operated at fairly high speeds without producing engagement of the primary clutch, with the result that shafts 3 and 9 are maintained disconnected under these conditions.

With the parts disposed as seen in Figure 25, and with the engine operating substantially at idling speed, diaphragm 667 holds lever 665 in the position illustrated in Figure 33, with the result that the fluid operated cylinder assembly holds the secondary clutch throwout mechanism in automatic position, as seen in Figure 25. Shafts 3, 9 and 154 are therefore disconnected, and with lever 291 disposed in forward drive position, acceleration of the engine causes the transmission to automatically pick up the vehicle in forward drive in the following manner. Initial acceleration of the engine causes the primary clutch to establish a driving connection between shafts 3 and 9, with or without a power responsive stage, in the manner previously described. The vehicle is accordingly picked up with a torque multiplying drive, and when member 4a attains a predetermined speed, weights 56a rock outwardly and initially engage the secondary clutch as previously explained. Preferably shortly before, or simultaneously with, operation of weights 56a, depending upon the load and the rate of engine acceleration, the vacuum in the intake manifold falls sufficiently to allow spring 688 to rock lever 665 toward bleed position, with the result that shortly after the weights bring the secondary clutch into engagement, the fluid will bleed out of cylinder 626 and allow the full pressure of springs 45a to be applied to the plates. Accordingly, the second stage of secondary clutch engagement is responsive to the power output of the engine, because the intake manifold vacuum falls off substantially in accordance with the opening of the throttle, whereas in the previous forms of my invention a somewhat similar result is attained by bleeding the secondary clutch when the power transmitted through the gearing falls to a predetermined extent.

With the primary and secondary clutches engaged in the manner just described, release of the accelerator establishes a high vacuum and causes diaphragm 667 to pull valve 638 into bleed position, with the result that the secondary clutch throwout mechanism is pulled into automatic position. Accelerator release also causes the intake manifold vacuum to pull the primary clutch parts into automatic position, but, as previously explained, disposing the primary and secondary clutch parts in automatic position does not result in diminishing the plate pressure, providing the speed responsive parts of the clutches are maintained above their speed responsive speeds. With the accelerator released as just described, if the speed of the vehicle is reduced to a speed corresponding to the disengaging speed of the secondary clutch, it disengages as previously set forth and allows shaft 9 to decelerate and disengage the primary clutch.

With the primary and secondary clutches engaged as previously explained, they will remain so engaged even down to low vehicle speeds providing the throttle is maintained open, for the reason that although weights 56 and 56a rock inwardly when shafts 3 and 9 are decelerated to a predetermined speed, the intake manifold vacuum is low under these conditions and allows spring 688 to hold valve 638 in bleed position, thereby allowing springs 45a to hold the secondary clutch plates in engagement. The primary clutch is maintained engaged under these conditions by reason of the fact that as the accelerator is depressed, valve 615.5 is maintained in bleed position.

The accelerator may be operated when the transmission is disposed in forward drive, so as to cause the transmission to selectively shift into direct speed in the manner described in connection with the previously described modifications of my invention.

When the transmission is disposed in forward drive, and it is desired to shift the transmission so as to provide a permanent torque multiplying connection between the engine and the load, for use in ascending long mountain grades, knob 508 is rocked so as to cause wire 703 to pull valve 651 into pressure position. Operating valve 651 in this manner allows the operating fluid supplied by pipe 644 to force piston 632 to the end of its stroke, which, acting through rod 623, lever 621, screw 617, lever 616 and shaft 265, moves the secondary clutch throwout mechanism into disengaged position, irrespective of whether weights 56a are in their operative or inoperative positions, thereby insuring disconnection of shaft 9 and the planet carrier.

In view of the fact that movement of shaft 265 in response to the operation just described applies the brake to the internal gear, the resulting geared drive is two-directional in character, and this operation may therefore be performed when it is desired to apply the braking effort of the engine, as amplified by the gearing, to the vehicle wheels.

When the primary and secondary clutches are fully engaged, and the transmission is operating in direct drive, and it is desired to condition the transmission to prevent the normal automatic transition from direct to geared speed from taking place, knob 508 is withdrawn so as to actuate valve 676 and bring bleed passage 678 thereof into registry with bore 673. This operation cuts off the communication between the intake manifold and diaphragm chamber 669 and allows atmospheric air to bleed thereto by way of bleed passage 678 and apertures 673 and 674. Bleeding atmospheric air into diaphragm chamber 669 allows spring 689 to hold valve 638 in bleed position at all times, no matter how high the vacuum in the intake manifold, as the result of releasing the accelerator, may become. Accordingly, when the accelerator is released, and the vehicle decelerates to the normal disengaged speed of the secondary clutch, weights 56a rock inwardly under the influence of the holdback springs, but springs 45 maintain the plates in driving engagement. Of course, if the speed of the vehicle, under the influence of the decelerating operation, is brought down to the disengaging speed of the primary clutch, it will disengage and release shafts 3 and 9. If the primary clutch is disengaged in this manner, and it is desired to again pick up the vehicle in direct drive, the accelerator is depressed to cause the primary clutch to engage as previously described. If, however, the vehicle has decelerated to too low a speed for the engine to pick it up in direct drive, knob 508 may be pushed in so as to restore the normal speed responsive functions of the secondary clutch and thereby allow the transmission to pick the vehicle up in geared speed.

Reverse drive is obtained by pulling knob 553 into its outermost position, which rocks shaft 203 as previously explained, and also pulls wire 692, and if the engine is operating at idling speed, the enlarged terminal 693 of wire 692 is brought into the upper end of slot 686 of member 687. With knob 553 pulled out in this manner, acceleration of the engine causes the primary clutch to engage and establish a reverse drive between the engine and the load in the manner previously described, and when the accelerating operation attains a predetermined stage, the vacuum in the intake manifold falls sufficiently to allow spring 688 to overcome diaphragm 667, but as wire 692, acting through member 687, positively holds lever 685 in pressure position, it is apparent that the secondary clutch will remain in automatic position, irrespective of the speed variations of the engine under these conditions.

If it is desired to tow or coast the vehicle to turn the engine over for cranking purposes, knob 553 is shifted into forward drive position. Rotation of shaft 154, in response to the towing or coasting operation, applies rotative efforts directly to shaft 9 because, as atmospheric pressure exists in the intake manifold, spring 688 holds valve 638 in bleed position and springs 45a hold the secondary clutch plates in engagement. Atmospheric pressure conditions in the intake manifold likewise allow springs 45 to hold the primary clutch plates in engagement, thereby connecting shafts 3 and 9. In view of the fact that there is no pressure in unit 335 when the engine is dead, piston 632 would be ineffective to hold the secondary clutch in automatic position even if valve 638 were disposed in pressure position under such conditions. A direct drive accordingly exists between the engine and the vehicle wheels, and when the engine starts, in response to the towing or coasting operation, and attains idling speed, the primary and secondary clutches will be automatically brought into automatic position, and free the engine from shaft 154 in the manner previously set forth.

In connection with all of the forms of my invention, it is to be understood that, although the primary clutches have been disclosed as being associated with various types of power means for automatically operating them, the novel secondary clutches and their controlling mechanisms may be advantageously employed in a transmission wherein the primary clutch is solely speed responsive, or in some types of drives where no primary clutch is utilized at all, especially since the major function of the secondary clutches is to establish a direct drive between shafts 3 and 9 when proper power transmitting conditions have been attained. Moreover, I desire to have it understood that, although I have illustrated my novel secondary clutch controlling mechanisms as being associated with a transmission that is operable to automatically effect an acceleration of the speed responsive part of the secondary clutch mechanism when the transmission is operating in the geared speed range and a reversal of drive occurs, they are not limited for use in such a type of transmission. For instance, they may be successfully employed for controlling the secondary clutches of the transmissions disclosed in co-pending application, Serial Number 643,744, filed November 21, 1932, or in any other type of transmission without departing from the spirit of my invention.

Referring now to Figure 34, I have illustrated the transmission shown in Figure 25 as being associated with a second clutch and gear organization, and as the latter is constructed and functions in a manner identically similar to the secondary clutch and gear assembly used in the mechanism shown in Figure 25, similar letters with subscripts "a" have been employed to designate corresponding parts. This mechanism preferably maintains a torque multiplying drive between the engine and the load at vehicle speeds of between approximately twenty and forty-five miles per hour, and at speeds of in excess of forty-five miles per hour the secondary or "high speed" clutch in the second gear assembly engages and establishes a direct drive between the engine and load, and is used for substantially the same purpose as the so-called "overdrives" and "two speed" rear axles, now in use in automotive vehicles today, but it is superior to such devices for the reason that it is automatic and extremely flexible in operation.

In this form of my invention, shaft 381a extends outwardly of housing 1 into an auxiliary housing section 725, and into housing 1a. Housing 725, it is observed, replaces cap member 155', employed in the device shown in Figures 1 and 25, and it is secured to housing 1 by cap screws 726, and to housing 1a by cap screws 727. The clutch contained in housing 1a operates in precisely the same manner as the secondary clutch employed in the device shown in Figure 25, but the holdback springs thereof are stronger so that it operates to establish a direct drive between shaft 381a and the final driven shaft (not shown) at a vehicle speed of forty to forty-five miles per hour, when the throwout shaft is held in automatic position, and it will be hereinafter termed the high speed clutch.

The high speed clutch throwout shaft is adapted to be controlled by a fluid operated unit similar to that shown in Figure 25, and piston rod 625a thereof is connected to shaft 265a by means of a link 623a, a pin 728 and a lever 729, the latter being secured to shaft 265a in any suitable manner.

In this form of the invention shaft 203 is preferably locked against movement; and control assemblies 548 and 557 and knob 553 are preferably associated with the gear organization located in housing 1a. Also, a second set of controls, similar to those associated with power cylinder 626, and having a controlling knob 508a, (not shown) are connected to the power cylinder associated with piston rod 625a.

With knob 553 pushed in, and with the secondary clutch engaged and with the vehicle proceeding at speeds of less than forty or forty-five miles per hour, shaft 381a, which is rotating synchronously with shaft 3, drives the final driven shaft at a speed reduction by reason of the fact that the high speed clutch is disengaged under these conditions.

If, when the transmission is operating in the manner just described, the vehicle is accelerated to a speed of preferably forty to forty-five miles per hour, the high speed clutch automatically engages and establishes a direct drive between shaft 381a and the final driven shaft in a manner exactly similar to that described in connection with the secondary clutch of the mechanism contained in housing 1. It is also possible, when the transmission is operating at speeds of say from thirty to forty or forty-five miles per hour, to effect an automatic selective shift of the transmission into direct drive, that is, the high speed clutch may be caused to engage, by momentarily releasing the accelerator, as described in connection with the first form of my transmission.

When the transmission is operating with the high speed clutch engaged, the only torque multiplication between the engine and the vehicle wheels is that provided by the gears in the rear axle. Accordingly, it is highly desirable to obtain a greater torque multiplication when overtaking other vehicles or ascending steep grades, and this is effected by rocking knob 508a, which operates valve 651a and allows the operating fluid to force piston 632 into its right hand position, which rocks lever 729 and displaces throwout bearing 99b of the high speed clutch into its disengaging position and disengages the high speed clutch. Disengagement of the high speed clutch causes the gearing contained in housing 1a to immediately come into action and provide a torque multiplication. In the event that an extremely steep grade is encountered, knob 508 may also be rocked so as to move valve 651 into pressure position and disengage the secondary clutch and cause the gearing contained in housing 1 to come into action and provide an additional torque multiplication.

In view of the fact that rocking secondary and high speed clutch throwout shafts 265 and 265a respectively into disengaging position causes the brakes associated with their respective gear organizations to be actuated, a two-way geared drive is accordingly established when knobs 508 and 508a are rocked, with the result that the engine may be used for braking purposes when the transmission is operating in either high or low geared speed.

In the event that it is desired to shift the transmission into direct or high speed when the parts are operating at speeds less than the automatic engaging speed of the high speed clutch, knob 508a may be pulled out so as to bleed atmospheric air into valve operating diaphragm chamber 669a and allow spring 688a to pull valve 638a into bleed position, and allow the throwout mechanism of the high speed clutch and lever 729 to move into engaged position. As engagement of the high speed clutch causes the transmission to shift into direct drive, it is apparent that the transmission may be shifted into and out of direct drive with perfect ease by operating knob 508a.

When it is desired to reverse direction of the drive, knob 553 is pulled out so as to rock shaft 203a associated with the gear assembly located in housing 1a (not shown) into reversing position.

Although I have illustrated the high speed gear unit as being associated with the automatic transmission shown in Figure 25, it is to be understood that it may be associated with any other type of drive without departing from the spirit of my invention. For instance, it may be mounted directly behind the transmission or on the rear axle assembly of the drive of a vehicle having a conventional three-speed, manually shifted transmission, for providing an automatic "overdrive ratio", and the appended claims are intended to embrace my mechanism when it is used in this relation.

It is also to be understood that although the overdrive mechanism I have disclosed employs an automatic clutch to cut out the speed-reducing gear train when a vehicle speed of forty to forty-five miles per hour is attained, the parts may be modified, particularly when rear axles having a lower torque multiplication are utilized, so that at low speeds the overdrive unit establishes a direct drive between the driving and driven shafts, and when the overdrive speed of from forty to forty-five miles per hour is attained, the automatic clutch engages and causes a speed-multiplying gear train to "cut in" and drive the driven shaft at a greater speed than the driving shaft, the automatic clutch being subject to selective control as described in connection with the preferred form of my overdrive mechanism, without departing from the spirit of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a power transmitting mechanism, in sub-combination, a torque multiplying mechanism; means for controlling the operation of said mechanism, comprising a clutch; resilient means normally tending to engage said clutch; and means, responsive to variations in the magnitude of the torque transmitted by said mechanism, for maintaining said clutch disengaged against the action of said resilient means, said last-named means also being automatically operable to maintain said clutch disengaged against the action of said resilient means when no torque is transmitted by said torque multiplying mechanism 2. The power transmitting mechanism described in claim 1, wherein said controlling means is adapted to effect a decrease in the torque multiplication of said torque multiplying mechanism when the torque transmitted by the latter attains a predetermined magnitude.

3. The power transmitting mechanism described in claim 1, wherein said controlling means is operable to effect a decrease in the torque multiplication of said torque multiplying mechanism when parts thereof attain a predetermined speed, and is operable to allow said resilient means to engage said clutch when said torque multiplication attains a predetermined value.

4. In a power delivery mechanism, a prime mover; a load; a power transmitting mechanism connected to said prime mover, and said load and comprising a torque multiplying mechanism; and means, comprising a spring engageable friction clutch, which is adapted to be controlled in accordance with operation of said prime mover, for automatically effecting changes in the torque multiplication of said torque multiplying mechanism, said friction clutch also being automatically responsive to variations in the speed of a part of said torque multiplying mechanism to effect changes in the torque multiplication of said torque multiplying mechanism.

5. The mechanism set forth in claim 4, wherein said means is adapted to automatically establish a direct drive between said prime mover and said load when said prime mover is stopped.

6. The mechanism described in claim 4, wherein said means is selectively operable to establish a direct drive between said prime mover and said load.

7. In a power transmitting mechanism, a torque multiplying device, an automatic clutch for controlling said torque multiplying device, said clutch having parts which are urged out of an automatic position; means controlled by said torque multiplying device for maintaining said clutch parts in automatic position; and means for supplementing the action of said first named means and operable to independently maintain said clutch parts in automatic position.

8. The mechanism described in claim 7, together with means for causing one of said maintaining means to allow said clutch parts to move out of automatic position when certain conditions have been attained in said torque varying mechanism.

9. In a power transmitting mechanism, a driving member and driven member mounted for rotation and adapted to have power applied thereto and taken therefrom respectively, a torque multiplying mechanism normally connecting said members and operable to transmit power therebetween, means for automatically establishing a direct drive between said members when certain predetermined conditions have been attained in the mechanism, comprising a friction clutch which is operable to transmit power between certain parts of the mechanism, said clutch having two separate means for engaging it, and means, automatically controlled by variations in the magnitude of the torque transmitted by said clutch for controlling one of said clutch engaging means for varying the pressure built up in said clutch.

10. In a power transmitting mechanism, a driving member and a driven member mounted for rotation; a torque multiplying mechanism interconnecting said members and adapted to transmit power therebetween, said torque multiplying mechanism comprising a resiliently mounted back-stop adapted to undergo movement in response to torque transmission by said torque multiplying mechanism; means for automatically establishing a direct drive between said members when certain conditions have been attained in the mechanism, comprising a friction clutch having both resilient means and centrifugally operable means for engaging it; and controlling means, connected to said back-stop and automatically actuated in accordance with the magnitude of the torque transmitted between said members, for controlling said resilient means.

11. In a power transmitting mechanism, a driving member and a driven member mounted for rotation; a torque multiplying mechanism interconnecting said members and adapted to transmit power therebetween; means for automatically establishing a direct drive between said members when certain conditions have been attained in the mechanism, comprising a friction clutch having both resilient and centrifugally operable means for engaging it; and controlling means, automatically actuated in accordance with the magnitude of the torque transmitted between said members, for controlling said resilient means, said controlling means being operable to render said resilient means incapable of engaging said clutch when the magnitude of the torque transmitted between said members diminishes to a predetermined value.

12. In a power transmitting mechanism, a driving member and a driven member mounted for rotation and adapted to have power applied thereto and taken therefrom respectively; a torque multiplying mechanism normally inter-connecting said members and having a rotatable controlling part, said controlling part being operable to change the torque multiplication between said members when rotative efforts are applied to it; a centrifugally actuated friction clutch for applying rotative efforts to said part when it is engaged, resilient means tending to engage said clutch; and means for automatically maintaining said clutch disengaged against the action of said resilient means when the magnitude of the torque transmitted between said members attains a predetermined value.

13. The mechanism described in claim 12, wherein said last-named means is operable to allow said resilient means to engage said clutch when the magnitude of the torque transmitted between said members attains a predetermined value.

14. In a power transmitting mechanism, a driving member and a driven member mounted for rotation and adapted to have power applied thereto and taken therefrom respectively; a torque multiplying mechanism normally interconnecting said members and having a rotatable controlling part, said controlling part being operable to change the torque multiplication between said members when rotative efforts are applied to it; a friction clutch for applying rotative efforts to said part when it is engaged, resilient means tending to engage said clutch; and means for automatically maintaining said clutch disengaged against the action of said resilient means when the magnitude of the torque transmitted between said members attains a predetermined value, said last-named means being operable to maintain said clutch disengaged when no torque is transmitted between said members.

15. The mechanism described in claim 12, wherein said last-named means comprises a second resilient means which acts in opposition to said first-named resilient means.

16. In a power transmitting mechanism, a driving member and a driven member mounted for rotation, a torque multiplying device normally inter-connecting said members and having a controlling part which is operable to vary the torque multiplication between said members when forces are imparted to it, said device also having a resiliently mounted backstop, which is automatically movable in accordance with variations in the magnitude of the torque transmitted between said members, and means connected to said back-stop and actuated in accordance with movements thereof for imparting forces to said controlling part, said means comprising a centrifugally operable friction clutch.

17. The mechanism described in claim 16, wherein said last-named means comprises a friction clutch having resilient means tending to engage it and having means for maintaining it disengaged, controlled by movements of said backstop.

18. In a power transmitting mechanism, a driving member and a driven member mounted for rotation, a torque multiplying device normally interconnecting said members and having a controlling part which is operable to vary the torque multiplication between said members when forces are imparted to it, said device also having a resiliently mounted back-stop, which is automatically movable in accordance with variations in the magnitude of the torque transmitted between said members, and means, comprising a fluid operated device having a fluid energy controlling valve connected to said back-stop and actuated in accordance with movements thereof for imparting forces to said controlling part.

19. In a power transmitting mechanism, a torque multiplying mechanism having a part which is adapted to manifest retrograde rotative tendencies when power is transmitted by said mechanism; a member mounted for rocking movement and having resilient means urging it in one direction, means for providing at least a one-way force transmitting connection between said part and said member for causing rotative tendencies of said part to build up pressure in said resilient means; means, controlled by movements of said member, for controlling the torque multiplication of said torque multiplying mechanism, said last-named means comprising a friction clutch having centrifugally operable actuating means and resilient means tending to engage it, and controlling means for disengaging it independently of the action of said centrifugally operable and resilient means; and means for operatively connecting said back-stop to said controlling means for producing coordinated operation thereof.

20. The mechanism described in claim 19, wherein said friction clutch is operable to increase the torque multiplication when said member moves against the action of said resilient means.

21. The mechanism described in claim 19, wherein said friction clutch is ineffective to control the torque multiplication of said torque multiplying mechanism unless a torque of a predetermined magnitude is handled thereby.

22. In a power transmitting mechanism, driving and driven members mounted for rotation, a torque multiplying device normally inter-connecting said members and operable to transmit power therebetween, said torque multiplying device being shiftable to transmit retrograde rotative efforts from said driving member to said driven member, said torque multiplying device also having a part which is operable to change the torque multiplication when rotative efforts are applied to it, means for applying rotative efforts to said part comprising a clutch having resilient means tending to engage it, means automatically actuated in accordance with the magnitude of the torque transmitted between said members, for controlling said clutch, comprising a power operated mechanism, and means for automatically controlling said power operated mechanism for preventing said resilient means from engaging said clutch when said torque multiplying device is shifted into reverse.

23. A power transmitting mechanism for use with a prime mover of the internal combustion engine type, comprising a torque multiplying device having a friction clutch, which when engaged, is operable to change the torque multiplication, said clutch having resilient means tending to engage it, controlling means actuated by said torque multiplying device, for automatically maintaining said clutch disengaged against the action of said resilient means when the magnitude of the torque handled by said device increases to a predetermined value, and means responsive to the attainment of predetermined conditions in said internal combustion engine for maintaining said clutch disengaged when the magnitude of the torque handled by said torque multiplying device decreases to a predetermined value.

24. The mechanism described in claim 23, wherein said controlling means is operable to engage said clutch when the magnitude of the torque transmitted by said torque multiplying device decreases to a predetermined value.

25. In a power transmitting mechanism, for use with a prime mover of the internal combustion engine type, comprising a torque multiplying device having a friction clutch for varying the torque multiplication thereof when it is engaged; resilient means tending to engage said clutch; a power operated device for automatically maintaining said clutch disengaged against the action of said resilient means when the magnitude of the torque handled by said torque multiplying device increases to a predetermined value, and a second power operated device for automatically maintaining said clutch disengaged against the action of said resilient means when the torque decreases to a predetermined value.

26. The mechanism described in claim 25, wherein one of said power operated devices comprises means for automatically rendering it responsive to the attainment of predetermined conditions in said engine.

27. The mechanism described in claim 25, wherein said second power operated device is automatically operable in response to the attainment of predetermined conditions in said engine.

28. In a power transmitting mechanism, a torque multiplying device having a friction clutch for varying the torque multiplication thereof when it is engaged; resilient means tending to engage said clutch; a latch device for holding said clutch disengaged against the action of said resilient means; a member operably associated with said torque multiplying device and operable to move in one direction when the magnitude of the torque handled by the latter increases, and operable to move in the opposite direction when the torque decreases; and means connecting said member to said latch device for causing the latter to allow said resilient means to engage said clutch when said member moves in said second-named direction.

29. The mechanism described in claim 28, together with means for restoring said clutch to disengaged condition and for restoring said latch device to latching condition in response to certain predetermined conditions in the torque multiplying device.

30. In an automatic power transmitting mechanism, driving and driven members interconnected by a torque multiplying device, said torque multiplying device comprising a combined spring means and centrifugally operable means, engaged friction clutch operable to establish a direct drive between said members when it is engaged; power means for maintaining said clutch disengaged against the action of said spring means when it is energized; a source of power for energizing said power means; means for controlling the flow of power from said power source to said power means comprising a movable element operable to assume an energizing and a de-energizing position; means automatically actuated in response to zero torque transmission conditions in said torque multiplying device for holding said element in energizing position; and means automatically actuated in response to high torque transmission conditions in said torque multiplying device for holding said element in energizing postion, said last-named means having a lost-motion connection between them and said element, whereby they may independently actuate the latter.

31. The automatic power transmitting mechanism described in claim 30, together with means for holding said element in energizing position at will.

32. The automatic power transmitting mechanism described in claim 30, wherein said torque multiplying device is shiftable into reverse drive, together with means for automatically holding said element in energizing position when said torque multiplying mechanism is shifted into reverse drive.

33. The automatic power transmitting mechanism described in claim 30, wherein said last-named means are operable to automatically allow said element to move toward de-energizing position when the magnitude of the torque handled by said torque multiplying device diminishes to a predetermined value.

34. In an automatic transmission, a torque multiplying mechanism having a friction clutch for changing the torque multiplication thereof, said friction clutch having resilient means and centrifugally operable means for engaging it, and having a control member adapted to assume an engaged position, where the clutch is engaged at all speeds; an intermediate automatic position, where clutch engagement is dependent upon speed; and a disengaged position, where the clutch is disengaged at all speeds, a fluid actuated device for moving said member from engaged position toward disengaged position against the action of said resilient means, and valve means, automatically controlled by said device, for cutting off fluid flow thereto when said member attains automatic position under the influence thereof.

35. The automatic transmission described in claim 34, together with means for supplying fluid energy to said fluid actuated device independently of said valve means, whereby said control member may be brought beyond automatic position and into disengaged position at will.

36. The automatic transmission described in claim 34, wherein said fluid actuated device comprises a piston and cylinder, and wherein said valve means comprises a valve element carried by said piston and movable therewith, whereby should the latter leak and allow said resilient means to move said control member out of automatic position, said valve element will promptly admit more fluid energy thereto and restore said member to automatic position.

JOSEPH E. PADGETT.